United States Patent
Kim et al.

(10) Patent No.: US 9,523,953 B2
(45) Date of Patent: Dec. 20, 2016

(54) IMAGE FORMING APPARATUS AND IMAGE FORMING METHOD

(71) Applicant: Samsung Electronics Co., Ltd., Suwon-si (KR)

(72) Inventors: Jin Sil Kim, Suwon-si (KR); Jin Ha Jun, Seoul (KR); Hyuk Kang, Yongin-si (KR); Yun-Mo Kim, Suwon-si (KR); Sung Min Park, Gwacheon-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days.

(21) Appl. No.: 14/751,585

(22) Filed: Jun. 26, 2015

(65) Prior Publication Data
US 2015/0378296 A1   Dec. 31, 2015

(30) Foreign Application Priority Data

Jun. 27, 2014 (KR) .................. 10-2014-0080229

(51) Int. Cl.
*G03G 15/00* (2006.01)
*G03G 21/00* (2006.01)
*H04N 1/44* (2006.01)

(52) U.S. Cl.
CPC ........ *G03G 15/5091* (2013.01); *H04N 1/4426* (2013.01); *H04N 1/4433* (2013.01)

(58) Field of Classification Search
CPC . G03G 15/5091; H04N 1/4426; H04N 1/4433
USPC ............... 399/1, 80, 38, 8, 75, 76; 358/1.15
See application file for complete search history.

(56) References Cited

U.S. PATENT DOCUMENTS

| 8,400,653 | B2 * | 3/2013 | Fujino | G06F 3/1207 |
| | | | | 358/1.15 X |
| 2008/0007767 | A1 * | 1/2008 | Ishimaru | G06F 21/35 |
| | | | | 358/1.15 |
| 2011/0286028 | A1 | 11/2011 | Kinouchi et al. | |
| 2012/0250059 | A1 * | 10/2012 | Itogawa | G06F 3/1204 |
| | | | | 358/1.15 X |
| 2013/0229685 | A1 | 9/2013 | Naruse | |
| 2013/0259230 | A1 | 10/2013 | Polo et al. | |
| 2014/0139863 | A1 | 5/2014 | Harada | |
| 2014/0253949 | A1 * | 9/2014 | Tsujimoto | H04N 1/0084 |
| | | | | 358/1.14 |
| 2015/0256693 | A1 * | 9/2015 | Kubo | H04N 1/00506 |
| | | | | 358/1.15 |

FOREIGN PATENT DOCUMENTS

EP   2 431 828   3/2012

OTHER PUBLICATIONS

Extended European Search Report dated Jan. 7, 2016 from European Patent Application No. 15174095.8, 6 pages.

* cited by examiner

*Primary Examiner* — Sophia S Chen
(74) *Attorney, Agent, or Firm* — Staas & Halsey LLP

(57) ABSTRACT

An image forming apparatus may include an image forming unit configured to form an image on a printing medium and a control unit configured to perform at least one of a user authentication operation, an image forming preparation operation, and an image forming operation according to distance information between a portable electronic device and the image forming apparatus.

30 Claims, 52 Drawing Sheets

FIG.18A

| ADVERTISER | ADV_SIG | ADV_SIG | SCAN_RSP | ADV_SIG |
|---|---|---|---|---|

| SCANNER | SCAN_SIG |
|---|---|

FIG.18B

ADVERTISER         | ADV_SIG |        | CON_RSP |

SCANNER                     | CON_REQ |

FIG.18C

| ADVERTISER | | SLA_DATA | |
|---|---|---|---|
| SCANNER | MAS_DATA | | MAS_DATA |

IMAGE FORMING APPARATUS AND IMAGE FORMING METHOD

CROSS-REFERENCE TO RELATED APPLICATIONS

This application claims the priority benefit of Korean Patent Application No. 10-2014-0080229, filed on Jun. 27, 2014, in the Korean Intellectual Property Office, the disclosure of which is incorporated herein by reference.

BACKGROUND

1. Field

Embodiments of the disclosure relate to an image forming apparatus and an image forming method, and more particularly, to an image forming apparatus and an image forming method, in which an operation may be determined and performed according to a distance between a user and the image forming apparatus.

2. Description of the Related Art

Generally, image forming apparatuses refer to an apparatus capable of printing a certain image on a printing medium such as printing paper. Image forming apparatuses described above include printers, copy machines, and facsimiles, and multifunction peripherals (MFP) formed by integrating functions of some or the entire thereof may be an example of an image forming apparatus.

Image forming apparatuses may include inkjet type image forming apparatuses which eject minute droplets of ink onto a predetermined position on a printing medium and emit light onto the printing medium to print a certain image on the printing medium and electrophotographic image forming apparatuses which supply toner to an electrostatic latent image formed by scanning a photosensitive medium with light and transfer the electrostatic latent image supplied with the toner to a printing medium to print a certain image.

In the case of the image forming apparatuses described above, not only a single user exclusively uses a single image forming apparatus but also a plurality of users commonly share a single image forming apparatus.

As described above, when a plurality of users share a single image forming apparatus, not only confusion may occur among the plurality of users regarding their printed materials but also printed material which needs to be under security (e.g., kept confidential) may be read by the plurality of users.

Particularly, when the plurality of users give a command to print and then do not take the printed material, the printed material may be stacked on an output tray of the single image forming apparatus.

SUMMARY

Therefore, it is an aspect of the disclosure to provide an image forming apparatus and an image forming method in which an image forming preparation operation and an image forming operation are performed according to a distance between a user and the image forming apparatus.

It is another aspect of the disclosure to provide an image forming apparatus and an image forming method in which a user is alerted to unreceived printed material to prevent printed material from being stacked on the image forming apparatus.

It is still another aspect of the disclosure to provide an image forming apparatus and an image forming method in which a user assigns the receipt of printed material to a third party empowered (e.g., authorized) to receive the printed material.

Additional aspects of the disclosure will be set forth in part in the description which follows and, in part, will be apparent from the description, or may be learned by practice of the disclosure.

In accordance with an aspect of the disclosure, an image forming apparatus may include an image forming unit configured to form an image on a printing medium and a control unit (controller) configured to perform at least one of a user authentication operation, an image forming preparation operation, and an image forming operation, according to distance information between a portable electronic device and the image forming apparatus.

The control unit may sequentially perform the user authentication operation, the image forming preparation operation, and the image forming operation when the portable electronic device approaches the image forming apparatus.

The distance information may include information on an area in which the portable electronic device is located, the area among a plurality of areas divided according to a distance between the portable electronic device and the image forming apparatus.

The plurality of areas may include a first area, a second area, and a third area divided according to the distance between the portable electronic device and the image forming apparatus.

When the portable electronic device enters the first area, the control unit may request authentication information of a user from the portable electronic device.

When the authentication information of the user is received from the portable electronic device, the control unit may perform the user authentication operation based on the received authentication information.

When the portable electronic device enters the second area, the control unit may perform the image forming preparation operation.

When the portable electronic device enters the third area, the control unit may perform the image forming operation.

The image forming apparatus may further include a communication unit configured to transmit an advertising signal at a predetermined period.

The advertising signal may include information on the output intensity of the communication unit for outputting the advertising signal and identification of the image forming apparatus.

The image forming apparatus may further include a communication unit (communication interface) configured to receive an advertising signal output by the portable electronic device.

The advertising signal may include information on the output intensity of the portable electronic device for outputting the advertising signal and identification of the portable electronic device.

When the portable electronic device is moved away from the image forming apparatus, the control unit may perform an unreceived printed material warning operation depending on whether the printing medium formed with the image is received.

The control unit may transmit an unreceived printed material warning message to the portable electronic device.

When the portable electronic device is moved away from the image forming apparatus, the control unit may perform a printed material receiving assignment operation depending on whether the printing medium formed with the image is received.

The control unit may transmit a receiving assignment inquiry message to the portable electronic device.

In accordance with an aspect of the disclosure, an image forming method may include calculating distance information between an image forming apparatus and a portable electronic device and performing at least one of a user authentication operation, an image forming preparation operation, and an image forming operation, according to the distance information.

The performing of at least one of the user authentication operation, the image forming preparation operation, and the image forming operation may include sequentially performing the user authentication operation, the image forming preparation operation, and the image forming operation when the portable electronic device approaches the image forming apparatus.

The image forming method may further include, when the portable electronic device is moved away from the image forming apparatus, performing an unreceived printed material warning operation depending on whether the printing medium formed with an image is received.

The image forming method may further include, when the portable electronic device is moved away from the image forming apparatus, performing a printed material receiving assignment operation depending on whether the printing medium formed with an image is received.

The distance information may include information on an area in which the portable electronic device is located, the area among a plurality of areas divided according to a distance between the portable electronic device and the image forming apparatus.

The plurality of areas may include a first area, a second area, and a third area divided according to the distance between the portable electronic device and the image forming apparatus.

When the portable electronic device is located in the first area, the image forming apparatus may perform the user authentication operation with respect to the portable electronic device.

When the portable electronic device is located in the second area, the image forming apparatus may perform the image forming preparation operation.

When the portable electronic device is located in the third area, the image forming apparatus may perform the image forming operation.

BRIEF DESCRIPTION OF THE DRAWINGS

These and/or other aspects of the disclosure will become apparent and more readily appreciated from the following description of the embodiments, taken in conjunction with the accompanying drawings of which:

FIGS. 18A to 18C illustrate communication signals transmitted and received by the image forming apparatus and the portable electronic device according to an embodiment of the disclosure;

DETAILED DESCRIPTION

Figure 1:
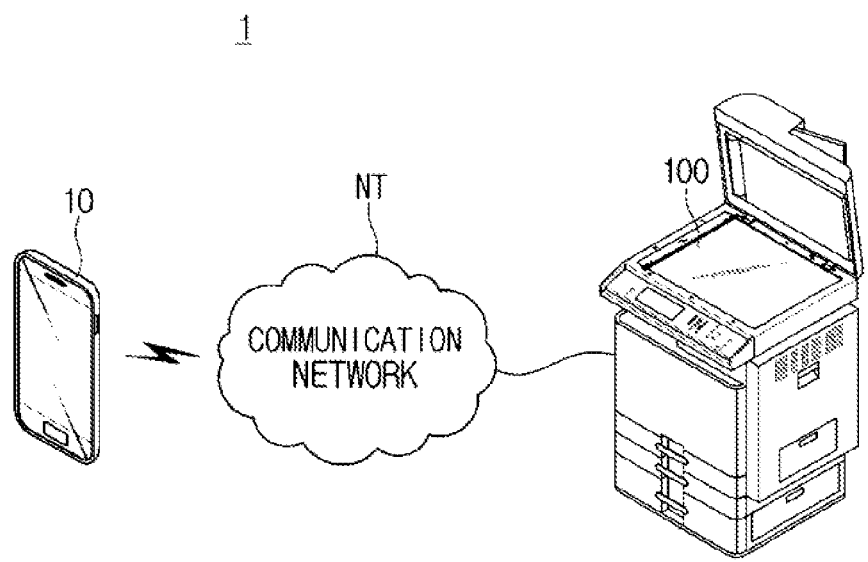
FIG. 1 is a configuration diagram of an image forming system according to an embodiment of the disclosure.

Reference will now be made in detail to embodiments of the disclosure, examples of which are illustrated in the accompanying drawings, wherein like reference numerals refer to like elements throughout.

Hereinafter, an embodiment of the disclosure will be described in detail with reference to the attached drawings.

FIG. 1 is a configuration diagram of an image forming system 1 according to an embodiment of the disclosure.

Referring to FIG. 1, the image forming system 1 may include a portable electronic device 10 and an image forming apparatus 100.

The portable electronic device 10 may display various images to a user and transmit a printing job corresponding to an image displayed according to a print command of the user to the image forming apparatus 100 through a communication network NT.

Here, the printing job may include an image forming command, image data, authentication information which is entered or transmitted by a user (e.g., the user who transmits the image forming command), and identification information of the image forming apparatus 100 which performs an image forming operation.

Also, the authentication information of the user may include identification information of the user, which allows the user to be identified, such as the name of the user, a unique number of the user or a password set by the user. In addition, identification information of the portable electronic device 10 carried by a user may be used as the authentication information of the user.

Identification information of the portable electronic device 10 may include an Internet protocol address (IP address) of the portable electronic device 10, a media access control (MAC) address of the portable electronic device 10, etc.

Identification information of the image forming apparatus 100 may include an IP address of the image forming apparatus 100 and an MAC address of the image forming apparatus 100.

The portable electronic device 10 described above may be a general-purpose computing device which receives a control command input from a user, processes information, and displays the processed information.

For example, the portable electronic device 10 may be one of a smartphone, a cellular phone, a personal digital assistant (PDA), and a wearable device.

Also, in the portable electronic device 10, a word processor application for editing a document and the like, a graphic application for displaying and editing photos, and a browser application for accessing a wide area network (WAN) such as the Internet and displaying information stored in a server connected to the WAN may be installed. Also, in the portable electronic device 10, a printing control application for performing functions of the image forming system 1, which will be described below, may be installed.

The user may execute the application installed in the portable electronic device 10 and may input a print command with respect to a document or an image displayed by the portable electronic device 10 through the application.

When the user inputs the print command, the application related to the image forming system 1 according to an embodiment of the disclosure is executed and the corresponding application performs an operation which will be described below.

Also, the portable electronic device 10 may access the communication network NT through wireless communication for mobility. When the portable electronic device 10 accesses the communication network NT through the wireless communication, the portable electronic device 10 may access the communication network NT directly or through an access point (AP).

Additionally, the portable electronic device 10 may perform communication with the image forming apparatus 100 directly.

Also, during wireless communication with the image forming apparatus 100, the portable electronic device 10 may calculate a distance from the image forming apparatus 100 based on a signal transmitted by the image forming apparatus 100 and may calculate a position (location) of the portable electronic device 10 relative to the image forming apparatus 100.

In detail, the portable electronic device 10 may calculate the distance from the image forming apparatus 100 based on the intensity of receiving a communication signal output by the image forming apparatus 100.

It is generally known that wireless signals (electromagnetic waves) are reduced in inverse proportion to a square of a distance between a transmitter and a receiver. Since an advertising signal corresponds to a wireless signal, the intensity of the advertising signal is reduced in inverse proportion to a square of a distance between the image forming apparatus 100 and the portable electronic device 10.

Accordingly, using a ratio of output intensity of the advertising signal output by the image forming apparatus 100 to receiving intensity of receiving the advertising signal at the portable electronic device 10, the portable electronic device 10 may estimate the distance between the image forming apparatus 100 and the portable electronic device 10.

However, it is not limited to calculating a distance based on receiving intensity of a communication signal. The portable electronic device 10 may calculate the distance from the image forming apparatus 100 based on a response time of the image forming apparatus 100 while communicating with the image forming apparatus 100 directly.

When a printing job is received, the image forming apparatus 100 forms an image corresponding to image data included in the printing job on a printing medium. In addition, when a copy command is input from the user, the image forming apparatus 100 may obtain image data from an original document and form an image corresponding to the obtained image data on a printing medium.

The image forming apparatus 100 may perform communication with the portable electronic device 10 directly.

Also, the image forming apparatus 100 may calculate a distance from the portable electronic device 10 based on a signal transmitted by the portable electronic device 10 and may calculate a position (location) of the portable electronic device 10 relative to the image forming apparatus 100.

Various operations may be performed depending on the distance between the portable electronic device 10 and the image forming apparatus 100.

For example, when the distance from the portable electronic device 10 is a first reference distance, the image forming apparatus 100 may perform user authentication through communication with the portable electronic device 10. When the distance from the portable electronic device 10 is a second reference distance, the image forming apparatus 100 may perform a preliminary operation for forming an image. Also, when the distance from the portable electronic device 10 is a third reference distance, the image forming apparatus 100 may start an image forming operation.

The image forming apparatus 100 described above may include a printer. However, the image forming apparatus 100 is not limited to the printer but may include a multi-function copier which may include all functions of a printer, a scanner, a copy machine, and a facsimile.

Although not shown in the drawings, an image forming server which receives and transfers image data from the communication network NT to the image forming apparatus 100 may be additionally provided.

The image forming server may be connected to the communication network NT, receive image data and an image forming command transmitted by a client of the portable electronic device 10, which will be described below, and transmit the received image data and image forming command to the image forming apparatus 100.

The image forming server described above may be provided separately from the image forming apparatus 100 or may be integrated with the image forming apparatus 100.

Figure 2:
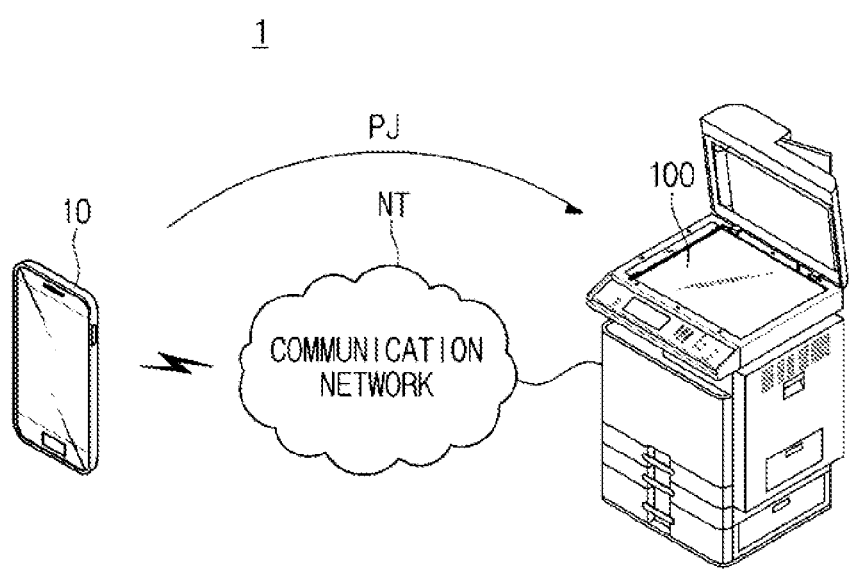
FIG. 2 illustrates a portable electronic device included in the image forming system transmitting a printing job to an image forming apparatus according to an embodiment of the disclosure.

FIG. 2 illustrates the portable electronic device 10 included in the image forming system 1 transmitting a printing job PJ to the image forming apparatus 100 according to an embodiment of the disclosure.

The user may execute an application installed in the portable electronic device 10 and may input a print command with respect to a document or an image displayed by the portable electronic device 10.

When the user inputs the print command, the portable electronic device 10 may generate the printing job PJ which may include image data on the image related to the print command input by the user, authentication information of the user, identification information of the portable electronic device 10, and identification information of the image forming apparatus 100 to perform an image forming operation.

Afterward, the electronic device 10, as shown in FIG. 2, may transmit the printing job PJ to the image forming apparatus 100 through the communication network NT.

The portable electronic device 10 may transmit the printing job PJ through wireless communication. When the printing job PJ is transmitted through the wireless communication, the printing job PJ, as shown in FIG. 2, may be transmitted to the communication network NT. In the communication network NT, the printing job PJ may be transmitted to the image forming apparatus 100 using the identification information of the image forming apparatus 100.

Also, although not shown in the drawings, the portable electronic device 10 may be connected directly to the communication network NT through wired communication. When the portable electronic device 10 is connected to the communication network NT directly, the printing job PJ may be transmitted to the image forming apparatus 100 directly through the communication network NT.

However, the apparatus which transmits the printing job PJ is not limited to the portable electronic device 10. For example, the user may transmit the printing job PJ to print one of a document and an image from a fixed electronic apparatus such as a desktop computer to the image forming apparatus 100. Here, the printing job PJ may be directly transmitted to the image forming apparatus 100 through the network NT or may be transmitted to the image forming apparatus 100 via the image forming server.

Figure 3A:
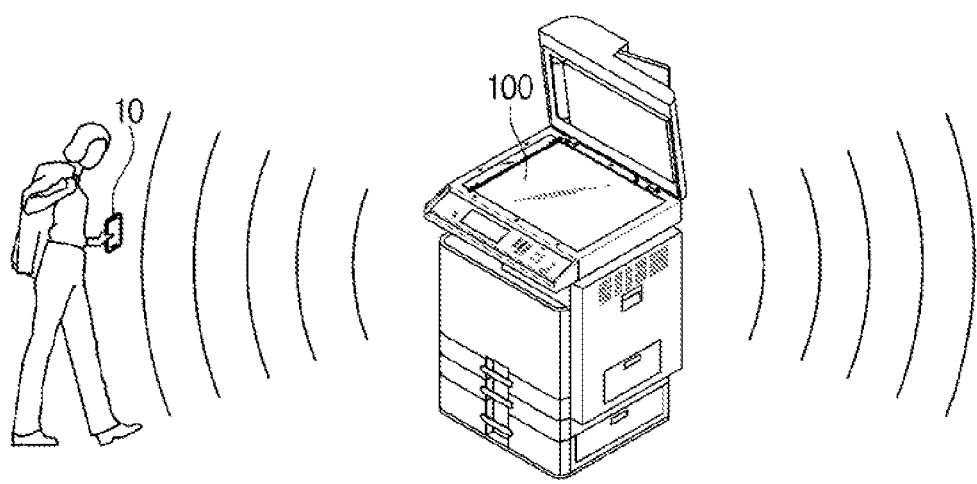
FIGS. 3A to 3C illustrate the image forming apparatus included in the image forming system transmitting an advertising signal according to an embodiment of the disclosure.
Figure 3B:
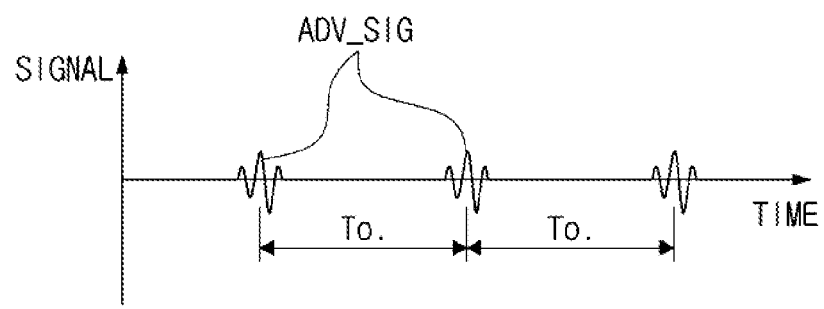
Figure 3C:
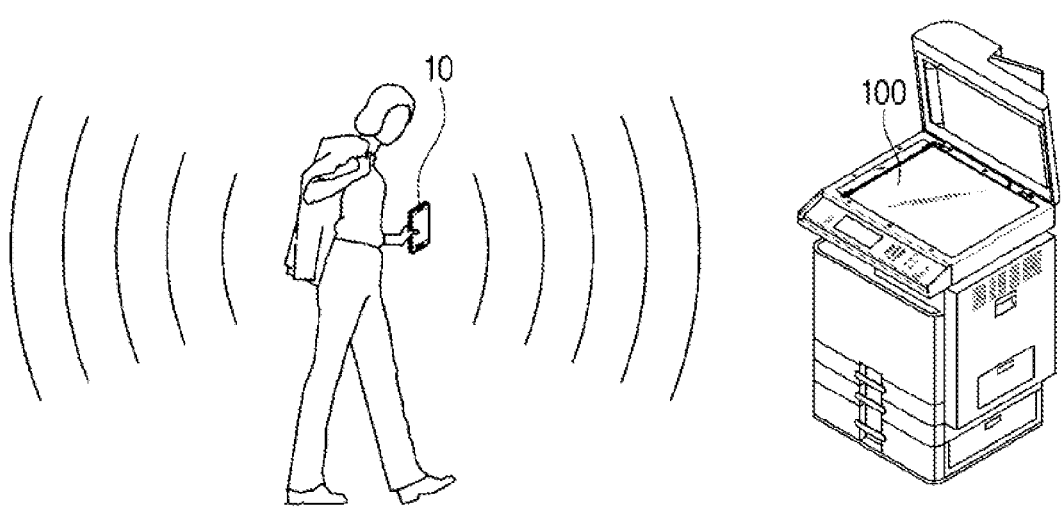

FIGS. 3A to 3C illustrate the image forming apparatus 100 included in the image forming system 1 transmitting the advertising signal ADV_SIG according to an embodiment of the disclosure.

When the printing job PJ is received, the image forming apparatus 100 may output the advertising signal ADV_SIG as shown in FIG. 3A to communicate with the portable electronic device 10.

The advertising signal ADV_SIG, as shown in FIG. 3B, may be transmitted at every predetermined period To. The advertising signal ADV_SIG may include the output intensity of the advertising signal ADV_SIG and identification information of an apparatus which outputs the advertising signal ADV_SIG.

Also, before establishing communication with the image forming apparatus 100, the portable electronic device 10 may determine (confirm) whether a corresponding image forming apparatus is the image forming apparatus 100 which performs the printing job PJ using the advertising signal ADV_SIG and may calculate a distance from the image forming apparatus 100 using the intensity of the advertising signal ADV_SIG.

The image forming apparatus 100 may continuously output the advertising signal ADV_SIG or output the advertising signal ADV_SIG when the printing job PJ is received.

In the image forming system 1 according to an embodiment of the disclosure, the image forming apparatus 100 transmits the advertising signal ADV_SIG and the portable electronic device 10 calculates the distance between the image forming apparatus 100 and the portable electronic device 10 based on the advertising signal ADV_SIG but is not limited thereto.

As shown in FIG. 3C, the portable electronic device 10 may transmit the advertising signal ADV_SIG and the image forming apparatus 100 may calculate the distance between the image forming apparatus 100 and the portable electronic device 10 based on the advertising signal ADV_SIG.

The portable electronic device 10, after transmitting the printing job PJ to the image forming apparatus 100, may transmit the advertising signal ADV_SIG as shown in FIG. 3C.

Also, before establishing communication with the portable electronic device 10, the image forming apparatus 100 may determine whether a corresponding portable electronic device is the portable electronic device 10 which transmits the printing job PJ using the advertising signal ADV_SIG and may calculate a distance from the portable electronic device 10 using the intensity of the advertising signal ADV_SIG.

In addition, it is not fixed that the image forming apparatus 100 transmits the advertising signal ADV_SIG or the portable electronic device 10 transmits the advertising signal ADV_SIG. For example, the image forming apparatus 100 and the portable electronic device 10 may alternatively transmit the advertising signal ADV_SIG. In other words, the image forming apparatus 100 may transmit the advertising signal ADV_SIG at a first time and the portable electronic device 10 may transmit the advertising signal ADV_SIG at a second time.

Figure 4:
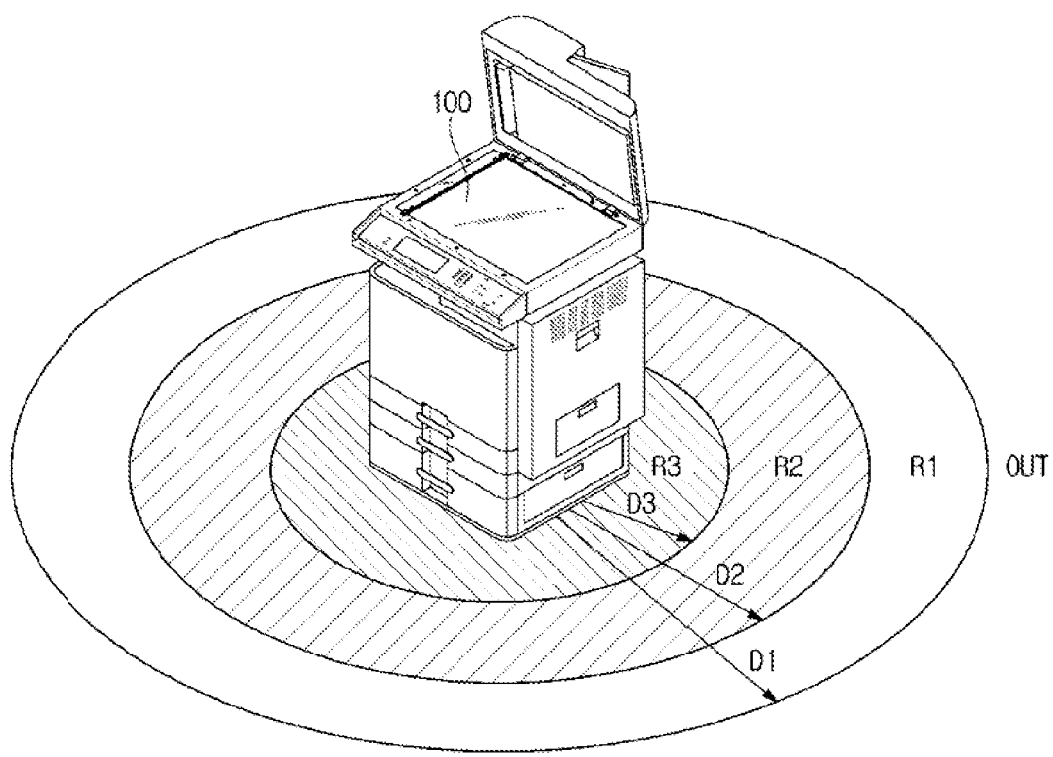
FIG. 4 illustrates a plurality of areas divided according to distances from the image forming apparatus according to an embodiment of the disclosure.

FIG. 4 illustrates a plurality of areas divided according to distances from the image forming apparatus 100 according to an embodiment of the disclosure.

As shown in FIG. 4, the image forming system 1 may divide the periphery of the image forming apparatus 100 into the plurality of areas according to the distances from the image forming apparatus 100. Also, in the image forming system 1, the image forming apparatus 100 may perform various operations according to an area in which the portable electronic device 10 is located.

In detail, an area within a third reference distance D3 from the image forming apparatus 100 may be designated as a third area R3. An area from the third reference distance D3 to a second reference distance D2 from the image forming apparatus 100 may be designated as a second area R2. An area from the second reference distance D2 to a first reference distance D1 from the image forming apparatus 100 may be designated as a first area R1.

Also, an area farther from the image forming apparatus 100 than the first reference distance D1 may be designated as an outer area OUT.

The first, second, and third distances D1, D2, and D3 may vary according to the intensity of the advertising signal ADV_SIG output by the image forming apparatus 100.

For example, when the intensity of the advertising signal ADV_SIG output by the image forming apparatus 100 is about 10 dBm (decibels above about 1 milliwatt), the advertising signal ADV_SIG may be transmitted to about 50 meters. The first reference distance D1, the second reference distance D2, and the third reference distance D3 may be determined as several tens of meters, several meters, and several tens of centimeters, respectively.

Also, when the first, second, and third reference distances D1, D2, and D3 are set, levels of intensity in receiving the advertising signal ADV_SIG, which correspond to the first, second, and third reference distances D1, D2, and D3, may be determined.

In detail, when separated from the image forming apparatus 100 by the first reference distance D1, the intensity of receiving the advertising signal ADV_SIG may be determined as a first reference intensity. When separated from the image forming apparatus 100 by the second reference distance D2, the intensity of receiving the advertising signal ADV_SIG may be determined as a second reference intensity. Also, when separated from the image forming apparatus 100 by the third reference distance D3, the intensity of receiving the advertising signal ADV_SIG may be determined as a third reference intensity.

For example, when the image forming apparatus 100 outputs the advertising signal ADV_SIG and the receiving intensity of the advertising signal ADV_SIG received by the portable electronic device 10 is the first reference intensity or less, the portable electronic device 10 may determine that the portable electronic device 10 is located in the outer area OUT. When the receiving intensity of the advertising signal ADV_SIG received by the portable electronic device 10 is more than the first reference intensity and equal to or less than the second reference intensity, the portable electronic device 10 may determine that the portable electronic device 10 is located in the first area R1.

Also, when the receiving intensity of the advertising signal ADV_SIG received by the portable electronic device 10 is more than the second reference intensity and equal to or less than the third reference intensity, the portable electronic device 10 may determine that the portable electronic device 10 is located in the second area R2. When the receiving intensity of the advertising signal ADV_SIG received by the portable electronic device 10 is more than the third reference intensity, the portable electronic device 10 may determine that the portable electronic device 10 is located in the third area R3.

Also, when the portable electronic device 10 outputs the advertising signal ADV_SIG, according to the intensity of the advertising signal ADV_SIG received by the image forming apparatus 100, the image forming apparatus 100 may determine the area in which the portable electronic device 10 is located to be the area R1, R2, or R3.

In the image forming system 1, a peripheral area of the image forming apparatus 100 is divided into the first, second, and third areas R1, R2, and R3 according to a distance between the user and the image forming apparatus 100, which is merely an example but is not limited thereto. For example, the peripheral area of the image forming apparatus 100 may be divided into two areas or four or more areas according to the distance between the user and the image forming apparatus 100.

Figure 5:
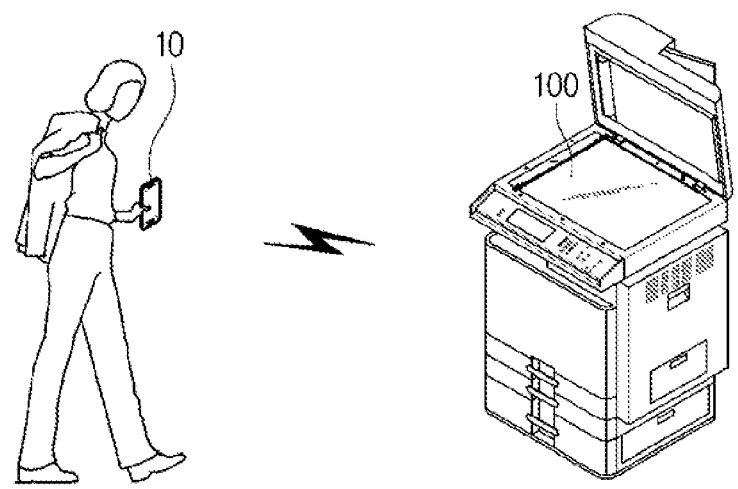
FIG. 5 illustrates the portable electronic device in communication with the image forming apparatus included in the image forming system according to an embodiment of the disclosure.

FIG. 5 illustrates the portable electronic device 10 in communication with the image forming apparatus 100 included in the image forming system 1 according to an embodiment of the disclosure.

When the image forming apparatus 100 outputs the advertising signal ADV_SIG, the portable electronic device 10 determines whether the image forming apparatus 100 which outputs the advertising signal ADV_SIG is an image forming apparatus (i.e., the same image forming apparatus) which will perform the printing job PJ based on the identification information of the image forming apparatus 100 included in the advertising signal ADV_SIG.

Also, the portable electronic device 10 compares the output intensity of the advertising signal ADV_SIG included in the advertising signal ADV_SIG with the receiving intensity of the advertising signal ADV_SIG received by the portable electronic device 10 and calculates a distance between the image forming apparatus 100 which outputs the advertising signal ADV_SIG and the portable electronic device 10.

When the image forming apparatus 100 which outputs the advertising signal ADV_SIG is the image forming apparatus 100 to perform the printing job PJ, the portable electronic device 10 requests communication with the image forming apparatus 100.

Also, when the portable electronic device 10 outputs the advertising signal ADV_SIG, the image forming apparatus 100 may determine whether the portable electronic device 10 which outputs the advertising signal ADV_SIG is the (same) portable electronic device 10 which transmits the printing job PJ based on the identification information of the portable electronic device 10 included in the advertising signal ADV_SIG.

When the portable electronic device 10 which outputs the advertising signal ADV_SIG is the portable electronic device 10 which transmits the printing job PJ, the image forming apparatus 100 may request communication with the portable electronic device 10.

As shown in FIG. 5, when the portable electronic device 10 is in communication with the image forming apparatus 100, the image forming apparatus 100 may perform operations such as user authentication, preparation for an image forming operation, and the initiation of the image forming operation according to distance information.

Here, the user authentication refers to an operation of comparing user identification which may be included in the printing job PJ with user identification information received from the portable electronic device 10. In detail, the user authentication may refer to an operation of checking whether the user who is carrying the portable electronic device 10 is a user who transmits an image forming command.

Figure 6:
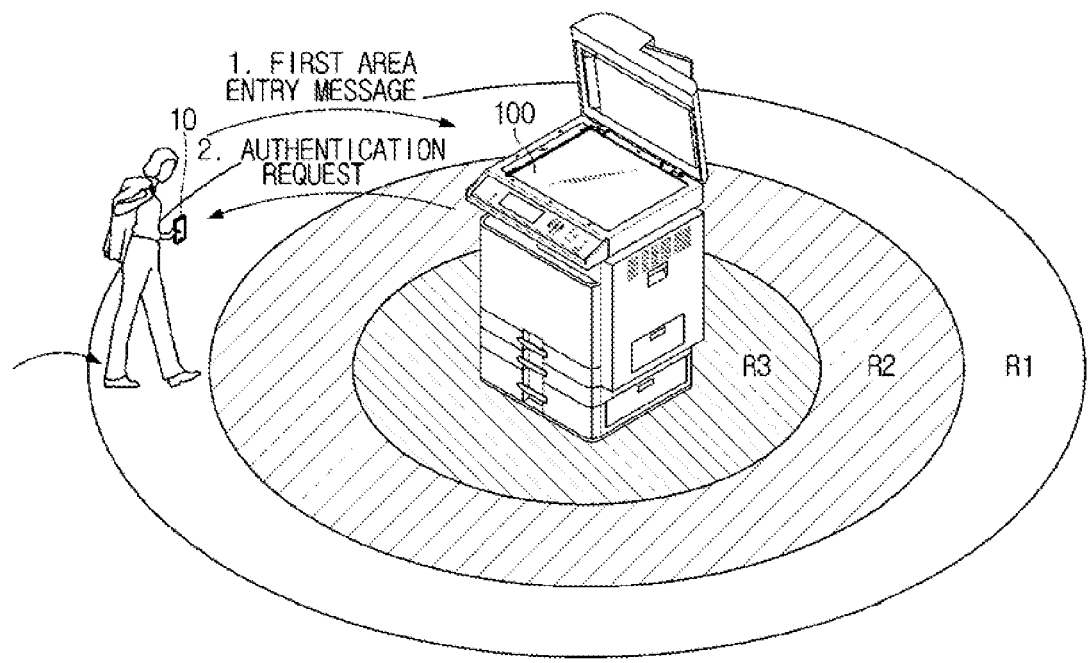
FIGS. 6 to 8 illustrate an operation of the image forming system while a user is approaching the image forming apparatus according to an embodiment of the disclosure.
Figure 7:
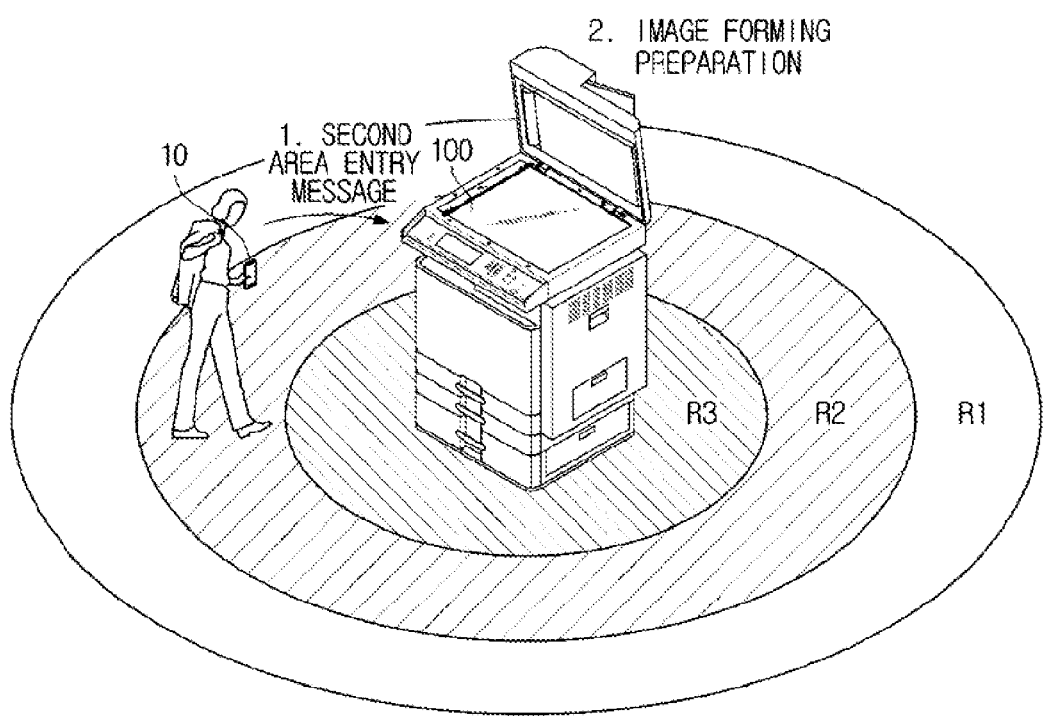
Figure 8:
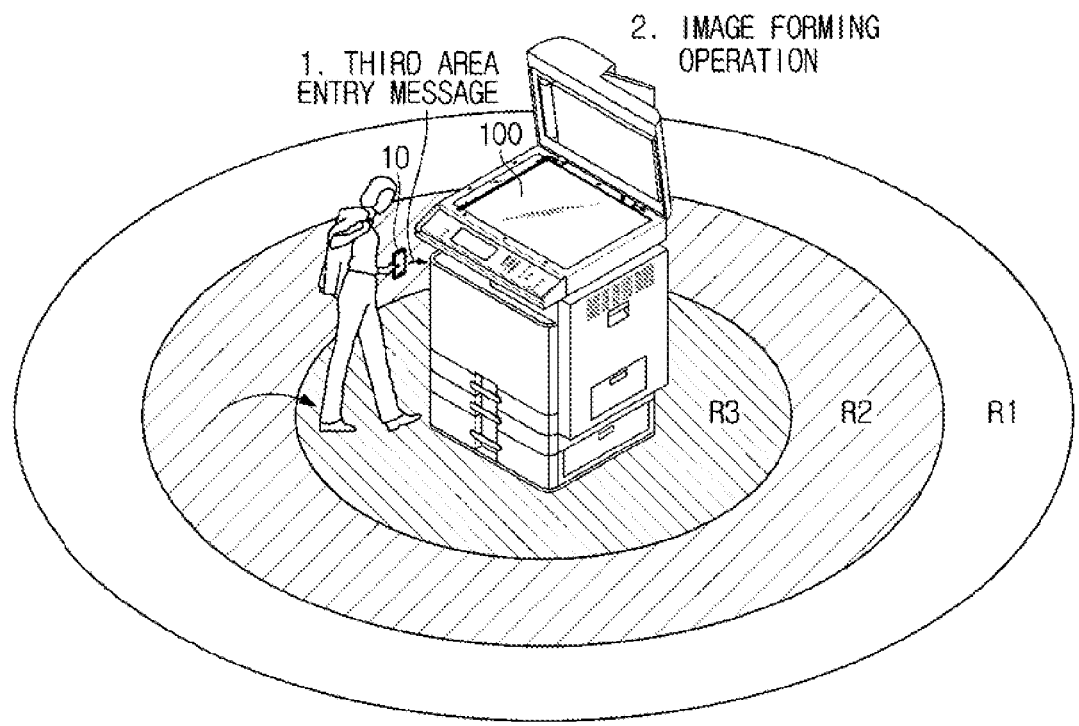

FIGS. 6 to 8 illustrate an operation of the image forming system 1 while the user is approaching the image forming apparatus 100 according to an embodiment of the disclosure.

For understanding, hereinafter, in the description, it will be assumed that the image forming apparatus 100 outputs the advertising signal ADV_SIG and the portable electronic device 10 determines (calculates) the distance between the image forming apparatus 100 and the portable electronic device 10 based on the receiving intensity of the advertising signal ADV_SIG.

As shown in FIGS. 6 to 8, while the user is approaching the image forming apparatus 100, the image forming system 1 may sequentially perform a user authentication operation, an image forming preparation operation, and an image forming operation.

In detail, when it is determined based on the advertising signal ADV_SIG that the user has entered the first area R1, as shown in FIG. 6, the portable electronic device 10 may transmit a first area entry message to the image forming apparatus 100 and the image forming apparatus 100 requests user authentication information from the portable electronic device 10 and performs the user authentication operation based on the user authentication information received from the portable electronic device 10.

Also, when it is determined that the user has entered the second area R2, as shown in FIG. 7, the portable electronic device 10 transmits a second area entry message to the image forming apparatus 100 and the image forming apparatus 100 performs the image forming preparation operation to perform the image forming operation.

Also, when it is determined that the user has entered the third area R3, as shown in FIG. 8, the portable electronic device 10 transmits a third area entry message to the image forming apparatus 100 and the image forming apparatus 100 performs the image forming operation.

Figure 9:
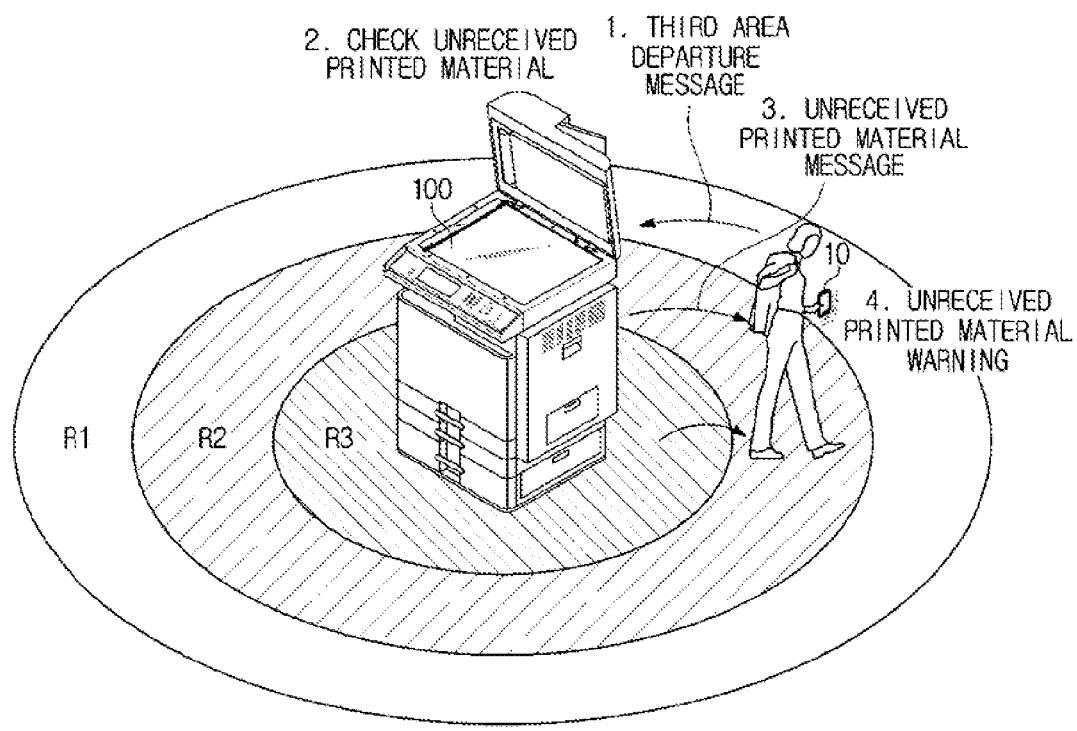
FIGS. 9 to 10 illustrate an operation of the image forming system while the user is moving away from the image forming apparatus according to an embodiment of the disclosure.
Figure 10:
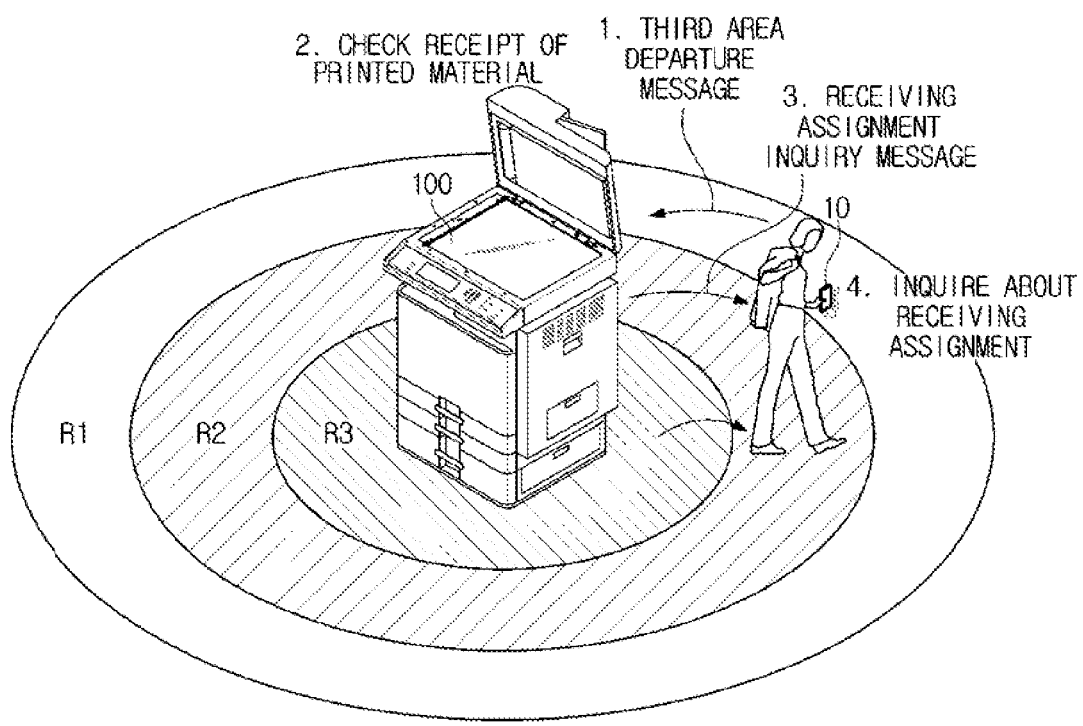

FIGS. 9 to 10 illustrate an operation of the image forming system 1 while the user is moving away from the image forming apparatus 100 according to an embodiment of the disclosure.

As shown in FIGS. 9 and 10, while the user is moving away from the image forming apparatus 100, the image forming system 1 may alert the user about unreceived printed material or may contact the user about whether to assign the receipt of printed material.

In detail, when it is determined based on the advertising signal ADV_SIG that the user has left the third area R3, as shown in FIG. 9, the portable electronic device 10 may transmit a third area departure message to the image forming apparatus 100 and the image forming apparatus 100 may check whether the user has received the printed material and then may transmit an unreceived printed material warning message to the portable electronic device 10. Afterward, the portable electronic device 10 may alert the user about the unreceived printed material through various methods (e.g., vibration of the portable electronic device 10, an audible alert, a visual alert, etc.).

Also, when the third area departure message is received, as shown in FIG. 10, the image forming apparatus 100 may check whether the user has received the printed material and then may transmit a receiving assignment inquiry message to the portable electronic device 10. Afterward, the portable electronic device 10 may contact the user about whether to assign the receipt of the printed material to a third party.

As described above, in the image forming system 1, the image forming apparatus 100 and the portable electronic device 10 may perform various operations depending on one of the distance between the user and the image forming apparatus 100 and the position or location of the user based on the image forming apparatus 100.

Hereinafter, a detailed configuration of the image forming apparatus 100 and the portable electronic device 10 included in the image forming system 1 will be described.

Figure 11:
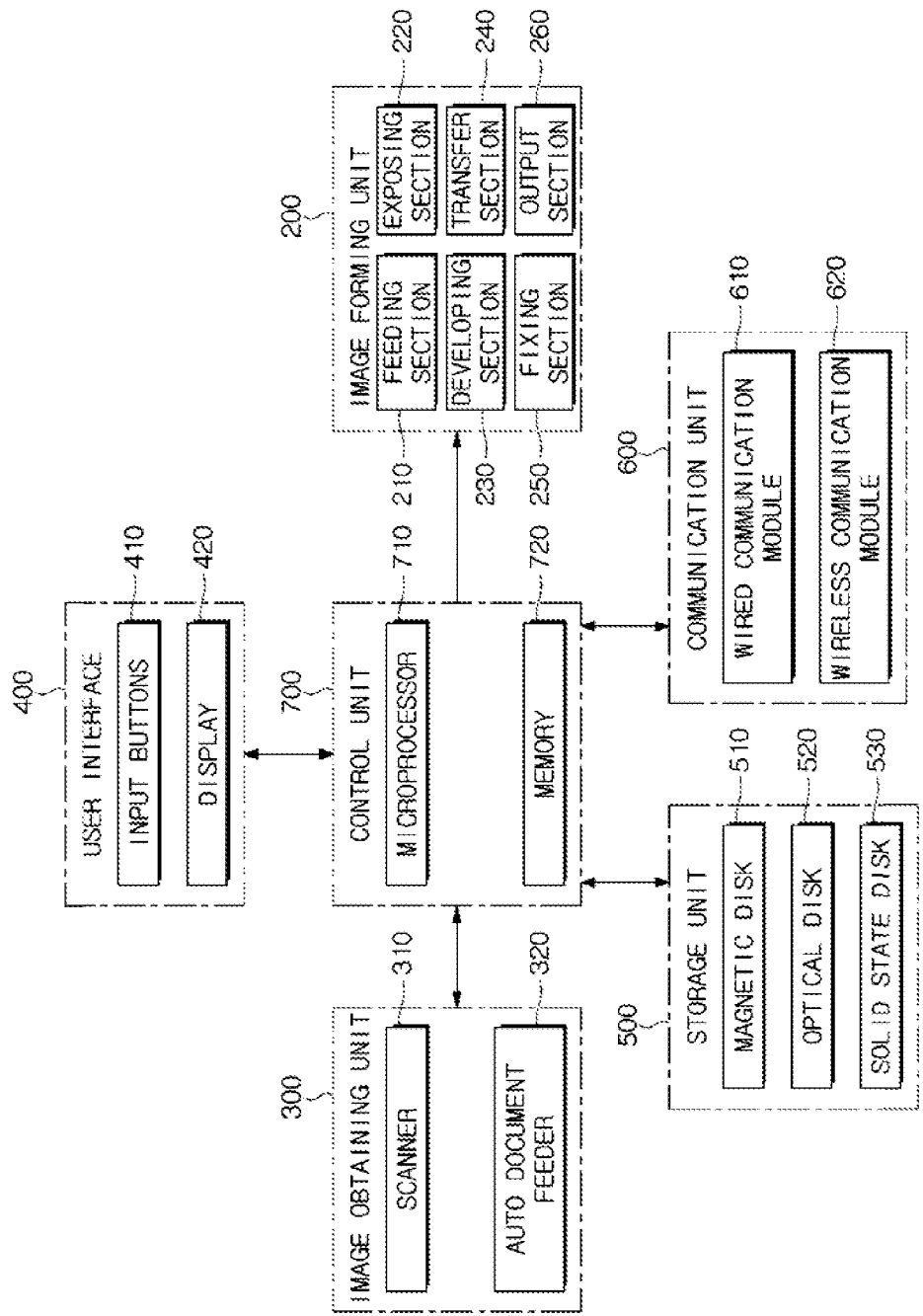
FIG. 11 is a configuration diagram of the image forming apparatus according to an embodiment of the disclosure.
Figure 12:
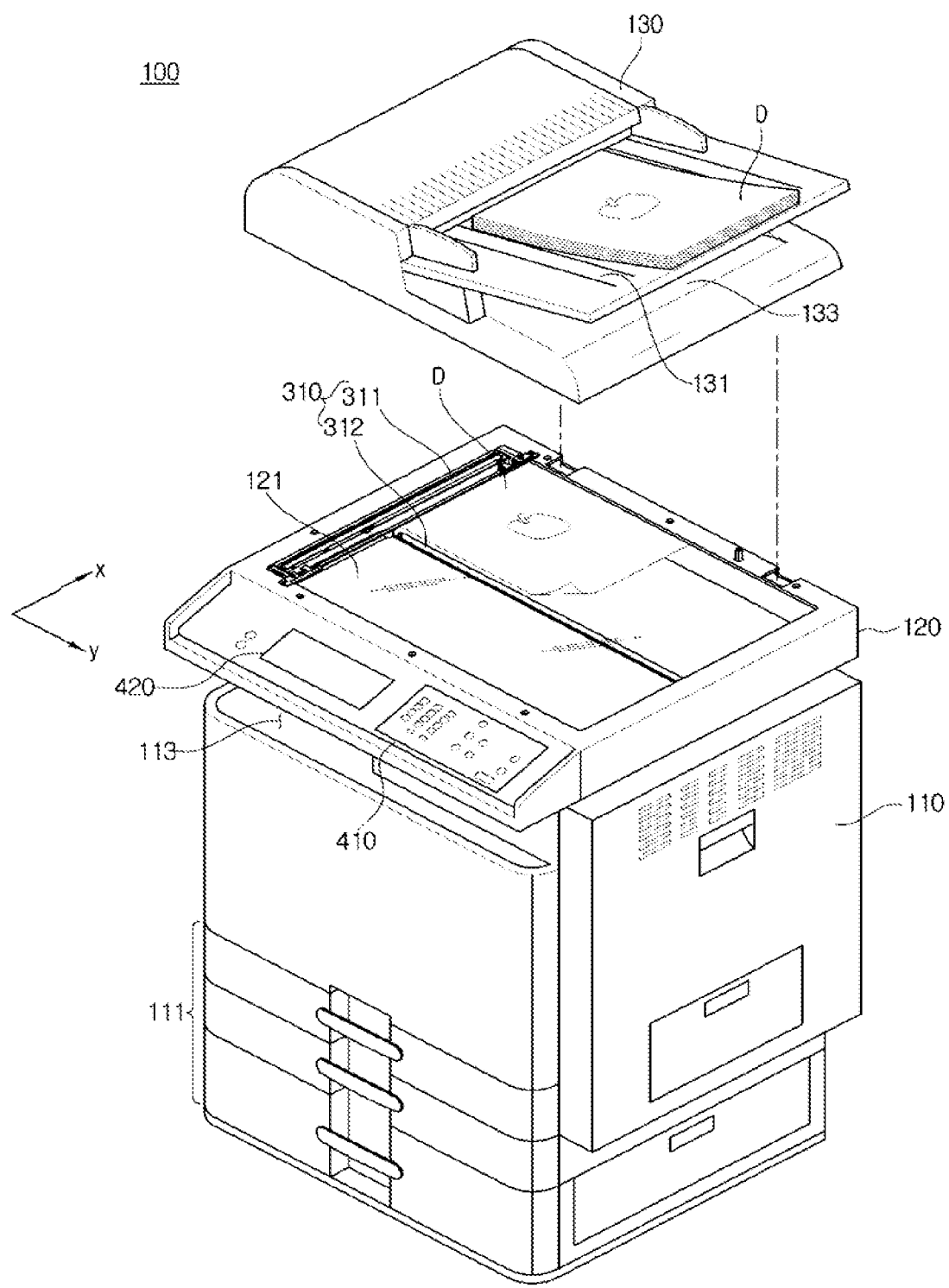
FIG. 12 illustrates an exterior of the image forming apparatus according to an embodiment of the disclosure.
Figure 13:
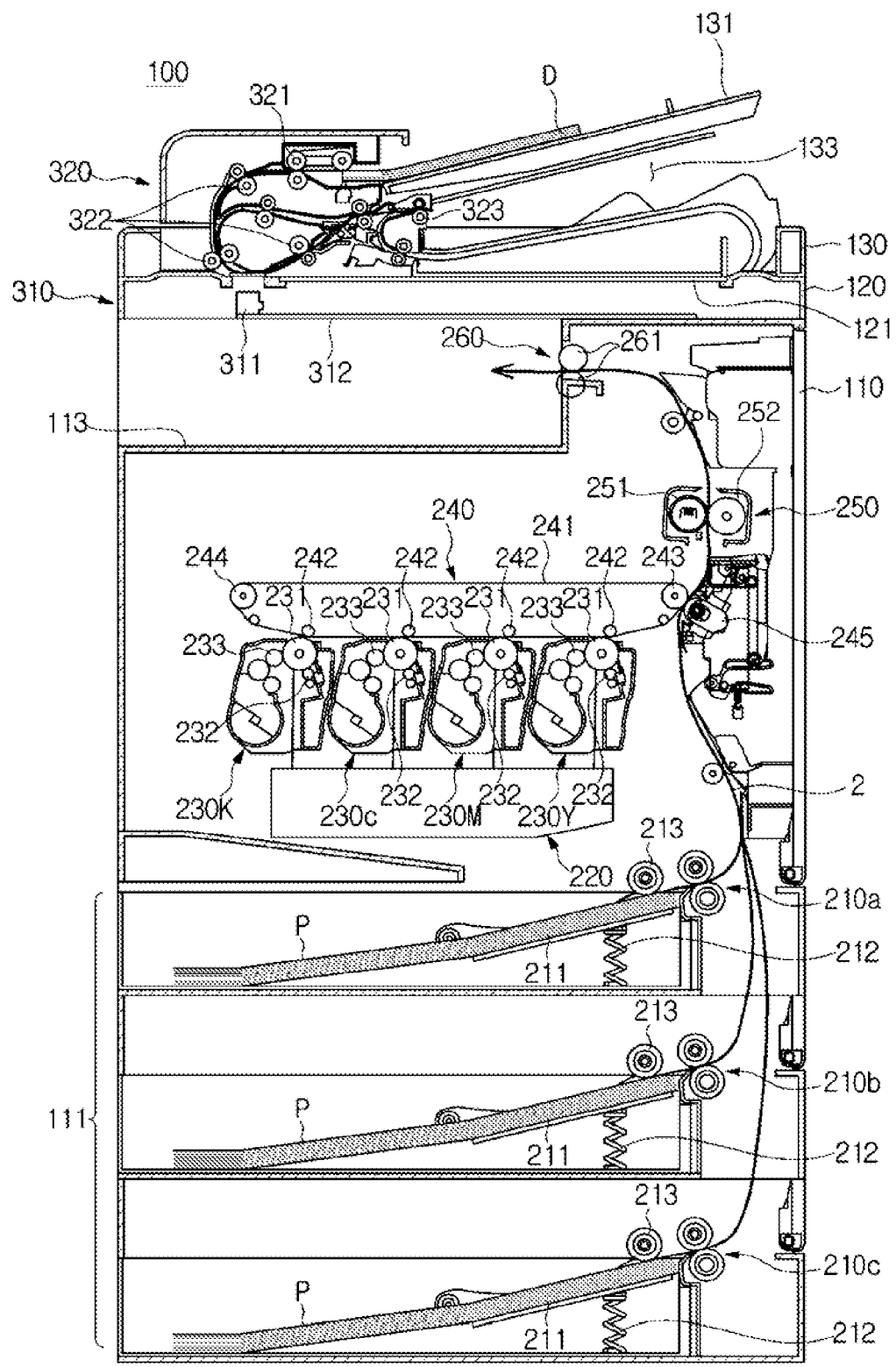
FIG. 13 is a side cross-sectional view of the image forming apparatus according to an embodiment of the disclosure.

FIG. 11 is a configuration diagram of the image forming apparatus 100 according to an embodiment of the disclosure. FIG. 12 illustrates an exterior of the image forming apparatus 100 according to an embodiment of the disclosure. FIG. 13 is a side cross-sectional view of the image forming apparatus 100 according to an embodiment of the disclosure.

Referring to FIGS. 11 to 13, the image forming apparatus 100 may include an image forming unit 200 which forms an image on a recording medium P, an image obtaining unit 300 which obtains an image of a document D, a user interface 400 which interacts with the user, a storage unit 500 which stores a program and data, a communication unit 600 which communicates with the portable electronic device 10 and the like, and a control unit 700 which controls the operation of the image forming apparatus 100.

The image forming unit 200 may form an image on the recording medium P according to image data and may be provided inside a main body 110 which forms a main exterior of the image forming apparatus 100. The image forming unit 200 may pick up the recording medium P stored in a paper tray 111, may form an image on the picked up recording medium P, and then may discharge the recording medium P on which the image is formed toward an output tray 113.

Also, the image forming unit 200 may include a feeding section 210 comprising a plurality of feeding sections 210a to 210c, an exposing section 220, a developing section 230, a transfer section 240, a fixing section 250, and an output section 260.

The feeding section 210 picks up the recording medium P from a plurality of paper trays 111 which store the recording media P and transports the recording medium P to the transfer section 240 via path 2.

The feeding section 210 may include a pickup plate 211 on which the recording media P are stacked, a pickup spring 212 which elastically supports the pickup plate 211, and a pickup roller 213 which picks up the recording media P stacked on the pickup plate 211 one by one.

The exposing section 220 emits light corresponding to one of the image of the document D obtained by the image obtaining unit 300 and an image received through the communication unit 600. The exposing section 220 described above may include one of a laser scanning unit (LSU) and a light emitting diode (LED) print head (LPH).

The LSU may include a light source which emits light and a reflector rotated by a motor. The light emitted from the light source is reflected by the reflector, thereby radiating the light toward a photosensitive drum 231.

The LPH may include an LED array. Each of the LEDs included in the LED array may radiate light directly.

The developing section 230 develops an electrostatic latent image formed by the exposing section using toner.

The developing section 230 may include a first developer 230K which develops an electrostatic latent image using black toner, a second developer 230C which develops an electrostatic latent image using cyan toner, a third developer 230M which develops an electrostatic latent image using magenta toner, and a fourth developer 230Y which develops an electrostatic latent image using yellow toner.

The respective developers 230K, 230C, 230M, and 230Y may include photosensitive drums 231 on which an electrostatic latent image is formed by light, charging rollers 232 which charge an outer surface of the photosensitive drum 231, and developing rollers 233 which develop an electrostatic latent image using toner.

To briefly describe a developing process according to the rotation of the photosensitive drum 231, the charging roller 222 charges the outer surface of the photosensitive drum 231.

Next, the light emitted by the exposing section 220 is emitted toward the outer surface of the photosensitive drum 231. On the outer surface of the photosensitive drum 231, to which a photoconductive material is applied, an electrostatic latent image is formed by the light emitted from the exposing section 220.

Afterward, charged toner is supplied to the outer surface of the photosensitive drum 231 by the developing roller 233. As a result thereof, the charged toner is attached to the electrostatic latent image formed on the outer surface of the photosensitive drum 231, and the electrostatic latent image on the outer surface of the photosensitive drum 231 is developed. In other words, an image is formed by the toner on the outer surface of the photosensitive drum 231.

The transfer section 240 transfers the toner image to the recording medium P transported by the feeding section 210.

The transfer section 240 may include a transfer belt 241 which transfers the toner image of the photosensitive drum 231 to the recording medium P, a first transfer roller 242 which transfers the toner image formed on the photosensitive drum 231 to the transfer belt 241, a drive roller 243 which rotates the transfer belt 241, a tension roller 244 which maintains tension of the transfer belt 241, and a second transfer roller 245 which transfers the toner image transferred to the transfer belt 241 to the recording medium P.

To briefly describe a transfer process according to the rotation of the transfer belt 241, a black toner image is transferred from the first developer 230K to the transfer belt 241.

In a color mode, a cyan toner image is transferred from the second developer 230C to the transfer belt 241, a magenta toner image is transferred from the third developer 230M to the transfer belt 241, and a yellow toner image is transferred from the fourth developer 230Y to the transfer belt 241. The black toner image, the magenta toner image, the cyan toner image, and the yellow toner image are combined, thereby forming a chromatic color toner image on the transfer belt 241. Afterward, the chromatic color toner image is transferred to the recording medium P by the second transfer roller 245.

In a black-and-white mode, a black toner image is transferred from the first developer 230K to the recording medium P by the second transfer roller 245.

The fixing section 250 fixes a toner image transferred to the recording medium P using heat and pressure and may include a heating roller 251 which heats the recording medium P to which the toner image is transferred and a pressurizing roller 252 which pressurizes the recording medium P to which the toner image is transferred.

The output section 260 may include an output roller 261 which discharges the recording medium P to which the toner image is fixed toward the output tray 113 formed on an upper portion of the main body 110.

The image obtaining unit 300 may include a scanner 310 which obtains a two-dimensional image of the document D.

The scanner 310 may be provided in a sub-body 120 provided above the main body 110. In detail, a flatbed 121 formed of a transparent material may be provided on a top surface of the sub-body 120. The scanner 310 may obtain an image of the document D located on the flatbed 121.

The scanner 310 may include a photo sensor module 311 which emits light toward the document D and receives light reflected by the document D while linearly moving and a guide rail 312 which guides the linear movement of the photo sensor module 311.

For example, the photo sensor module 311 may extend in a direction of x axis, and the guide rail 312 may extend in a direction of y axis. The photo sensor module 311 which extends in the direction of x axis moves along the guide rail 312 which extends in the direction of y axis, thereby allowing the scanner 310 to obtain a two-dimensional image of the document D.

The image obtaining unit 300 may include an auto document feeder (ADF) 320 which automatically supplies the document D to the scanner 310.

The ADF 320 may be provided inside a flatbed cover 130 which covers the flatbed 121 of the sub-body 120. In detail, the ADF 320 may pick up the document D stored in a document tray 131, may expose the picked up document D to the photo sensor module 311 of the scanner 310, and may discharge the document D to a document discharge tray 133.

The ADF 320 may include a document pickup roller 321 which picks up the document D located on the document tray 131, a document transportation roller 322 which transports the picked up document D toward the scanner 310, and a document discharge roller 323 which discharges the document after an image thereof is obtained.

When the document D is inserted into the ADF 320 and an image of the document D is obtained, the photo sensor module 311 does not move along the guide rail 312. That is, while the document D is being transported by the document transportation roller 322, since the image of the document D is exposed to the photo sensor module 311 of the scanner 310, the photo sensor module 311 may obtain a two-dimensional image of the document D without moving.

The user interface 400 may include input buttons 410 which receive a control command of the user and a display 420 which displays operation information of the image forming apparatus 100.

For example, the input buttons 410 may include a power button for supplying or cutting off power, operation buttons for performing copying or scanning, and numerical keys for inputting numbers.

The input buttons 410 described above may employ microswitches, membrane switches, or touch switches.

The display 420 may employ one or more of a liquid crystal display (LCD) panel, an LED panel, an organic LED (OLED) panel, etc.

Also, according to some embodiments, the display 420 may include a touch screen panel (TSP) which may sense a touch of a part of a human body of the user and may detect contact coordinates.

For example, the TSP may include a touch pad which senses a touch of the user on a panel of a display such as an LCD panel and an OLED panel.

When a touch of the user is sensed, the TSP described above detects coordinates of a contact, in which the touch is sensed, and determines a control command corresponding to the detected coordinates.

The storage unit 500 stores a program and data for controlling the image forming apparatus 100. The storage unit 500 described above may include one or more of a magnetic disk 510, an optical disk 520, and a solid state disk 530.

The communication unit 600 performs communication with an external device such as the portable electronic device 10 through the communication network NT or performs communication with the external device such as the portable electronic device 10 directly.

The communication unit 600 may include a wired communication module 610 which communicates with an external device through a communication line and a wireless communication module 620 which communicates with an external device through electromagnetic waves without a communication line.

The wired communication module 610 accesses the communication network NT through the communication line.

In detail, the wired communication module 610 may include a local area network (LAN) communication module which connects a plurality of terminals in a limited region and a WAN communication module which connects a plurality of unspecified terminals.

The wireless communication module 620 may include one or more of a wireless fidelity (Wi-Fi) communication module, a Bluetooth communication module, a near field communication (NFC) module, and a Zigbee communication module.

The Wi-Fi communication module is generally used for communication between a radio repeater and a terminal for forming a LAN, and the Bluetooth communication module is generally used for low power communication between terminals. Also, the NFC module is generally used for an ultra close range of about 10 cm or less to improve security and the Zigbee communication module is used for forming a low power communication network among a plurality of terminals.

The wireless communication module 620 described above may output the advertising signal ADV_SIG and communicate with the portable electronic device 10 directly when a connecting request is received from the portable electronic device 10 while outputting the advertising signal ADV_SIG. Additionally, the wireless communication module 620 may receive the advertising signal ADV_SIG, transmit a connecting request to the portable electronic device 10, and communicate with the portable electronic device 10 directly.

A detailed operation of the wireless communication module 620 of the image forming apparatus 100 will be described below.

The control unit 700 collectively controls the operation of the image forming apparatus 100.

The control unit 700 described above may include a memory 720 which temporarily stores a program and data for controlling the operation of the image forming apparatus 100 and a microprocessor 710 which processes data according to the program stored in the memory 720.

Also, the control unit 700 may recognize the control command of the user input through the user interface 400 and may control the user interface 400 to display operation information according to the operation of the image forming apparatus 100.

Also, the control unit 700 may control the image obtaining unit 300 to obtain image data on the document D according to the control command of the user and may control the image forming unit 200 to form an image corresponding to the obtained image data on the recording medium P.

Also, the control unit 700 may manage data stored in the storage unit 500 and may control the communication unit 600 to communicate with an external device. Particularly, the control unit 700 may control the wireless communication module 620 to output the advertising signal ADV_SIG at a predetermined period or control the wireless communication module 620 to receive the advertising signal ADV_SIG output by the portable electronic device 10.

When the advertising signal ADV_SIG is received, the control unit 700 may calculate a distance between the image forming apparatus 100 and the portable electronic device 10 based on the intensity of the advertising signal ADV_SIG output by the portable electronic device 10 and may control the image forming unit 200 to perform one of an image forming preparation operation and an image forming operation according to the calculated distance.

Also, the control unit 700 may control the image forming unit 200 to form an image corresponding to image data received through the communication unit 600 on the recording medium P according to a printing job received through the communication unit 600.

As described above, the configuration of the image forming apparatus 100 has been described.

Hereinafter, a configuration of the portable electronic device 10 will be described.

Figure 14:
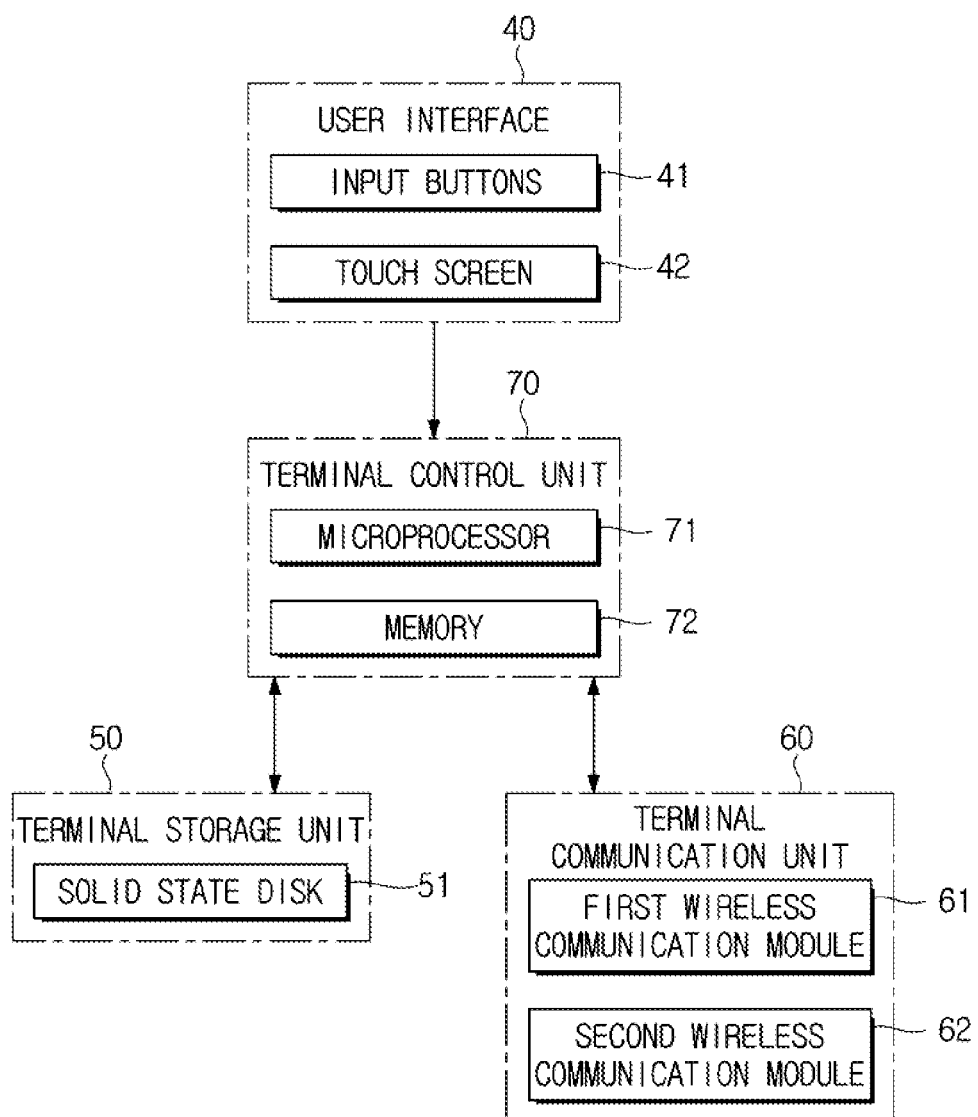
FIG. 14 is a configuration diagram of the portable electronic device according to an embodiment of the disclosure.
Figure 15:
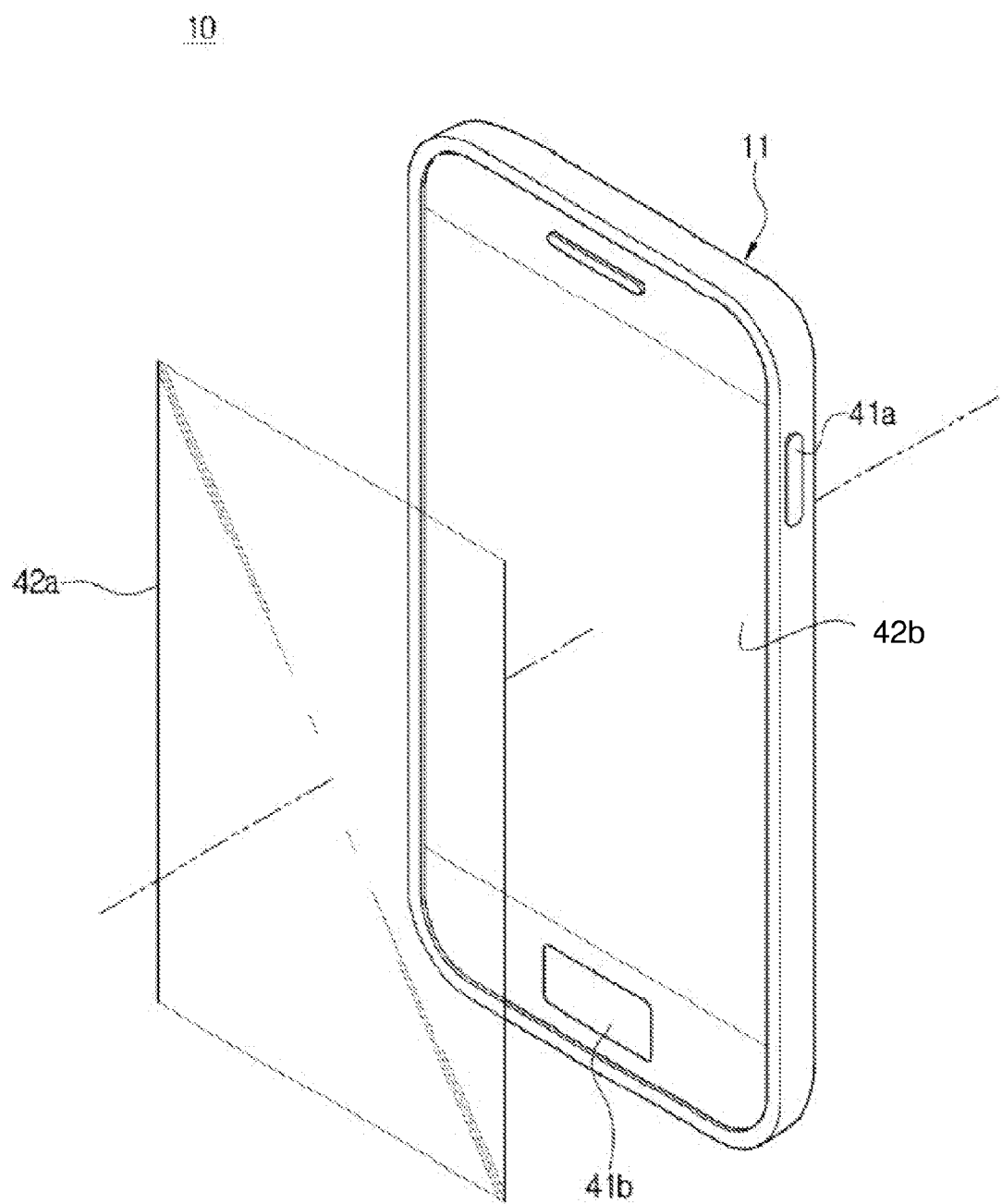
FIG. 15 illustrates an exterior of the portable electronic device according to an embodiment of the disclosure.

FIG. 14 is a configuration diagram of the portable electronic device 10 according to an embodiment of the disclosure. FIG. 15 illustrates an exterior of the portable electronic device 10 according to an embodiment of the disclosure.

Referring to FIGS. 14 and 15, the portable electronic device 10 may include an outer frame 11, a terminal interface 40, a terminal storage unit 50, a terminal communication unit 60, and a terminal control unit 70.

The terminal interface 40 may include input buttons 41 which receive a control command of the user and a touch screen 42 which displays operation information according to the control command of the user.

The input buttons 41 may include a power button 41a which supplies or cuts off power and a home button 41b which stops or exits an operation of an application being executed by the portable electronic device 10.

The input buttons 41 described above may employ microswitches, membrane switches, or touch switches.

The touch screen 42 may include a touch panel 42a which detects contact coordinates of the user and receives a control command according to the detected contact coordinates and a display 42b which displays information corresponding to the received control command.

The touch panel 42a may employ one of a capacitance type touch panel and a resistive film type touch panel. The display 42b may employ one of an LED panel, an LED panel, and an OLED panel.

The terminal storage unit 50 stores a control program and control data for controlling the operation of the portable electronic device 10.

Particularly, the terminal storage unit 50 may include a solid state disk 51 rather than a magnetic disk and an optical disk for mobility and portability.

The terminal communication unit 60 may include a first wireless communication module 61 for performing wireless communication with an external device located at a long distance of several hundred meters or more and a second wireless communication module 62 for performing wireless communication with an external device located in a local area within several tens of meters.

The first wireless communication module 61 may perform the wireless communication with the external device at a long distance through a communication method such as time division multiple access (TDMA), code division multiple access (CDMA), wide code division multiple access (WCDMA), wireless broadband (Wibro), world interoperability for microwave access (WiMAX), and long term evolution (LTE).

The second wireless communication module 62 may include one or more of a Wi-Fi communication module, a Bluetooth communication module, an NFC module, and a Zigbee communication module.

The Wi-Fi communication module is generally used for communication between a radio repeater and a terminal for forming a LAN, and the Bluetooth communication module is generally used for low power communication between terminals. Also, the NFC module is generally used for an ultra close range of about 10 cm or less to improve security and the Zigbee communication module is used for forming a low power communication network among a plurality of terminals.

The second wireless communication module 62 described above may receive the advertising signal ADV_SIG, transmit a connecting request to the image forming apparatus 100, and communicate with the image forming apparatus 100 directly. In addition, the second wireless communication module 62 may output the advertising signal ADV_SIG and communicate with the image forming apparatus 100 directly when the connecting request is received from the image forming apparatus 100 while outputting the advertising signal ADV_SIG.

A detailed operation of the second wireless communication module 62 of the portable electronic device 10 will be described below.

The terminal control unit 70 collectively controls the portable electronic device 10.

The terminal control unit 70 described above may include a memory 72 which temporarily stores a program and data for controlling the operation of the portable electronic device 10 and a microprocessor 71 which processes data according to the program stored in the memory 72.

Also, the terminal control unit 70 may recognize a control command of the user input through the terminal interface 40 and may control the terminal interface 40 to display operation information corresponding to the control command.

Also, the terminal control unit 70 may execute an application when an execution command of which is input by the user and may control the terminal interface 40 to display information indicated by the executed application.

Also, when the user inputs a print command, the terminal control unit 70 generates a printing job which may include image data corresponding to an image to be printed, user authentication information, identification information of the portable electronic device 10, and identification information of the image forming apparatus 100. Also, the terminal control unit 70 controls the terminal communication unit 60 to transmit the generated printing job to the image forming apparatus 100.

Also, the terminal control unit 70 may control the terminal communication unit 60 to output the advertising signal ADV_SIG at a predetermined period or may control the terminal communication unit 60 to receive the advertising signal ADV_SIG output by the image forming apparatus 100.

When the advertising signal ADV_SIG is received, the terminal control unit 70 calculates a distance between the image forming apparatus 100 and the portable electronic device 10 based on the intensity of the advertising signal ADV_SIG. Afterward, when the distance between image forming apparatus 100 and the portable electronic device 10 corresponds to one of a first reference distance, a second reference distance, and a third reference distance which are predetermined, the terminal control unit 70 controls the terminal communication unit 60 to request communication from the image forming apparatus 100 and may control the terminal communication unit 60 to transmit distance information between the image forming apparatus 100 and the portable electronic device 10.

Hereinafter, detailed operations of the wireless communication module 620 included in the image forming apparatus 100 and the second wireless communication module 62 of the portable electronic device 10 will be described.

Figure 16:
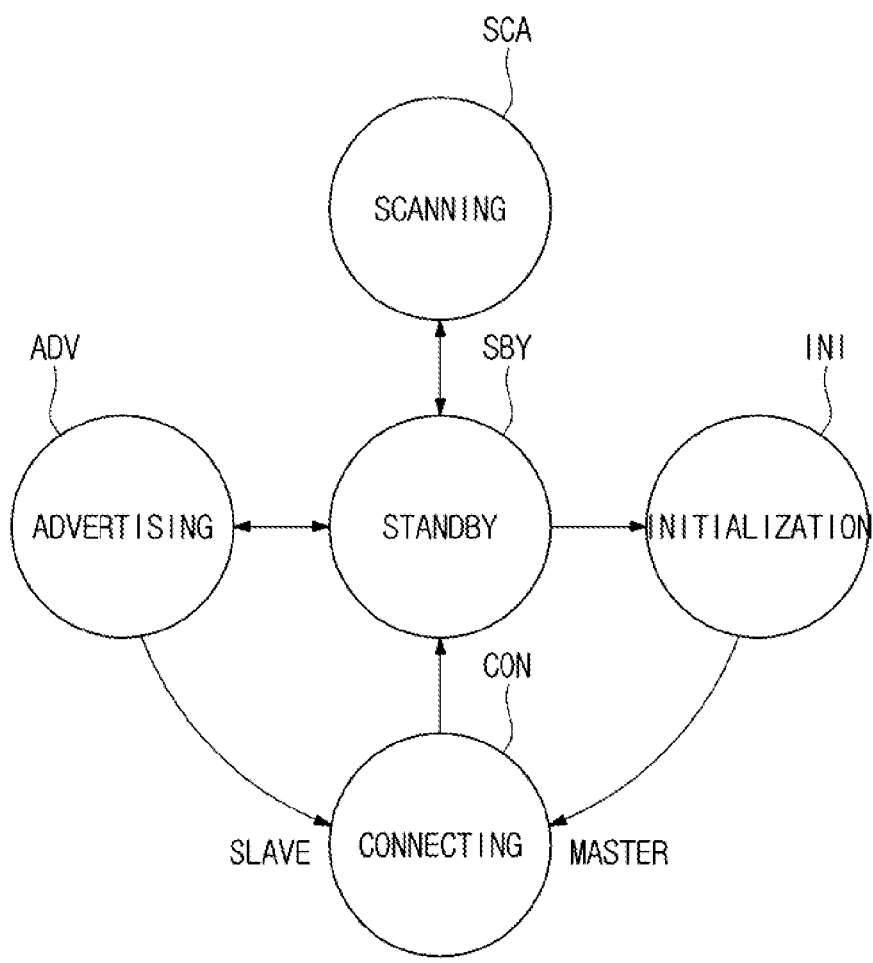
FIG. 16 illustrates communication operation modes of the image forming apparatus and the portable electronic device according to an embodiment of the disclosure.

FIG. 16 illustrates communication operation modes of the image forming apparatus 100 and the portable electronic device 10 according to an embodiment of the disclosure.

The wireless communication module 620 of the image forming apparatus 100 and the second wireless communication module 62 included in the portable electronic device 10 may each have five operation modes as shown in FIG. 16.

In detail, the image forming apparatus 100 and the portable electronic device 10 (hereinafter, referred to as a terminal device) may operate in a standby mode SBY, a scanning mode SCA, an advertising mode ADV, an initialization mode INI, and a connecting mode CON.

The standby mode SBY is a mode in which the terminal device waits for a communication command of the user or a system.

In the standby mode SBY, the terminal device performs a minimal operation for receiving a command of the user or the system, thereby allowing a communication module in the standby mode SBY to consume minimal energy.

The advertising mode ADV is a mode in which the terminal device periodically transmits an advertising signal.

In the advertising mode ADV, the terminal device may only transmit the advertising signal to the outside at a predetermined period and the terminal device may not be in communication with an external device. That is, in the advertising mode ADV, the terminal device does not perform an operation for maintaining communication with the external device and only replies in response to a scanning request received from the external device.

Also, in the advertising mode ADV, since the terminal device may only transmit the advertising signal at the predetermined period and does not detect a communication signal transmitted by the external device or does not perform the operation for maintaining the communication with the external device, the terminal device consumes an extremely small amount of energy.

The scanning mode SCA is a mode in which the terminal device detects an advertising signal.

In the scanning mode SCA, the terminal device detects the advertising signal. When the advertising signal is detected, the terminal device identifies the external device which transmits the advertising signal based on advertising data included in the advertising signal. Also, the terminal device may calculate a distance between the external device and the terminal device based on the intensity of the advertising signal.

Also in the scanning mode SCA, only the advertising signal may be detected and the terminal device may not be in communication with the external device. That is, in the scanning mode SCA, the terminal device does not substantially transmit and receive data with the external device.

The initialization mode INI is a mode in which the terminal device performs a series of operations for connecting with the external device.

In detail, when the advertising signal is detected in the scanning mode SCA described above, the terminal device may exit the scanning mode SCA, may pass the standby mode SBY, and may enter the initialization mode INI.

In the initialization mode INI, the terminal device performs an initialization operation for connecting communication with the external device. In detail, the terminal device transmits a connecting request with respect to the external device which transmits the advertising signal. When a response for the connecting request is received, the wireless communication module 620 sets a security level and then enters the connecting mode CON which will be described below after.

The connecting mode CON is a mode in which the terminal device is in communication with the external device.

In the connecting mode CON, the terminal device may transmit and receive data with the external device. In detail, the terminal device transmits data to the external device for a transmission time and receives data transmitted by the external device for a receiving time after the transmission time.

Also, in the connecting mode CON, the terminal device may operate as one of a master device and a slave device.

The master device determines a sequence of transmitting data among devices connected in communication and sets the transmission time for transmitting the data and the receiving time for receiving the data. The slave device may transmit the data according to the sequence and transmission time set by the master device.

Also, the terminal device which requests connecting may become the master device. That is, the advertising signal transmitted by the external device is detected in the scanning mode SCA, the terminal device which transmits the connecting request to the external device becomes the master device in the initialization mode INI, and the terminal device which enters the connecting mode CON in response to the connecting request while transmitting the advertising signal in the advertising mode ADV becomes the slave device.

As described above, when the printing job is received, the image forming apparatus 100 may transmit the advertising signal. When the printing job is received in the standby mode SBY, the image forming apparatus 100 shifts into the advertising mode ADV. When the connecting request is received from the portable electronic device 10, the image forming apparatus 100 shifts into the connecting mode CON. As described above, in the connecting mode CON, the image forming apparatus 100 operates as the slave device.

Also, after transmitting the printing job, the portable electronic device 10 detects the advertising signal transmitted by the image forming apparatus 100. After transmitting the printing job in the standby mode SBY, the portable electronic device 10 shifts into the scanning mode SCA. When the advertising signal is detected, the portable electronic device 10 transmits the connecting request to the image forming apparatus 100 to shift into the connecting mode CON. In the case as described above, in the connecting mode CON, the portable electronic device 10 operates as the master device.

Further, after the printing job is transmitted, the portable electronic device 10 may operate in the advertising mode ADV and the image forming apparatus 100 may operate in the scanning mode SCA. In detail, the portable electronic device 10 which transmits the printing job may output the advertising signal ADV_SIG and the image forming apparatus 100 which receives the printing job may detect the advertising signal ADV_SIG. In the case as described above, in the connecting mode CON, the image forming apparatus 100 may operate as the master device and the portable electronic device 10 may operate as the slave device.

When the transmission and receiving of necessary data is completed, the terminal device in the connecting mode CON may shift into the standby mode SBY.

Also, the terminal device may operate only in one of the standby mode SBY, the advertising mode ADV, the scanning mode SCA, the initialization mode INI, and the connecting mode CON.

In detail, in the image forming system 1, the portable electronic device 10 may operate in the scanning mode SCA while the image forming apparatus 100 is operating in the advertising mode ADV and may operate in the advertising mode ADV while the image forming apparatus 100 is operating in the scanning mode SCA.

However, the terminal device may output the advertising signal or detect the advertising signal in the connecting mode CON. In other words, in the connecting mode CON, the slave device may transmit and receive the advertising signal and the master device may detect the advertising signal.

Also, in the image forming system 1, the image forming apparatus 100 does not operate as being fixed to one of the advertising mode ADV and the scanning mode SCA. In other words, the image forming apparatus 100 may alternatively operate in the advertising mode ADV or the scanning mode SCA. For example, the image forming apparatus 100 may operate in the advertising mode ADV between the first time and the second time, may operate in the scanning mode SCA between the second time and a third time, and may operate in the advertising mode ADV again between the third time and a fourth time.

Also, the portable electronic device 10 does not operate as being fixed to one of the advertising mode ADV and the scanning mode SCA. In other words, the portable electronic device 10 may alternatively operate in the advertising mode ADV or the scanning mode SCA. For example, the portable electronic device 10 may operate in the scanning mode SCA between the first time and the second time, may operate in the advertising mode ADV between the second time and the third time, and may operate in the scanning mode SCA again between the third time and the fourth time.

Figure 17:
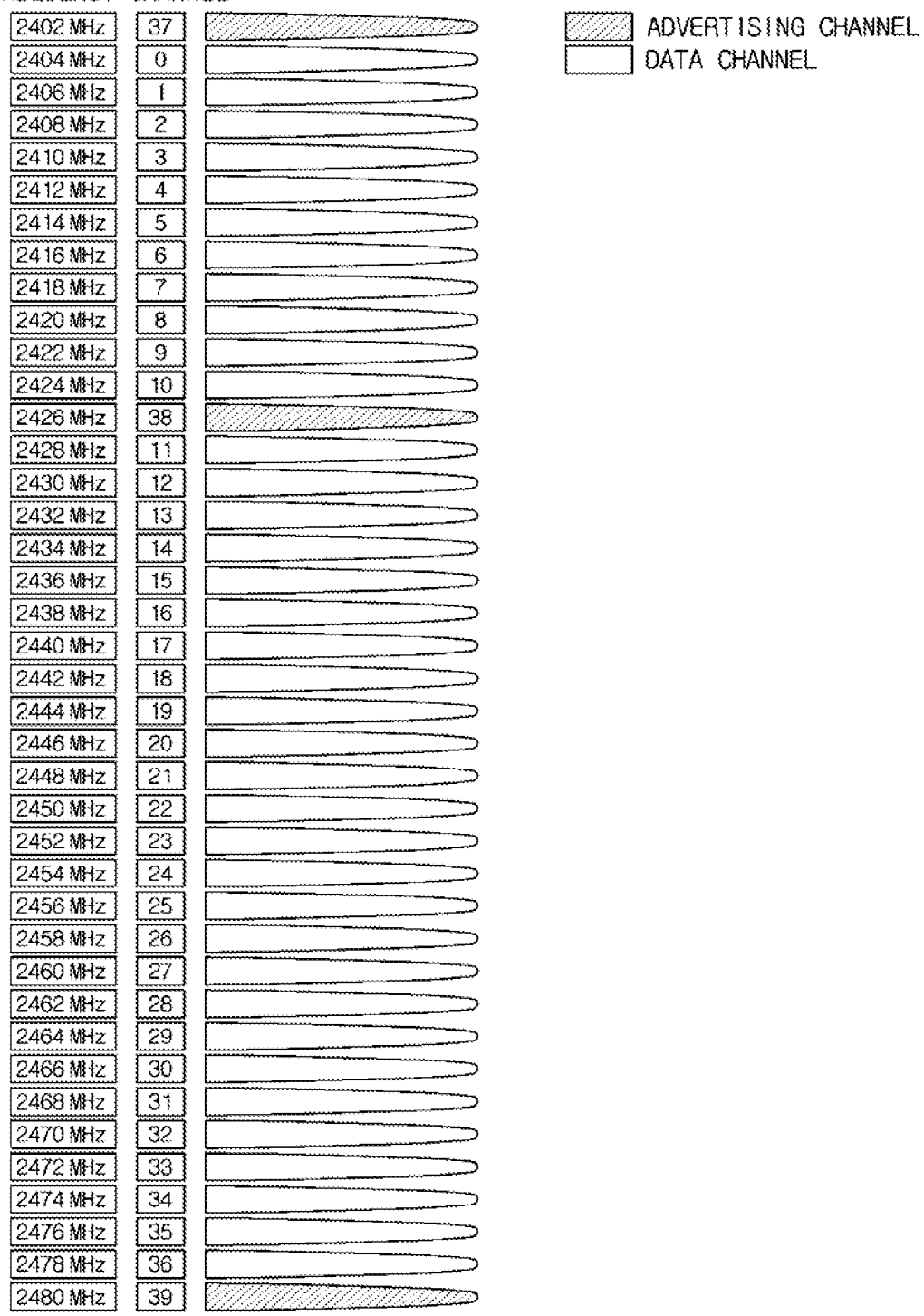
FIG. 17 illustrates a frequency band in which the image forming apparatus and the portable electronic device perform communication according to an embodiment of the disclosure.

FIG. 17 illustrates a frequency band in which the image forming apparatus 100 and the portable electronic device 10 may perform communication according to an embodiment of the disclosure.

The image forming apparatus 100 and the portable electronic device 10 (hereinafter, referred to as a terminal device) perform communication using radio waves at a frequency of about 2.4 gigahertz (GHz) as shown in FIG. 17.

Also, the terminal device divides a frequency band at 2.4 GHz (in detail, a frequency band in a range from about 2.4 GHz to about 2.48 GHz) into 40 channels and transmits and receives data through a frequency hopping method to prevent disturbances in communication with the external device.

Among the 40 channels, a frequency band at about 2.402 GHz (a frequency band with 2.402 GHz as a center frequency), a frequency band at about 2.426 GHz (a frequency band with 2.426 GHz as a center frequency), and a frequency band at about 2.480 GHz (a frequency band with 2.480 GHz as a center frequency) correspond to advertising channels to transmit an advertising signal and remaining frequency bands correspond to data channels to transmit and receive data.

In other words, the advertising channels for transmitting the advertising signal and the data channels for transmitting and receiving the data are physically divided.

As described above, since the advertising channels and the data channels are physically divided, the master device in the connecting mode CON may additionally detect the advertising signal and the slave device in the connecting mode CON may transmit the advertising signal.

FIGS. 18A to 18C illustrate communication signals transmitted and received by the image forming apparatus 100 and the portable electronic device 10 according to an embodiment of the disclosure.

The terminal device in the advertising mode ADV (hereinafter, referred to as an advertiser) transmits the advertising signal ADV_SIG at a predetermined period and the terminal device in the scanning mode SCA (hereinafter, referred to as a scanner) detects the advertising signal ADV_SIG as shown in FIG. 18A.

When the scanner detects the advertising signal ADV_SIG, the scanner identifies the advertiser using the advertising signal ADV_SIG and transmits a scan signal SCAN_SIG toward the advertiser as shown in FIG. 18A. The advertiser which receives the scan signal SCAN_SIG transmits a scan response signal SCAN_RSP corresponding to the scan signal SCAN_SIG.

Afterward, the advertiser may continue the transmission of the advertising signal ADV_SIG and the scanner may shift into the initialization mode INI to request connecting from the advertiser.

As shown in FIG. 18B, the scanner which shifts into the initialization mode INI may transmit a connecting request CON_REQ to request communication toward the advertiser and the advertiser which receives the connecting request CON_REQ transmits a connecting response CON_RSP corresponding to the connecting request CON_REQ.

When the advertiser is in communication with the scanner, the advertiser operates as the slave device in the connecting mode CON and the scanner operates as the master device in the connecting mode CON.

Afterward, as shown in FIG. 18C, according to a sequence, data transmission and receiving periods, and data transmission and receiving times set by the master device (the scanner), the master device (scanner) and the slave device (the advertiser) alternately transmit data.

For example, as shown in FIG. 18C, the master device (the scanner) transmits a master data signal MAS_DATA, and then, the slave device (the advertiser) transmits a slave data signal SLA_DATA. Afterward, the master device (the scanner) transmits the master data signal MAS_DATA again.

Figure 19A:
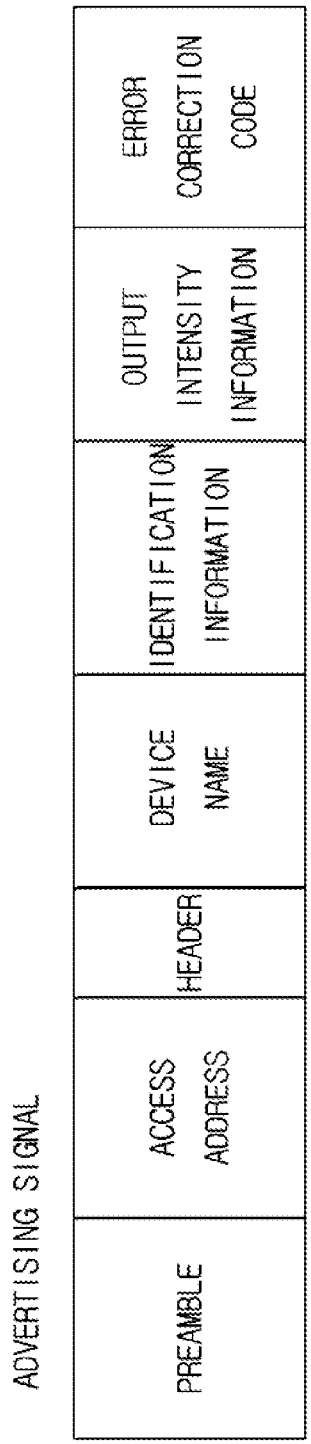
FIGS. 19A to 19B illustrate information included in the communication signals transmitted and received by the image forming apparatus and the portable electronic device according to an embodiment of the disclosure.
Figure 19B:
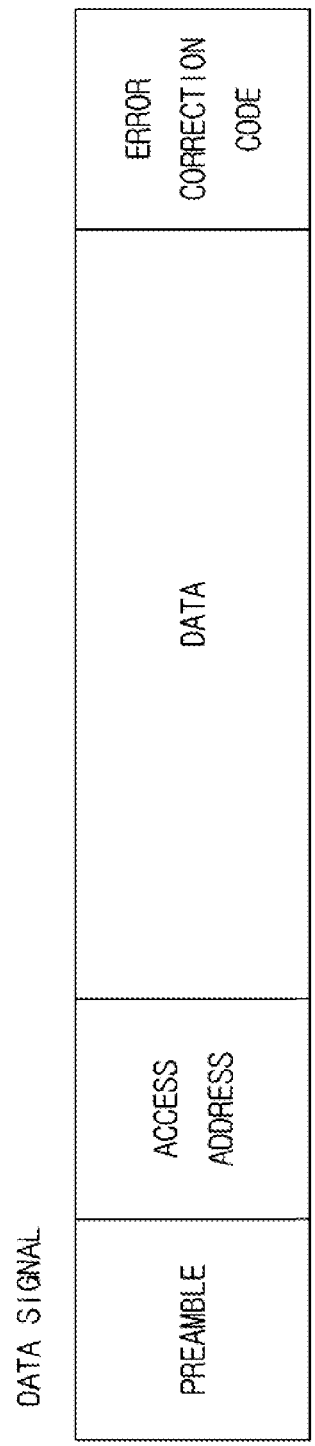

FIGS. 19A to 19B illustrate information included in the communication signals transmitted and received by the image forming apparatus 100 and the portable electronic device 10 according to an embodiment of the disclosure.

The advertising signal ADV_SIG transmitted by the advertiser has the form of a data packet which may include a plurality of pieces of information.

In detail, as shown in FIG. 19A, the advertising signal ADV_SIG may include a preamble which indicates an advertising signal, an access address for accessing the advertiser, a device name for identifying an image forming system, identification information for identifying the advertiser, the output intensity of the output advertising signal ADV_SIG, and an error correction code for correcting an error.

The scanner may identify a target system using the device name of the advertising signal ADV_SIG. For example, using the device name, the portable electronic device 10 may distinguish the advertising signal ADV_SIG output by the image forming apparatus 100 of the image forming system 1 from an advertising signal output by an advertiser of another system, for example, an advertising signal output by a beacon for detecting a position.

Also, the scanner may identify a target device using the identification information of the advertising signal ADV_SIG and may access the target device through the access address. For example, the portable electronic device 10 may distinguish the image forming apparatus 100 which receives the printing job from another image forming apparatus through the identification information and may access the image forming apparatus 100 which receives the printing job through the access address.

Also, the scanner may calculate a distance between the advertiser and the scanner using the output intensity. In detail, the scanner may calculate the distance between the advertiser and the scanner by comparing output intensity information of the advertising signal ADV_SIG with the receiving intensity of the advertising signal ADV_SIG received by the scanner.

For example, the portable electronic device 10 may calculate the distance between the image forming apparatus 100 and the portable electronic device 10 based on a ratio of the receiving intensity of the advertising signal ADV_SIG received by the portable electronic device 10 to the output intensity information included in the advertising signal ADV_SIG.

Also, after the advertiser is in communication with the scanner, data signals transmitted and received by the master device and the slave device also have the form of a data packet including a plurality of pieces of information.

In detail, as shown in FIG. 19B, the data signal may include a preamble which indicates the data signal, an access address for accessing a device which transmits the data signal, data to be transmitted, and an error correction code for correcting an error.

As described above, the configurations of the image forming apparatus 100 and the portable electronic device 10 included in the image forming system 1 have been described.

Hereinafter, the operations of the image forming apparatus 100 and the portable electronic device 10 included in the image forming system 1 will be described.

Hereafter, it will be described that the image forming apparatus 100 operates in the advertising mode ADV and the portable electronic device 10 operates in the scanning mode SCA. However, it is merely an example embodiment and the image forming apparatus 100 may operate in the scanning mode SCA and the portable electronic device 10 may operate in the advertising mode ADV. Also, the image forming apparatus 100 and the portable electronic device 10 may alternatively operate in the advertising mode ADV or the scanning mode SCA.

Figure 20:
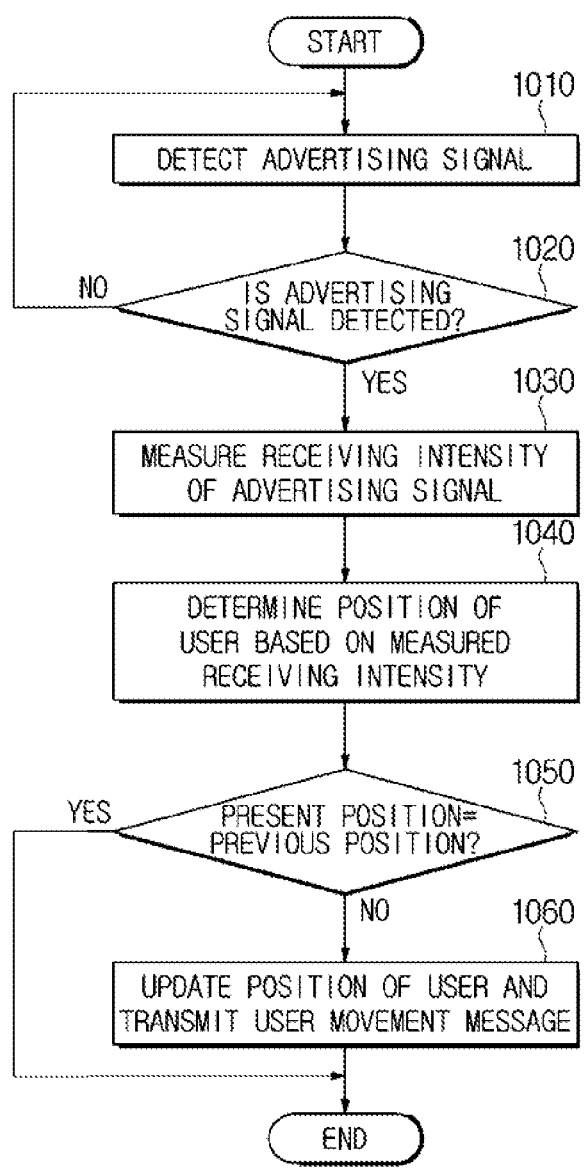
FIG. 20 illustrates an example of an operation of the portable electronic device after transmitting the printing job according to an embodiment of the disclosure.

FIG. 20 illustrates an example of the operation of the portable electronic device 10 after transmitting the printing job according to an embodiment of the disclosure.

Referring to FIG. 20, an operation of the portable electronic device 10 to calculate the distance between the portable electronic device 10 and the image forming apparatus 100 after transmitting the printing job to the image forming apparatus 100 will be described.

The portable electronic device 10 detects the advertising signal ADV_SIG (1010). In detail, the portable electronic device 10 enters the scanning mode SCA and the second wireless communication module 62 of the portable electronic device 10 detects the advertising signal ADV_SIG.

In detail, the second wireless communication module 62 receives a signal in a frequency band at about 2.402 GHz (a frequency band with 2.402 GHz as a center frequency), a frequency band at about 2.426 GHz (a frequency band with 2.426 GHz as a center frequency), and a frequency band at about 2.480 GHz (a frequency band with 2.480 GHz as a center frequency) corresponding to advertising channels. When the signals are received, the second wireless communication module 62 transmits the received signals to the terminal control unit 70.

Afterward, the portable electronic device 10 determines whether the advertising signal ADV_SIG is detected (1020).

The terminal control unit 70 analyzes the signals provided by the second wireless communication module 62 and determines whether the signal received by the second wireless communication module 62 is the advertising signal ADV_SIG transmitted by the image forming apparatus 100 (i.e., the same image forming apparatus which the print job was transmitted to by the portable electronic device).

In detail, the terminal control unit 70 determines whether the form of the signal received by the second wireless communication module 62 corresponds to the form of the advertising signal ADV_SIG. That is, it is determined whether the signal received by the second wireless communication module 62 may include the preamble, the access address, the device name, the identification information, and the output intensity information as shown in FIG. 19A.

When the signal received by the second wireless communication module 62 has the form of the advertising signal ADV_SIG, the terminal control unit 70 determines whether the device name included in the received signal corresponds to the image forming system 1 and determines whether the identification information included in the received signal corresponds to the image forming apparatus 100 which is a target.

When the device name included in the signal corresponds to the image forming system 1 and the identification information included in the received signal corresponds to the image forming apparatus 100 which is the target, the terminal control unit 70 determines that the advertising signal ADV_SIG is detected.

When the advertising signal ADV_SIG is not detected (NO in 1020), the portable electronic device 10 again tries to detects the advertising signal ADV_SIG.

When the advertising signal ADV_SIG is detected (YES in 1020), the portable electronic device 10 detects the receiving intensity of the advertising signal ADV_SIG (1030).

The portable electronic device 10 may measure the receiving intensity of the advertising signal ADV_SIG through various methods.

For example, the portable electronic device 10 may digitalize the advertising signal ADV_SIG using an analog-to-digital (AD) converter, may calculate a mean value of the size of the digitalized advertising signal ADV_SIG, and may determine the calculated mean value to be the receiving intensity of the advertising signal ADV_SIG.

Afterward, the portable electronic device 10 determines a position or location of the user based on the receiving intensity of the advertising signal ADV_SIG (1040).

The terminal control unit 70 of the portable electronic device 10 may determine an area in which the portable electronic device 10 is located by comparing the receiving intensity of the advertising signal ADV_SIG with the first, second, and third reference intensities described above and may determine a location of the portable electronic device 10 to be the position of the user.

A detailed user position determination method will be described below with reference to FIG. 21.

Afterward, the portable electronic device 10 determines whether a present position of the user determined in 1020 is identical to a previous position of the user previously stored (1050).

When the present position of the user is not identical to the previous position of the user (NO in 1050), the portable electronic device 10 updates the position of the user based on the present position of the user (i.e., of the portable electronic device 10 relative to the image forming apparatus 100) (1060). In detail, the terminal control unit 70 of the portable electronic device 10 stores the present position of the user in one or more of the terminal storage unit 50 and the memory 72 of the terminal control unit 70.

Also, the portable electronic device 10 transmits a message related to the position of the user to the image forming apparatus 100.

In detail, the portable electronic device 10 enters in the initialization mode INI, and the second wireless communication module 62 transmits the connecting request CON_REQ to the image forming apparatus 100.

When the connecting response CON_RSP with respect to the connecting request CON_REQ is received from the image forming apparatus 100, the portable electronic device 10 transmits the message related to the position of the user to the image forming apparatus 100.

When the present position of the user is identical to the previous position of the user (YES in 1050), the portable electronic device 10 finishes the operation after the transmitting of the printing job.

The portable electronic device 10 may perform the operations shown in FIG. 20 after the transmitting of the printing job described above at a predetermined time.

Figure 21:
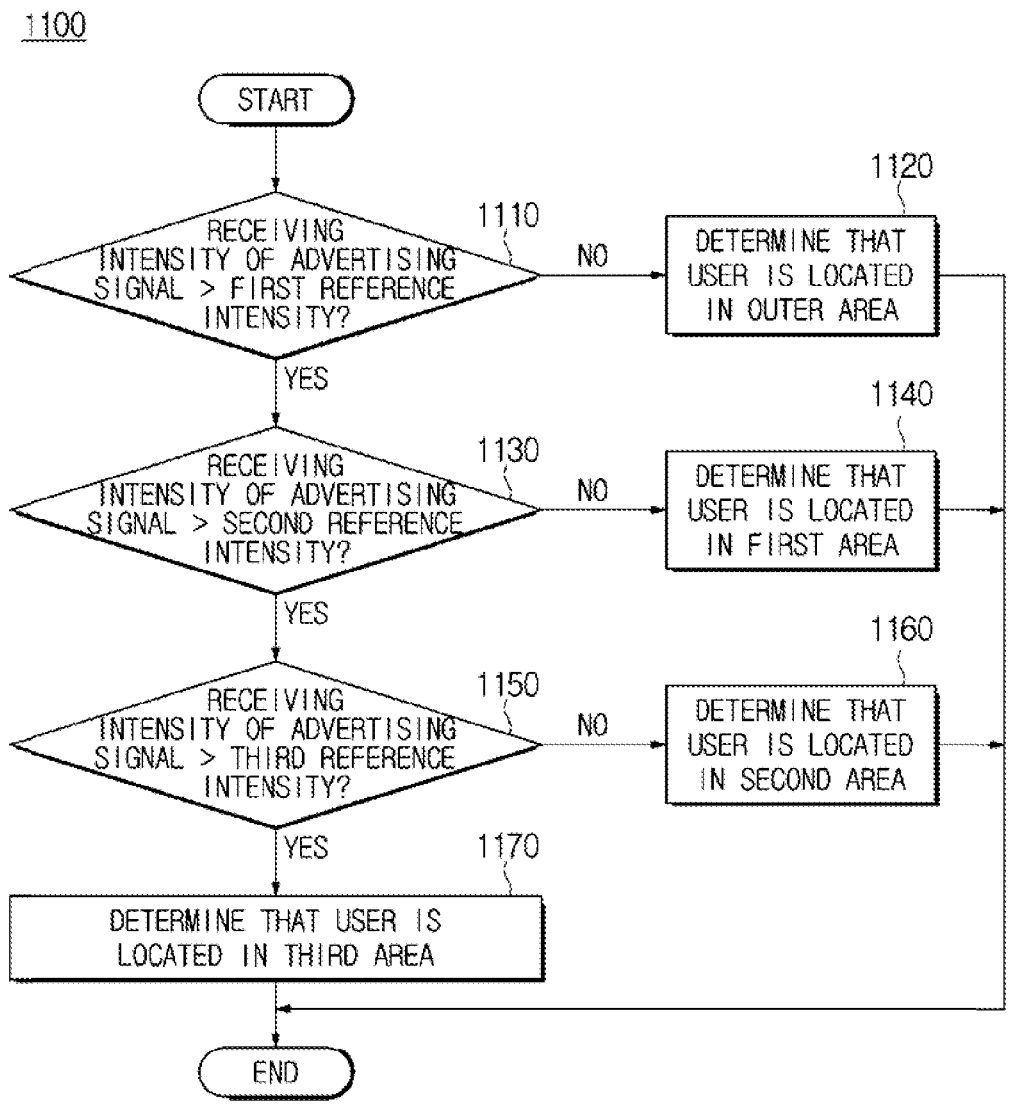
FIG. 21 illustrates an example of a user position determination operation of the portable electronic device according to an embodiment of the disclosure.

FIG. 21 illustrates an example of a user position determination operation 1100 of the portable electronic device 10 according to an embodiment of the disclosure.

Referring to FIG. 21, the user position determination operation 1100 in which the portable electronic device 10 determines the position of the user will be described.

The portable electronic device 10 determines whether the receiving intensity of the advertising signal ADV_SIG is greater than the first reference intensity (1110).

Here, as described above, the first reference intensity may be determined to be the receiving intensity of the advertising signal ADV_SIG received by the portable electronic device 10 when the distance between the portable electronic device 10 and the image forming apparatus 100 corresponds to the first reference distance D1.

Here, the first reference intensity may vary according to the output intensity of the advertising signal ADV_SIG output by the image forming apparatus 100 and the first reference distance D1.

In detail, the terminal control unit 70 of the portable electronic device 10 compares the receiving intensity of the advertising signal ADV_SIG received by the second wireless communication module 62 with the first reference intensity and determines whether the receiving intensity of the advertising signal ADV_SIG is greater than the first reference intensity.

When the receiving intensity of the advertising signal ADV_SIG is not greater than the first reference intensity (NO in 1110), the portable electronic device 10 determines that the user is located in the outer area OUT (1120).

When the receiving intensity of the advertising signal ADV_SIG is smaller than the first reference intensity, the portable electronic device 10 may determine that the distance between the portable electronic device 10 and the image forming apparatus 100 is greater than the first reference distance D1 and a distance between the portable electronic device 10 and the user is identical.

Accordingly, the portable electronic device 10 may determine that the user is located in the outer area OUT.

When the receiving intensity of the advertising signal ADV_SIG is greater than the first reference intensity (YES in 1110), the portable electronic device 10 determines whether the receiving intensity of the advertising signal ADV_SIG is greater than the second reference intensity (1130).

Here, as described above, the second reference intensity may be determined to be the receiving intensity of the advertising signal ADV_SIG received by the portable electronic device 10 when the distance between the portable electronic device 10 and the image forming apparatus 100 corresponds to the second reference distance D2.

Here, the second reference intensity may vary according to the output intensity of the advertising signal ADV_SIG output by the image forming apparatus 100 and the second reference distance D2.

In detail, the terminal control unit 70 of the portable electronic device 10 compares the receiving intensity of the advertising signal ADV_SIG received by the second wireless communication module 62 with the second reference intensity and determines whether the receiving intensity of the advertising signal ADV_SIG is greater than the second reference intensity.

When the receiving intensity of the advertising signal ADV_SIG is not greater than the second reference intensity (NO in 1130), the portable electronic device 10 determines that the user is located in the first area R1 (1140).

When the receiving intensity of the advertising signal ADV_SIG is greater than the first reference intensity and smaller than the second reference intensity, the portable electronic device 10 may determine that the distance between the portable electronic device 10 and the image forming apparatus 100 is smaller than the first reference distance D1 and greater than the second reference distance D2.

Accordingly, the portable electronic device 10 may determine that the user is located in the first area R1.

When the receiving intensity of the advertising signal ADV_SIG is greater than the second reference intensity (YES in 1130), the portable electronic device 10 determines whether the receiving intensity of the advertising signal ADV_SIG is greater than the third reference intensity (1150).

Here, as described above, the third reference intensity may be determined to be the receiving intensity of the advertising signal ADV_SIG received by the portable electronic device 10 when the distance between the portable electronic device 10 and the image forming apparatus 100 corresponds to the third reference distance D3.

Here, the third reference intensity may vary according to the output intensity of the advertising signal ADV_SIG output by the image forming apparatus 100 and the third reference distance D3.

In detail, the terminal control unit 70 of the portable electronic device 10 compares the receiving intensity of the advertising signal ADV_SIG received by the second wireless communication module 62 with the third reference intensity and determines whether the receiving intensity of the advertising signal ADV_SIG is greater than the third reference intensity.

When the receiving intensity of the advertising signal ADV_SIG is not greater than the third reference intensity (NO in 1150), the portable electronic device 10 determines that the user is located in the second area R2 (1160).

When the receiving intensity of the advertising signal ADV_SIG is greater than the second reference intensity and smaller than the third reference intensity, the portable electronic device 10 may determine that the distance between the portable electronic device 10 and the image forming apparatus 100 is smaller than the second reference distance D2 and greater than the third reference distance D3.

Accordingly, the portable electronic device 10 may determine that the user is located in the second area R2.

When the receiving intensity of the advertising signal ADV_SIG is greater than the third reference intensity (YES in 1150), the portable electronic device 10 determines that the user is located in the third area R3 (1170).

When the receiving intensity of the advertising signal ADV_SIG is greater than the third reference intensity, the portable electronic device 10 may determine that the distance between the portable electronic device 10 and the image forming apparatus 100 is smaller than the third reference distance D3.

Accordingly, the portable electronic device 10 may determine that the user is located in the third area R3.

The portable electronic device 10 may detect the position of the user based on the image forming apparatus 100 through the user position determination operation 1100 described above.

Figure 22:
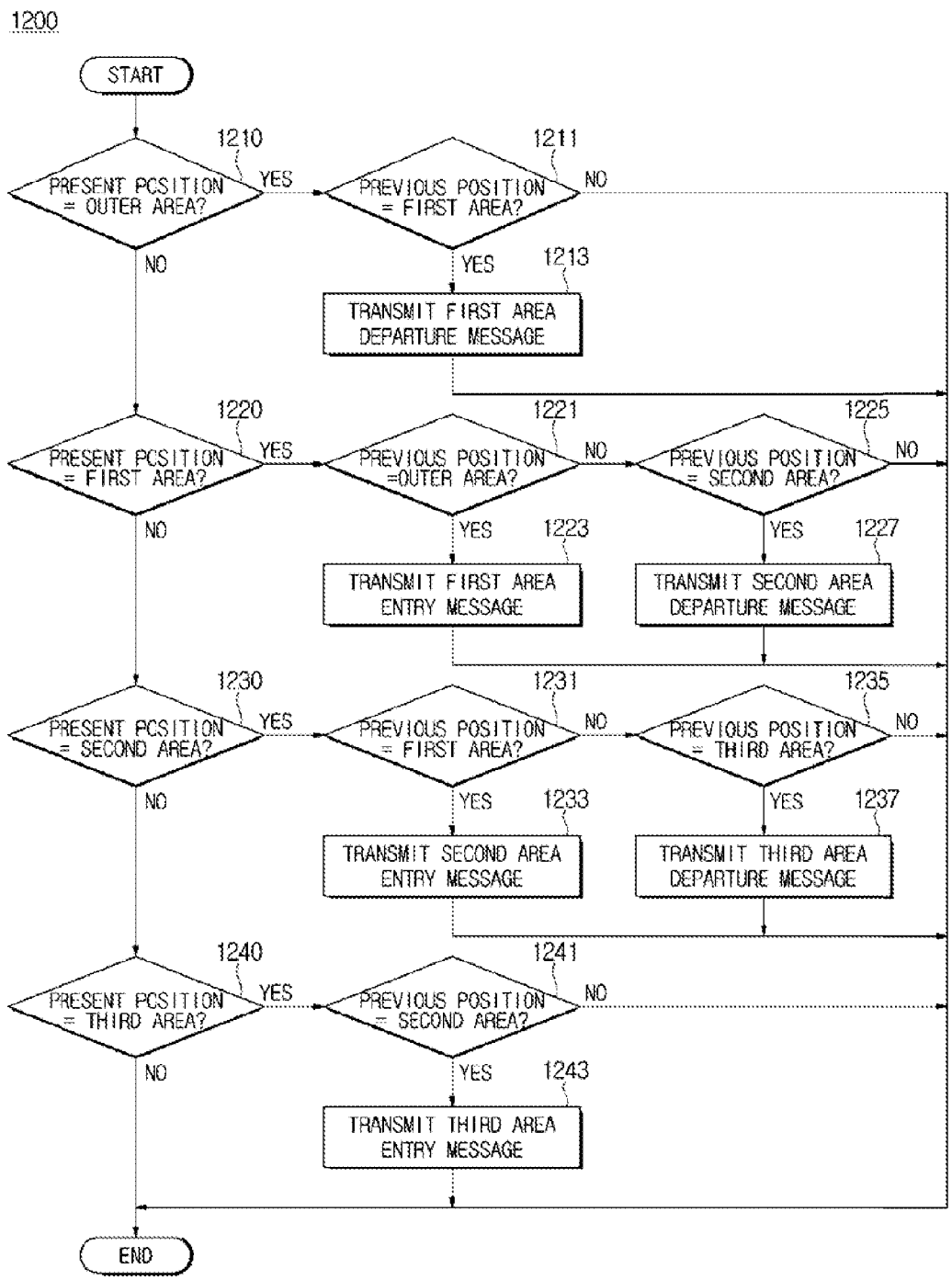
FIG. 22 illustrates an example of a user position transmission operation of the portable electronic device according to an embodiment of the disclosure.

FIG. 22 illustrates an example of a user position transmission operation 1200 of the portable electronic device 10 according to an embodiment of the disclosure.

Referring to FIG. 22, the user position transmission operation 1200 in which the portable electronic device 10 transmits a change in position of the user to the image forming apparatus 100 when the position of the user changes will be described.

The portable electronic device 10 determines whether the present position of the user determined through the user position determination operation 1100 shown in FIG. 21 is the outer area OUT (1210).

When the present position of the user is the outer area OUT (YES in 1210), the portable electronic device 10 determines whether the previous position of the user stored (e.g., in the terminal storage unit 50 or the memory 72) is the first area R1 (1211).

When the previous position of the user is the first area R1 (YES in 1211), the portable electronic device 10 transmits a first area departure message to the image forming apparatus 100 (1213).

When the previous position of the user is the first area R1 and the present position of the user is the outer area OUT, the portable electronic device 10 may determine that the user has moved from the first area R1 to the outer area OUT.

Accordingly, the portable electronic device 10 enters the initialization mode INI and requests connecting from the image forming apparatus 100. When the connecting with the image forming apparatus 100 is established, the portable electronic device 10 enters the connecting mode CON and transmits the first area departure message to the image forming apparatus 100.

When the previous position of the user is not the first area R1 (NO in 1211), the portable electronic device 10 determines that the position of the user has not changed and finishes the user position transmission operation 1200.

Since the movement of the user is a continuous operation, the position of the user may be changed between adjacent areas. When the present position of the user is the outer area OUT and the previous position of the user is not the first area, the portable electronic device 10 may determine that the user has continuously stayed in the outer area OUT.

Accordingly, the portable electronic device 10 may determine that the position of the user has not changed.

Also, when the present position of the user is not the outer area OUT (NO in 1210), the portable electronic device 10 determines whether the present position of the user determined by the user position determination operation 1100 shown in FIG. 21 is the first area R1 (1220).

When the present position of the user is the first area R1 (YES in 1220), the portable electronic device 10 determines whether the previous position of the user stored (e.g., in the terminal storage unit 50 or the memory 72) is the outer area OUT (1221).

When the previous position of the user is the outer area OUT (YES in 1221), the portable electronic device 10 transmits a first area entry message to the image forming apparatus 100 (1223).

When the previous position of the user is the outer area OUT and the present position of the user is the first area R1, the portable electronic device 10 may determine that the user has moved from the outer area OUT to the first area R1.

Accordingly, the portable electronic device 10 enters the initialization mode INI and requests connecting from the image forming apparatus 100. When the connecting with the image forming apparatus 100 is established, the portable electronic device 10 enters the connecting mode CON and transmits the first area entry message to the image forming apparatus 100.

When the previous position of the user is not the outer area OUT (NO in 1221), the portable electronic device 10 determines whether the previous position of the user stored (e.g., in the terminal storage unit 50 or the memory 72) is the second area R2 (1225).

When the previous position of the user is the second area R2 (YES in 1225), the portable electronic device 10 transmits a second area departure message to the image forming apparatus 100 (1227).

When the previous position of the user is the second area R2 and the present position of the user is the first area R1, the portable electronic device 10 may determine that the user has moved from the second area R2 to the first area R1.

Accordingly, the portable electronic device 10 transmits the second area departure message to the image forming apparatus 100.

When the previous position of the user is not the second area R2 (NO in 1225), the portable electronic device 10 determines that the position of the user has not changed and finishes the user position transmission operation 1200.

Since the position of the user may change between adjacent areas, when the present position of the user is the first area R1 and the previous position of the user is neither the outer area OUT nor the second area R2, the portable electronic device 10 may determine that the user has continuously stayed in the first area R1.

Accordingly, the portable electronic device 10 may determine that the position of the user has not changed.

Also, when the present position of the user is not the first area R1 (NO in 1220), the portable electronic device 10 determines whether the present position of the user determined by the user position determination operation 1100 shown in FIG. 21 is the second area R2 (1230).

When the present position of the user is the second area R2 (YES in 1230), the portable electronic device 10 determines whether the previous position of the user stored (e.g., in the terminal storage unit 50 or the memory 72) is the first area R1 (1231).

When the previous position of the user is the first area R1 (YES in 1231), the portable electronic device 10 transmits a second area entry message to the image forming apparatus 100 (1233).

When the previous position of the user is the first area R1 and the present position of the user is the second area R2, the portable electronic device 10 may determine that the user has moved from the first area R1 to the second area R2.

Accordingly, the portable electronic device 10 transmits the second area entry message to the image forming apparatus 100.

When the previous position of the user is not the first area R1 (NO in 1231), the portable electronic device 10 determines whether the previous position of the user stored (e.g., in the terminal storage unit 50 or the memory) is the third area R3 (1235).

When the previous position of the user is the third area R3 (YES in 1235), the portable electronic device 10 transmits a third area departure message to the image forming apparatus 100 (1237).

When the previous position of the user is the third area R3 and the present position of the user is the second area R2, the portable electronic device 10 may determine that the user has moved from the third area R3 to the second area R2.

Accordingly, the portable electronic device 10 transmits the third area departure message to the image forming apparatus 100.

When the previous position of the user is not the third area R3 (NO in 1235), the portable electronic device 10 determines that the position of the user has not changed and finishes the user position transmission operation 1200.

Since the position of the user may change between adjacent areas, when the present position of the user is the second area R2 and the previous position of the user is neither the first area R1 nor the third area R3, the portable electronic device 10 may determine that the user has continuously stayed in the second area R2.

Accordingly, the portable electronic device 10 may determine that the position of the user has not changed.

Also, when the present position of the user is not the second area R2 (NO in 1230), the portable electronic device 10 determines whether the present position of the user determined by the user position determination operation 1100 shown in FIG. 21 is the third area R3 (1240).

When the present position of the user is the third area R3 (YES in 1240), the portable electronic device 10 determines whether the previous position of the user stored (e.g., in the terminal storage unit 50 or the memory 72) is the second area R2 (1241).

When the previous position of the user is the second area R2 (YES in 1241), the portable electronic device 10 transmits a third area entry message to the image forming apparatus 100 (1243).

When the previous position of the user is the second area R2 and the present position of the user is the third area R3, the portable electronic device 10 may determine that the user has moved from the second area R2 to the third area R3.

Accordingly, the portable electronic device 10 transmits the third area entry message to the image forming apparatus 100.

When the previous position of the user is not the second area R2 (NO in 1241), the portable electronic device 10 determines that the position of the user has not changed and finishes the user position transmission operation 1200.

Since the position of the user may change between adjacent areas, when the present position of the user is the third area R3 and the previous position of the user is not the second area R2, the portable electronic device 10 may determine that the user has continuously stayed in the third area R3.

Accordingly, the portable electronic device 10 may determine that the position of the user does not change.

Also, when the present position of the user is not the third area R3 (NO in 1240), the portable electronic device 10 determines that an error is occurring in the user position determination operation 1100 and finishes the user position transmission operation 1200.

In the above, referring to FIGS. 20 to 22, the operation of the portable electronic device 10 to detect the advertising signal output by the image forming apparatus 100 and to detect the distance between the portable electronic device 10 and the image forming apparatus 100 has been described.

However, calculating, by the portable electronic device 10, the distance between the portable electronic device 10 and the image forming apparatus 100 is not limited thereto.

As described above, the portable electronic device 10 may output the advertising signal ADV_SIG and the image forming apparatus 100 may calculate the distance between the portable electronic device 10 and the image forming apparatus 100 based on the receiving intensity of the advertising signal ADV_SIG.

In detail, the image forming apparatus 100 which receives the printing job PJ may detect the advertising signal ADV_SIG.

When the advertising signal ADV_SIG is detected, the image forming apparatus 100 may detect the receiving intensity of the advertising signal ADV_SIG.

Afterward, the image forming apparatus 100 may determine one or more of the distance between the image forming apparatus 100 and the portable electronic device 10 and a relative position of the portable electronic device 10 based on the receiving intensity of the advertising signal ADV_SIG.

Also, the image forming apparatus 100 may perform various operations which will be described below according to one or more of the relative position of the portable electronic device 10 and the distance between the image forming apparatus 100 and the portable electronic device 10.

Hereinafter, the operation of the image forming system 1 according to the distance between the portable electronic device 10 and the image forming apparatus 100 or the relative position of the portable electronic device 10 will be described.

Figure 23:
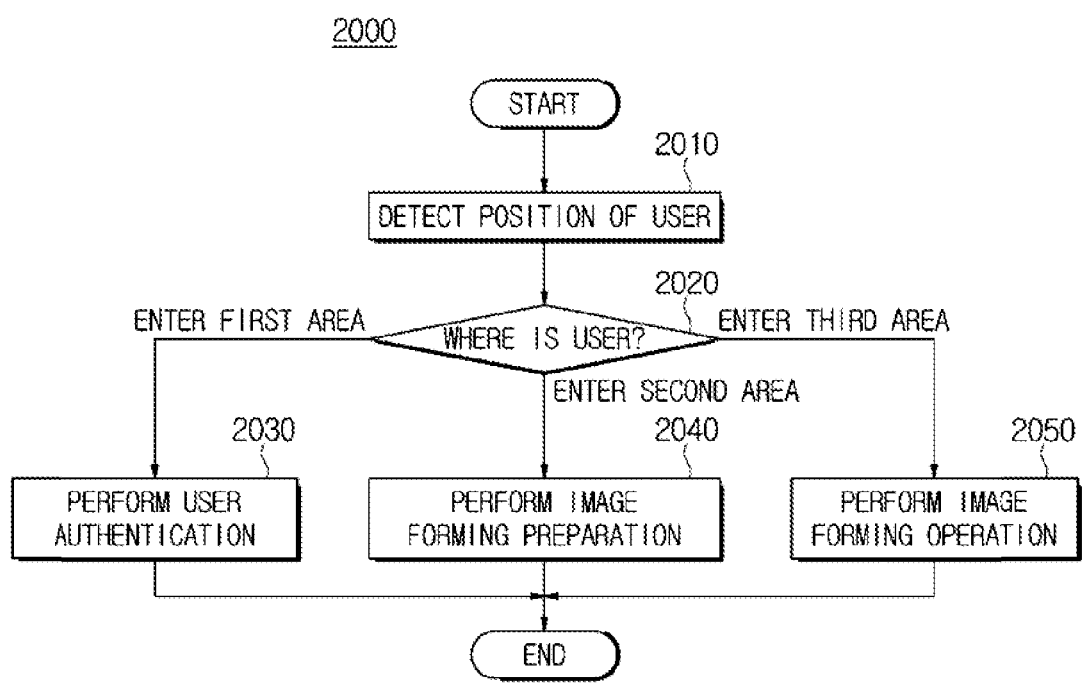
FIGS. 23 and 24 illustrate an example of an image forming operation of the image forming system according to an embodiment of the disclosure.
Figure 24:
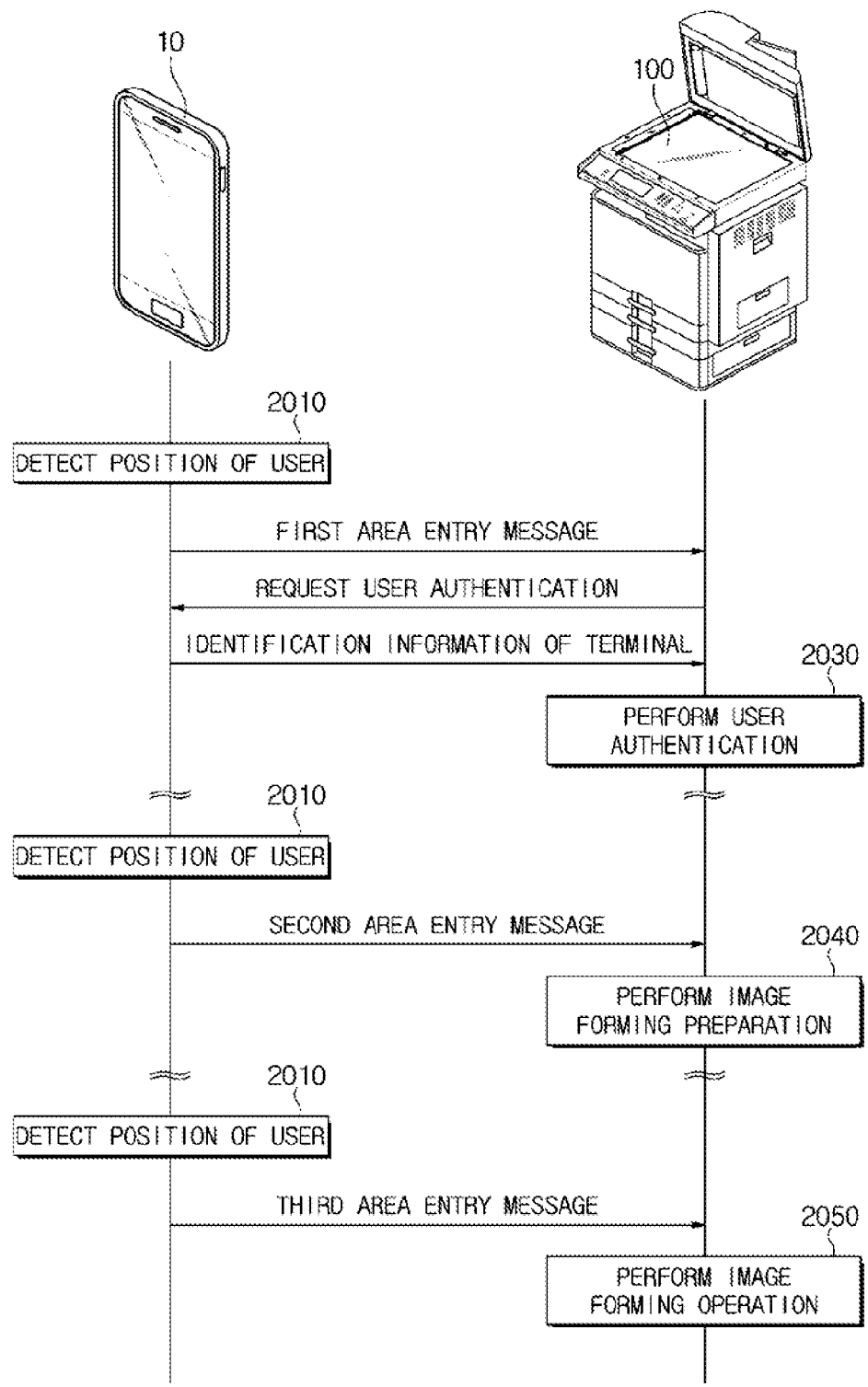

FIGS. 23 and 24 illustrate an example of an image forming operation 2000 of the image forming system 1 according to an embodiment of the disclosure.

The image forming system 1 detects the position of the user (2010).

For example, the portable electronic device 10 included in the image forming system 1 may calculate a distance between the user and the image forming apparatus 100 based on the receiving intensity of the advertising signal ADV_SIG transmitted by the image forming apparatus 100 and may determine a relative position of the user based on the image forming apparatus 100.

As a result of detecting the position of the user, when the user moves from the outer area OUT to the first area R1, as shown in FIG. 24, the portable electronic device 10 transmits the first area entry message to the image forming apparatus 100. When the user moves from the first area R1 to the second area R2, the portable electronic device 10 transmits the second area entry message to the image forming apparatus 100. Also, when the user moves from the second area R2 to the third area R3, as shown in FIG. 24, the portable electronic device 10 may transmit the third area entry message to the image forming apparatus 100.

As another example, the image forming apparatus 100 may calculate the distance between the user and the image forming apparatus 100 based on the receiving intensity of the advertising signal ADV_SIG output by the portable electronic device 10 and may determine the relative position of the user based on the image forming apparatus 100.

After the position of the user is detected, the image forming system 1 determines whether the user enters the first area R1, whether the user enters the second area R2, or whether the user enters the third area R3 (2020).

For example, when the image forming apparatus 100 outputs the advertising signal ADV_SIG, the image forming system 1 may determine the position of the user according to a message received by the image forming apparatus 100 from the portable electronic device 10.

When the image forming apparatus 100 receives the first area entry message, the image forming system 1 may determine that the user has entered the first area R1. When the image forming apparatus 100 receives the second area entry message, the image forming system 1 may determine that the user has entered the second area R2. Also, when the image forming apparatus 100 receives the third area entry message, the image forming system 1 may determine that the user has entered the third area R3.

As another example, when the portable electronic device 10 outputs the advertising signal ADV_SIG, the image forming system 1 may determine the position of the user according to the distance between the portable electronic device 10 and the image forming apparatus 100 detected by the image forming apparatus 100.

When it is determined that the user has entered the first area R1 (enter the first area in 2020), the image forming system 1 performs user authentication (2030). The image forming system 1 may perform the user authentication by comparing identification information included in a printing job with identification information of the user stored in the portable electronic device 10.

A user authentication operation will be described below in detail.

When it is determined that the user has entered the second area R2 (enter the second area in 2020), the image forming system 1 performs an image forming preparation operation (2040). For example, the image forming system 1 may allow the image forming apparatus 100 to shift or change from a sleep mode (or standby mode) into an active mode to perform an image forming operation.

The image forming preparation operation will be described below in detail.

When it is determined that the user has entered the third area R3 (enter the third area in 2020), the image forming system 1 performs the image forming operation (2050). For example, the image forming system 1 may form an image which is an object of printing on the recording medium P through the image forming apparatus 100.

The image forming operation will be described below in detail.

Hereinafter, detailed operations of the image forming apparatus 100 and the portable electronic device 10 according to the distance between the user and the image forming apparatus 100 will be described.

Figure 25:
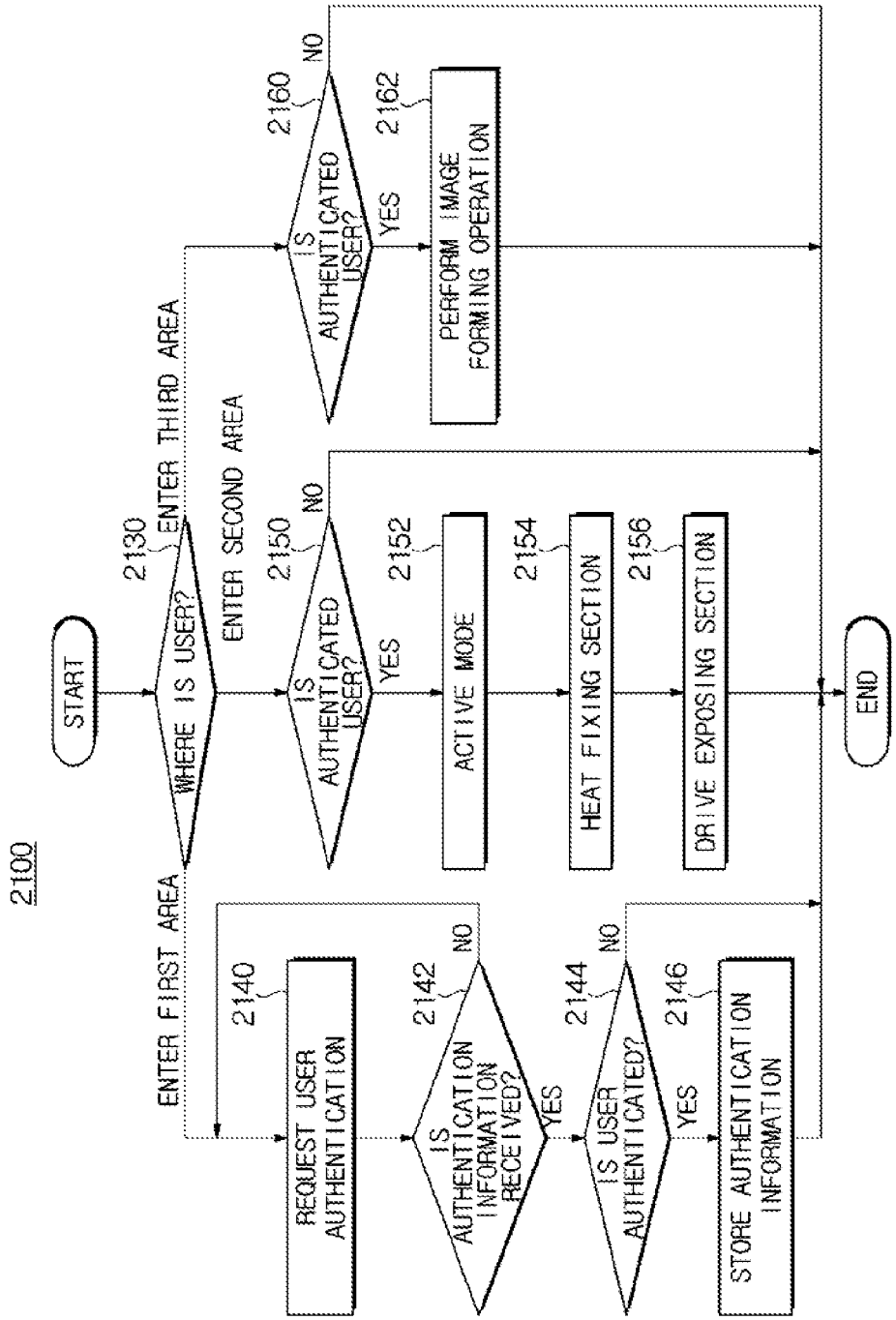
FIG. 25 illustrates an example of an operation of the image forming apparatus according to an embodiment of the disclosure.

FIG. 25 illustrates an example of an operation 2100 of the image forming apparatus 100 according to an embodiment of the disclosure.

Referring to FIG. 25, the operation 2100 of the image forming apparatus 100 according to the position of the user based on the image forming apparatus 100 will be described.

The image forming apparatus 100 determines the position of the user (2130).

The image forming apparatus 100 may determine the position of the user using the method described above.

For example, when the image forming apparatus 100 outputs the advertising signal ADV_SIG, the image forming apparatus 100 may determine a relative position of the user according to a message transmitted by the portable electronic device 10.

As another example, when the portable electronic device 10 outputs the advertising signal ADV_SIG, the image forming apparatus 100 may determine the relative position of the user based on the receiving intensity of the advertising signal ADV_SIG.

When it is determined that the user has entered the first area R1 (enter the first area in 2130), the image forming apparatus 100 requests user authentication from the portable electronic device 10 (2140).

When the user enters the first area R1, connecting is formed between the image forming apparatus 100 and the portable electronic device 10.

For example, when the user moves from the outer area OUT to the first area R1, the portable electronic device 10 may request connecting from the image forming apparatus 100 and transmit the first area entry message.

As another example, when the user moves from the outer area OUT to the first area R1, the image forming apparatus 100 may request connecting from the portable electronic device 10.

When the connecting is formed, the image forming apparatus 100 requests user authentication information from the portable electronic device 10 through the wireless communication module 620.

The user authentication information, as described above, may include identification information of the user, which allows the user to be identified, such as the name of the user and a unique number of the user or a password set by the user. In addition, identification information of the portable electronic device 10 carried by the user may be used as the authentication information of the user.

Afterward, the image forming apparatus 100 determines whether the user authentication information is received from the portable electronic device 10 (2142).

When the user authentication information is not received (NO in 2142), the image forming apparatus 100 may request the user authentication information from the portable electronic device 10 at a predetermined time.

When the user authentication information has been received (YES in 2142), the image forming apparatus 100 performs the user authentication (2144).

In detail, the image forming apparatus 100 determines whether the user authentication information transmitted by the portable electronic device 10 is identical to the user authentication information included in the printing job.

When the user authentication information received from the portable electronic device 10 is identical to the user authentication information included in the printing job, the image forming apparatus 100 determines that the user is authenticated. On the contrary, when the user authentication information received from the portable electronic device 10 is not identical to the user authentication information included in the printing job, the image forming apparatus 100 determines that the user fails to be authenticated.

When the user is authenticated (YES in 2144), the image forming apparatus 100 stores the user authentication information received from the portable electronic device 10 in one or more of the storage unit 500 and the memory 720 (2146).

The image forming apparatus 100 may store an access address of the portable electronic device 10 together with the authentication information of the user.

For example, an authentication information storage area for storing the authentication information of the authenticated user in one or more of the storage unit 500 and the memory 720 and the access address of the portable electronic device 10 is provided. When the user authentication is completed, the image forming apparatus 100 may store the authentication information of the authenticated user and the access address of the portable electronic device 10 in the authentication information storage area.

When the access address of the portable electronic device 10 carried by the authenticated user is stored in the authentication information storage area, the image forming apparatus 100 may determine whether the user is the authenticated user using the access address of the portable electronic device 10 included in a data signal received from the portable electronic device 10 without an additional user authentication process.

When the user is not authenticated (NO in 2144), the image forming apparatus 100 terminates communication without an additional operation.

When it is determined that the user has entered the second area R2 (enter the second area in 2130), the image forming apparatus 100 determines whether the user who has entered the second area R2 is the authenticated user (2150).

When the user enters the second area R2, connecting is formed between the image forming apparatus 100 and the portable electronic device 10.

For example, when the user moves from the first area R1 to the second area R2, the portable electronic device 10 may request connecting from the image forming apparatus 100 and transmit the second area entry message.

As another example, when the user moves from the first area R1 to the second area R2, the image forming apparatus 100 may request connecting from the portable electronic device 10.

Also, the image forming apparatus 100 determines whether the user who has entered the second area R2 is the authenticated user based on the access address of a data signal transmitted by the portable electronic device 10.

In detail, the image forming apparatus 100 determines whether the user who has entered the second area R2 is the authenticated user depending on whether the access address stored in the storage unit 500 or the memory 720 is identical to the access address of the data signal received from the portable electronic device 10.

In other words, when the access address stored together with the authentication information is identical to the access address of the received data signal, the image forming apparatus 100 determines that the user who has entered the second area R2 is the authenticated user. When the access address stored together with the authentication information is not identical to the access address of the received data signal, the image forming apparatus 100 determines that the user who has entered the second area R2 is not the authenticated user.

When the user who has entered the second area R2 is determined to be an unauthenticated user (NO in 2150), the image forming apparatus 100 terminates communication with the portable electronic device 10 without an additional operation.

When the user who has entered the second area R2 is determined to be the authenticated user (YES in 2150), the image forming apparatus 100 enters an active mode (2152) and prepares an image forming operation.

The active mode refers to a state in which the image forming apparatus 100 may perform the image forming operation. On the other hand, a sleep mode refers to a state in which the image forming apparatus 100, which does not perform the image forming operation for a certain time to reduce power consumption, cuts off power to some components to save power.

For example, the image forming apparatus 100 in the sleep mode may cut off power to the image forming unit 200, the image obtaining unit 300, and the storage unit 500.

Since it needs a certain time to allow the image forming apparatus 100 to shift from the sleep mode to the active mode and to prepare to immediately start the image forming operation, the image forming apparatus 100 shifts from the sleep mode into the active mode when the user enters the second area R2 before the user enters the third area R3 closer to the image forming apparatus 100.

For example, the image forming apparatus 100 which shifts into the active mode may resupply the image forming unit 200, the image obtaining unit 300, and the storage unit 500 with power.

Afterward, the image forming apparatus 100 heats the fixing section 250 (2154) and drives the exposing section 220 (2156).

Although the image forming apparatus 100 has shifted into the active mode and resupplied the image forming unit 200 with power, it is impossible to immediately start the image forming operation.

To allow the image forming apparatus 100 to perform the image forming operation, it is necessary to increase a temperature of the heating roller 251 included in the fixing section 250 which fixes toner to the recording medium P to a predetermined temperature and to allow a rotation speed of a LSU included in the exposing section 220 to reach a predetermined rotation speed.

Due to the reasons described above, after shifting into the active mode, the image forming apparatus 100 may stand by until the temperature of the heating roller 251 included in the fixing section 250 increases to the predetermined temperature and the rotation speed of the LSU included in the exposing section 220 reaches the predetermined rotation speed.

Also, when it is determined that the user has entered the third area R3 (enter the third area in 2130), the image forming apparatus 100 determines whether the user who has entered the third area R3 is the authenticated user (2160).

When the user enters the third area R3, connecting is formed between the image forming apparatus 100 and the portable electronic device 10.

For example, when the user moves from the second area R2 to the third area R3, the portable electronic device 10 may request connecting from the image forming apparatus 100 and transmit the third area entry message.

As another example, when the user moves from the second area R2 to the third area R3, the image forming apparatus 100 may request connecting from the portable electronic device 10.

Also, the image forming apparatus 100 determines whether the user who has entered the third area R3 is the authenticated user based on the access address of a data signal transmitted by the portable electronic device 10 (2160).

In detail, the image forming apparatus 100 determines whether the user who has entered the third area R3 is the authenticated user depending on whether the access address stored in the storage unit 500 or the memory 720 is identical to the access address of the data signal received from the portable electronic device 10.

When the user who has entered the third area R3 is determined to be an unauthenticated user (NO in 2160), the image forming apparatus 100 terminates communication with the portable electronic device 10 without an additional operation.

When the user who has entered the third area R3 is determined to be the authenticated user (YES in S2160), the image forming apparatus 100 performs the image forming operation (2162).

In detail, the image forming apparatus 100 forms an image corresponding to image data included in a printing job on a printing medium through a series of operations of supplying the printing medium, exposing using a photosensitive drum, developing an electrostatic latent image formed on the photosensitive drum, transferring the developed toner image to the printing medium, fixing the toner image to the printing medium, and discharging the printing medium formed with the image.

As described above, the image forming system 1 may perform the user authentication when the user has entered the first area R1, may prepare the image forming operation when the user has entered the second area R2, and may perform the image forming operation when the user has entered the third area R3.

However, the operations of the image forming system 1 according to the distance between the user and the image forming apparatus 100 are not limited thereto but the image forming system 1 may perform other operations.

Figure 26:
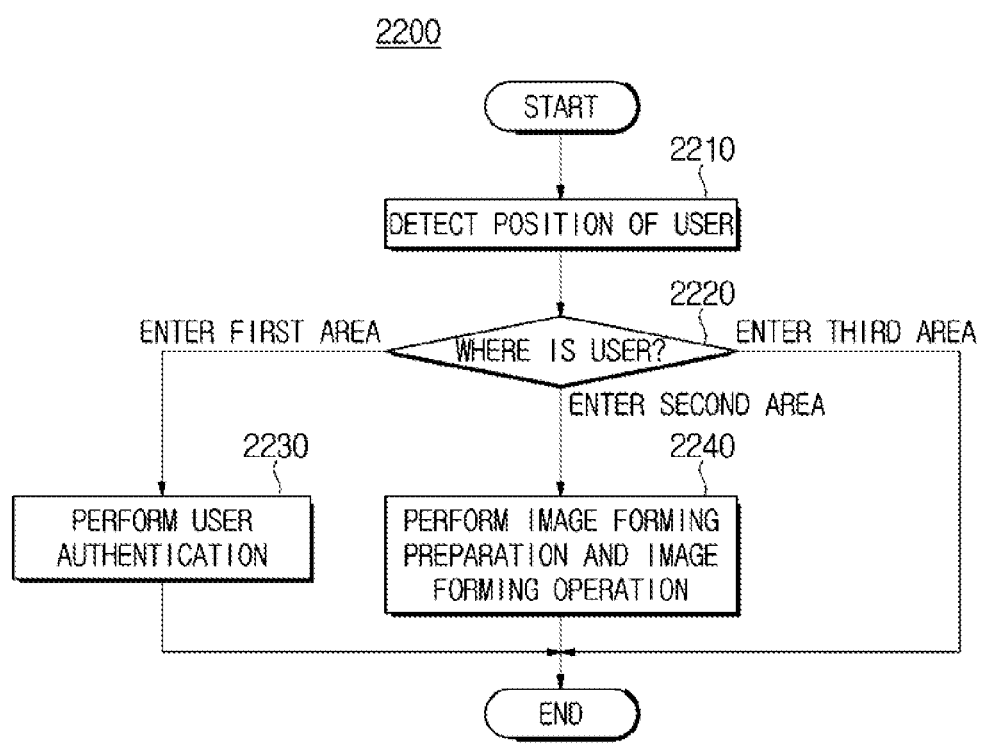
FIG. 26 illustrates another example of the operation of the image forming system according to an embodiment of the disclosure.

FIG. 26 illustrates an example of the operations 2200 of the image forming system 1 according to an embodiment of the disclosure.

Referring to FIG. 26, the image forming system 1 detects the position of the user (2210).

For example, the portable electronic device 10 included in the image forming system 1 may calculate a distance between the user and the image forming apparatus 100 based on the receiving intensity of the advertising signal ADV_SIG transmitted by the image forming apparatus 100 and may determine the position of the user based on the image forming apparatus 100.

As another example, the image forming apparatus 100 may calculate the distance between the user and the image forming apparatus 100 based on the receiving intensity of the advertising signal ADV_SIG output by the portable electronic device 10 and may determine a relative position of the user based on the image forming apparatus 100.

After the position of the user is detected, the image forming system 1 determines whether the user has entered the first area R1, whether the user has entered the second area R2, or whether the user has entered the third area R3 (2220).

For example, when the image forming apparatus 100 outputs the advertising signal ADV_SIG, the image forming system 1 may determine the position of the user according to a message received by the image forming apparatus 100 from the portable electronic device 10.

When the image forming apparatus 100 receives the first area entry message, the image forming system 1 may determine that the user has entered the first area R1. When the image forming apparatus 100 receives the second area entry message, the image forming system 1 may determine that the user has entered the second area R2. Also, when the image forming apparatus 100 receives the third area entry message, the image forming system 1 may determine that the user has entered the third area R3.

As another example, when the portable electronic device 10 outputs the advertising signal ADV_SIG, the image forming system 1 may determine the position of the user according to the distance between the portable electronic device 10 and the image forming apparatus 100 detected by the image forming apparatus 100.

When it is determined that the user enters the first area R1 (enter the first area in 2220), the image forming system 1 performs user authentication (2230). The image forming system 1 may perform the user authentication by comparing identification information included in a printing job with identification information of the user received from the portable electronic device 10.

When it is determined that the user has entered the second area R2 (enter the second area in 2220), the image forming system 1 prepares an image forming operation and performs the image forming operation when the preparation is completed (2240).

In detail, the image forming system 1 allows the image forming apparatus 100 to shift from a sleep mode into an active mode to perform the image forming operation and then forms an image to be printed on the recording medium P through the image forming apparatus 100.

When it is determined that the user has entered the third area R3 (enter the third area R3 in 2220), the image forming system 1 does not perform an additional operation.

As described above, the image forming system 1 may also perform the image forming preparation operation and the image forming operation when the user has entered the second area R2.

Figure 27:
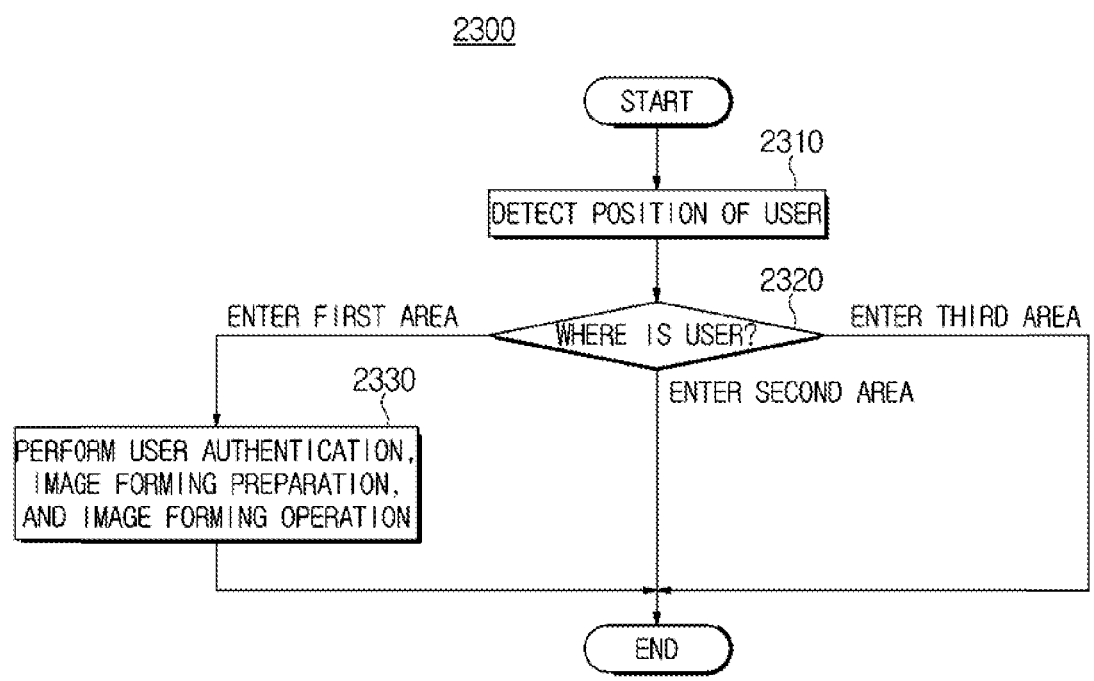
FIG. 27 illustrates still another example of the operation of the image forming system according to an embodiment of the disclosure.

FIG. 27 illustrates an example of the operation 2300 of the image forming system 1 according to an embodiment of the disclosure.

Referring to FIG. 27, the image forming system 1 detects the position of the user (2310).

For example, the portable electronic device 10 included in the image forming system 1 may calculate a distance between the user and the image forming apparatus 100 based on the receiving intensity of the advertising signal ADV_SIG transmitted by the image forming apparatus 100 and may determine the position of the user based on the image forming apparatus 100.

As another example, the image forming apparatus 100 may calculate the distance between the user and the image forming apparatus 100 based on the receiving intensity of the advertising signal ADV_SIG output by the portable electronic device 10 and may determine a relative position of the user based on the image forming apparatus 100.

After the position of the user is detected, the image forming system 1 determines whether the user has entered the first area R1, whether the user has entered the second area R2, or whether the user has entered the third area R3 (2320).

For example, when the image forming apparatus 100 outputs the advertising signal ADV_SIG, the image forming system 1 may determine the position of the user according to a message received by the image forming apparatus 100 from the portable electronic device 10.

When the image forming apparatus 100 receives the first area entry message, the image forming system 1 may determine that the user has entered the first area R1. When the image forming apparatus 100 receives the second area entry message, the image forming system 1 may determine that the user has entered the second area R2. Also, when the image forming apparatus 100 receives the third area entry message, the image forming system 1 may determine that the user has entered the third area R3.

As another example, when the portable electronic device 10 outputs the advertising signal ADV_SIG, the image forming system 1 may determine the position of the user according to the distance between the portable electronic device 10 and the image forming apparatus 100 detected by the image forming apparatus 100.

When it is determined that the user has entered the first area R1 (enter the first area in 2320), the image forming system 1 may sequentially perform user authentication, an image forming preparation operation and an image forming operation (2330).

The image forming system 1 performs the user authentication by comparing identification information included in a printing job with identification information of the user stored in the portable electronic device 10, allows the image forming apparatus to shift from a sleep mode into an active mode to perform the image forming operation when the user authentication is completed, and then forms an image to be printed on the recording medium P through the image forming apparatus 100.

When it is determined that the user has entered the second area R2 or the third area R3 (enter the second area or the third area in 2320), the image forming system 1 does not perform an additional operation.

As described above, the image forming system 1 may perform all of the user authentication, the image forming preparation operation and the image forming operation when the user has entered the first area R1.

As described above, while the distance between the user and the image forming apparatus 100 is becoming smaller, the image forming system 1 may perform the user authentication, the image forming preparation operation, and the image forming operation according to the distance between the user and the image forming apparatus 100.

Hereinafter, an operation of the image forming system 1 while the distance between the user and the image forming apparatus 100 is becoming larger (increases) will be described.

When the user does not approach the image forming apparatus 100 for a certain time after inputting a print command or the user does not receive printed material from the image forming apparatus 100 after an image forming operation is performed, the image forming system 1 may alert the user to unreceived printed material through the portable electronic device 10.

As described above, the image forming system 1 may alert the user to the unreceived printed material in at least the following two cases.

First, when the user does not approach the image forming apparatus 100 to receive printed material for a certain time after inputting a print command, the image forming system 1 may alert the user to unreceived printed material.

In this case, the image forming system 1 may determine whether the portable electronic device 10 has entered an adjacent area of the image forming apparatus 100, for example, the third area. When the user has not entered the adjacent area of the image forming apparatus 100 for a predetermined time, the image forming system 1 may alert the user to unreceived printed material through the portable electronic device 10.

Second, when the user approaches the image forming apparatus 100 to receive printed material and has not received the printed material and retreats, the image forming system 1 may alert the user to unreceived printed material.

Hereinafter, the second case will be described in detail.

Figure 28:
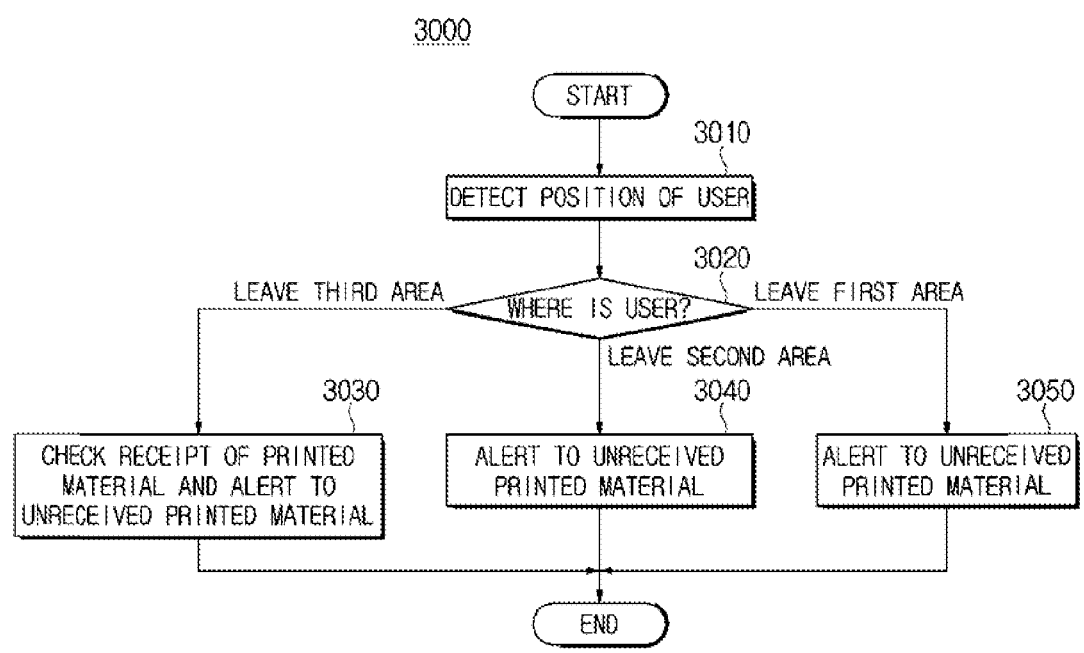
FIGS. 28 and 29 illustrate an example of an unreceived printed material warning operation of the image forming system according to an embodiment of the disclosure.
Figure 29:
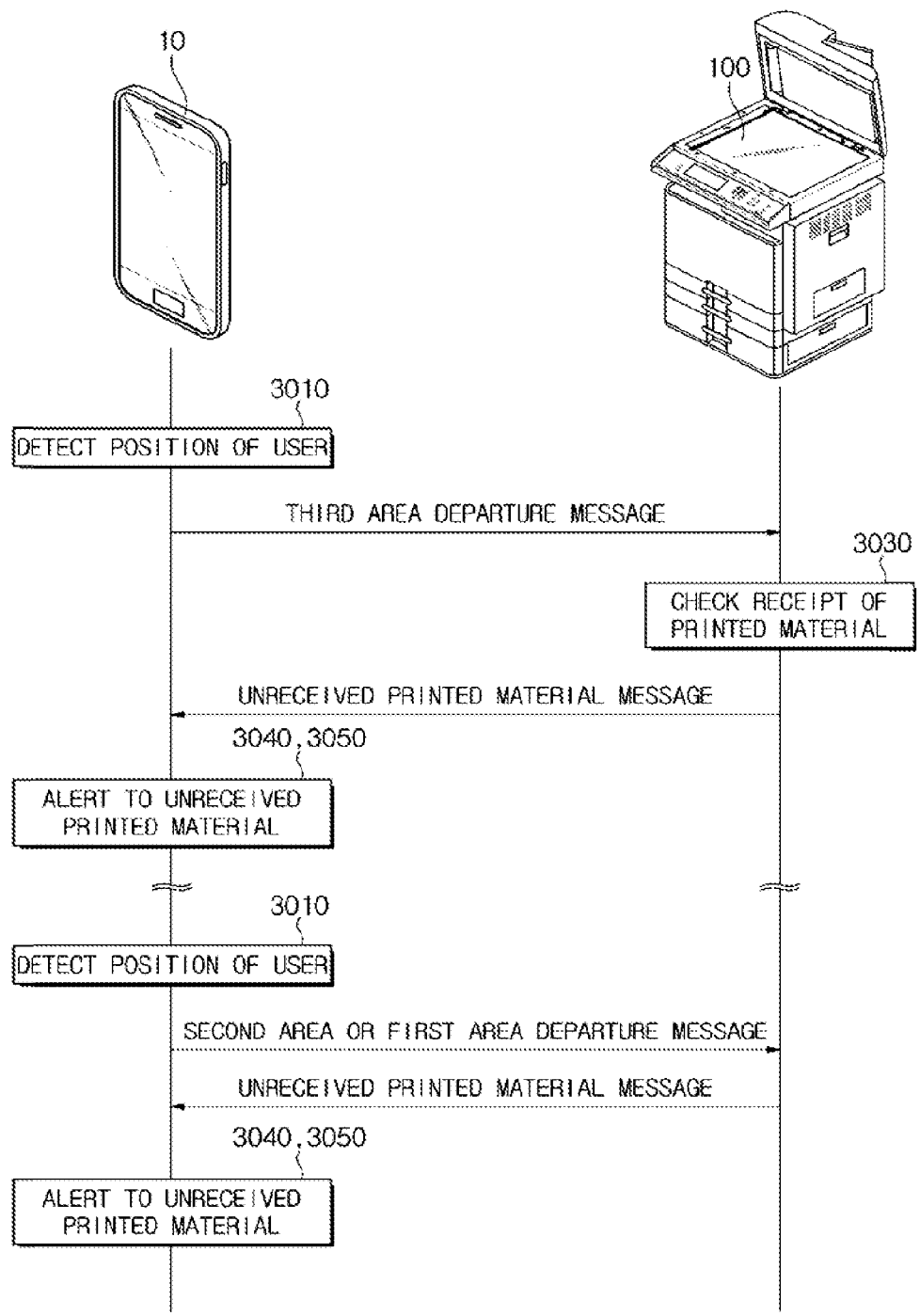

FIGS. 28 and 29 illustrate an example of an unreceived printed material warning operation 3000 of the image forming system 1 according to an embodiment of the disclosure. Referring to FIGS. 28 and 29, the unreceived printed material warning operation 3000 of the image forming system 1 will be described.

The image forming system 1 detects the position of the user (3010).

For example, the portable electronic device 10 included in the image forming system 1 may calculate a distance between the user and the image forming apparatus 100 based on the receiving intensity of the advertising signal ADV_SIG transmitted by the image forming apparatus 100 and may determine the position of the user based on the image forming apparatus 100.

As a result of detecting the position of the user, when the user has moved from the third area R3 to the second area R2, as shown in FIG. 29, the portable electronic device 10 transmits a third area departure message to the image forming apparatus 100. When the user has moved from the second area R2 to the first area R1, the portable electronic device 10 transmits a second area departure message to the image forming apparatus 100. Also, when the user has moved from the first area R1 to the outer area OUT, as shown in FIG. 29, the portable electronic device 10 may transmit a first area departure message to the image forming apparatus 100.

As another example, the image forming apparatus 100 may calculate the distance between the user and the image forming apparatus 100 based on the receiving intensity of the advertising signal ADV_SIG output by the portable electronic device 10 and may determine a relative position of the user based on the image forming apparatus 100.

After the position of the user is detected, the image forming system 1 determines whether the user leaves the first area R1, whether the user has left the second area R2, or whether the user has left the third area R3 (3020).

For example, when the image forming apparatus 100 outputs the advertising signal ADV_SIG, the image forming system 1 may determine the position of the user according to a message received by the image forming apparatus 100 from the portable electronic device 10.

When the image forming apparatus 100 receives the third area departure message, the image forming system 1 may determine that the user has left the third area R3. When the image forming apparatus 100 receives the second area departure message, the image forming system 1 may determine that the user has left the second area R2. Also, when the image forming apparatus 100 receives the first area departure message, the image forming system 1 may determine that the user has left the first area R1.

As another example, when the portable electronic device 10 outputs the advertising signal ADV_SIG, the image forming system 1 may determine the position of the user according to the distance between the portable electronic device 10 and the image forming apparatus 100 detected by the image forming apparatus 100.

When it is determined that the user has left the third area R3 (leave the third area in 3020), the image forming system 1 determines whether the user has received the printed material through the image forming apparatus 100. When it is determined that the user has not received the printed material, the image forming system 1 alerts the user to unreceived printed material through the portable electronic device 10 (3030).

The operations of checking whether the printed material has been received and alerting to the unreceived printed material will be described in detail.

When it is determined that the user has left one of the second area R2 and the first area R1 (leave one of the second area and the first area in 3020), the image forming system 1 alerts the user to the unreceived printed material through the portable electronic device 10 (3040 and 3050).

Hereinafter, the operations of the image forming apparatus 100 and the portable electronic device 10 will be described in detail.

Figure 30:
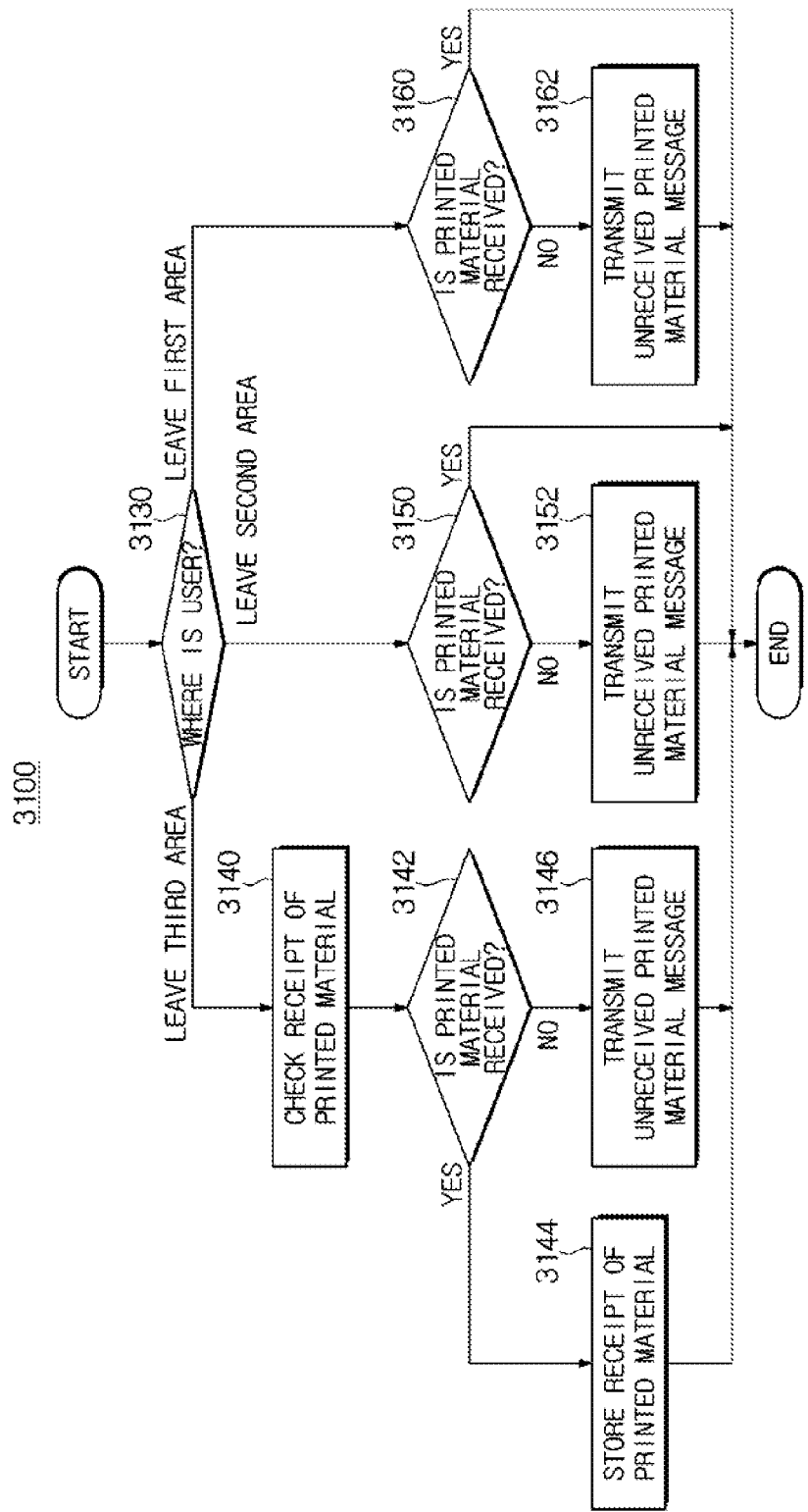
FIG. 30 illustrates an example of an unreceived printed material warning operation of the image forming apparatus according to an embodiment of the disclosure.

FIG. 30 illustrates an example of an unreceived printed material warning operation 3100 of the image forming apparatus 100 according to an embodiment of the disclosure.

Referring to FIG. 30, the unreceived printed material warning operation 3100 of the image forming apparatus 100 according to the distance between the image forming apparatus 100 and the user (portable electronic device) will be described.

The image forming apparatus 100 determines the position of the user (3130).

The image forming apparatus 100 may determine the position of the user using the method described above.

For example, when the image forming apparatus 100 outputs the advertising signal ADV_SIG, the image forming apparatus 100 may determine a relative position of the user according to a message transmitted by the portable electronic device 10.

As another example, when the portable electronic device 10 outputs the advertising signal ADV_SIG, the image forming apparatus 100 may determine the relative position of the user based on the receiving intensity of the advertising signal ADV_SIG.

When it is determined that the user has left the third area R3 (leave the third area in 3130), the image forming apparatus 100 checks whether the user has received the printed material (3140).

The image forming apparatus 100 performs an image forming operation when the user has entered the third area R3. Accordingly, when the user leaves the third area R3, the image forming apparatus 100 is performing the image forming operation or has completed the image forming operation.

Accordingly, when the user has left the third area R3, the image forming apparatus 100 may check whether the user has received the printed material.

The image forming apparatus 100 may check whether the user has received the printed material through various methods.

The image forming apparatus 100 may include an additional paper output sensor (not shown) on the output tray 113 to check the receipt of the printed material.

In detail, the paper output sensor may include a light emitter which emits light and a light receiver which receives the light emitted by the light emitter. The light emitter and the light receiver may be installed on both sides of the output tray 113. When the light receiver receives the light emitted by the light emitter, the printed material is not located on the output tray 113. Accordingly, the image forming apparatus 100 may determine that the user has received the printed material. When the light receiver does not receive the light emitted by the light emitter, the printed material is located on the output tray 113. Accordingly, the image forming apparatus 100 may determine that the user has not received the printed material.

Also, the paper output sensor may include a barcode reader. Here, the image forming apparatus 100 may print one of identification information of the user and identification information of the portable electronic device 10 as a barcode on a printing medium during the image forming operation and the barcode reader provided in the output tray 113 reads the barcode on the printed material to check the receipt of the printed material and to determine a user who does not receive the printed material.

Also, the paper output sensor may include a microswitch. The microswitch is installed on the output tray 113. When the microswitch is pressurized, the image forming apparatus 100 may determine that the user has not received the printed material. When the microswitch is not pressurized, the image forming apparatus 100 may determine that the user has received the printed material.

Also, the paper output sensor may include a weight sensor. The weight sensor may be provided on the output tray 113. Depending on a weight of the printed material sensed by the weight sensor, it is determined whether or not the user has received the printed material.

Also, the image forming apparatus 100 may include a printed material receipt authentication unit for user authentication, together with the paper output sensor. The receipt of the printed material is sensed by the paper output tray, the image forming apparatus 100 may request receipt authentication from the user. The printed material receipt authentication unit described above may use one of a keypad to which the user may input a password and a proximate communication unit such as an NFC communication module.

Here, the image forming apparatus 100 may determine that the user has received the printed material when the receipt authentication is performed or may determine that the user has not received the printed material when the receipt authentication is not performed.

Also, the image forming apparatus 100 may include a printed material storage box, which opens when the receipt authentication is completed, on the output tray 113 to allow the user to receive the printed material when the receipt authentication is performed.

Here, the image forming apparatus 100 may determine that the user has received the printed material when the receipt authentication is performed or may determine that the user has not received the printed material when the receipt authentication is not performed.

Also, when the user has entered the third area R3, the image forming apparatus 100 may perform the image forming operation and may transmit a receiving check message to the portable electronic device 10 at the same time.

That is, when the user has entered the third area R3, the portable electronic device 10 displays a screen for checking whether the printed material has been received according to the receiving check message of the image forming apparatus 100. When the user checks the receiving through the portable electronic device 10, the image forming apparatus 100 determines that the printed material has been received. When the user does not check the receiving through the portable electronic device 10, the image forming apparatus 100 determines that the printed material has not been received.

When the checking whether the printed material has been received is completed, the image forming apparatus 100 determines whether the user has received the printed material (3142).

When it is determined that the user has received the printed material (YES in 3142), the image forming apparatus 100 stores a received printed material message in one of the storage unit 500 and the memory 720 (3144).

For example, a printed material receiving storage area which stores received printed material message may be provided in one or more of the storage unit 500 and the memory 720. When it is determined that the user has received the printed material, the image forming apparatus 100 may store the received printed material message in the printed material receiving storage area.

When it is determined that the user has not received the printed material (NO in 3142), the image forming apparatus 100 transmits an unreceived printed material message to the portable electronic device 10 (3146). The image forming apparatus 100 may transmit the unreceived printed material message to the portable electronic device 10 through the wireless communication module 620 in the connecting mode CON.

As described below, when the image forming apparatus 100 transmits the unreceived printed material message, the portable electronic device 10 alerts the user to the unreceived printed material.

When it is determined that the user has left the second area R2 (leave the second area in 3130), the image forming apparatus 100 checks whether the user has received the printed material (3150). Here, the image forming apparatus 100 may determine whether the printed material is received depending on whether received printed material message is stored in the printed material receiving storage area.

Although the user has left the second area R2, when the user does not enter the third area R3, the image forming apparatus 100 does not perform the image forming operation. As described above, when the image forming operation is not performed but a printed material receiving check operation is performed, it may be determined erroneously that the printed material has been received.

Also, when the user has entered the third area R3 and receives the printed material, since the received printed material message is stored in the printed material receiving storage area, the image forming apparatus 100 may determine whether the user has received the printed material by checking the printed material receiving storage area.

When it is determined that the user has not received the printed material (NO in 3150), the image forming apparatus 100 transmits an unreceived printed material message to the portable electronic device 10 (3152). In detail, the image forming apparatus 100 may transmit the unreceived printed material message to the portable electronic device 10 through the wireless communication module 620 in the connecting mode CON.

When it is determined that the user has left the first area R1 (leave the first area in 3130), the image forming apparatus 100 checks whether the user has received the printed material (3160). Here, the image forming apparatus 100 may determine whether the printed material is received depending on whether the received printed material message is stored in the printed material receiving storage area.

Although the user has left the first area R1, when the user does not enter the third area R3, the image forming apparatus 100 does not perform the image forming operation. As described above, when the image forming operation is not performed but the printed material receiving check operation is performed, it may be determined erroneously that the printed material has been received.

Also, when the user has entered the third area R3 and receives the printed material, since the received printed material message is stored in the printed material receiving storage area, the image forming apparatus 100 may determine whether the user has received the printed material by checking the printed material receiving storage area.

When it is determined that the user has not received the printed material (NO in 3160), the image forming apparatus 100 transmits an unreceived printed material message to the portable electronic device 10 (3162).

In detail, the image forming apparatus 100 may transmit the unreceived printed material message to the portable electronic device 10 through the wireless communication module 620 in the connecting mode CON.

As described above, when the user moves away from the image forming apparatus 100, the image forming apparatus 100 checks whether the user has received the printed material. When the printed material has not been received, the unreceived printed material message is transmitted to the portable electronic device 10.

Figure 31:
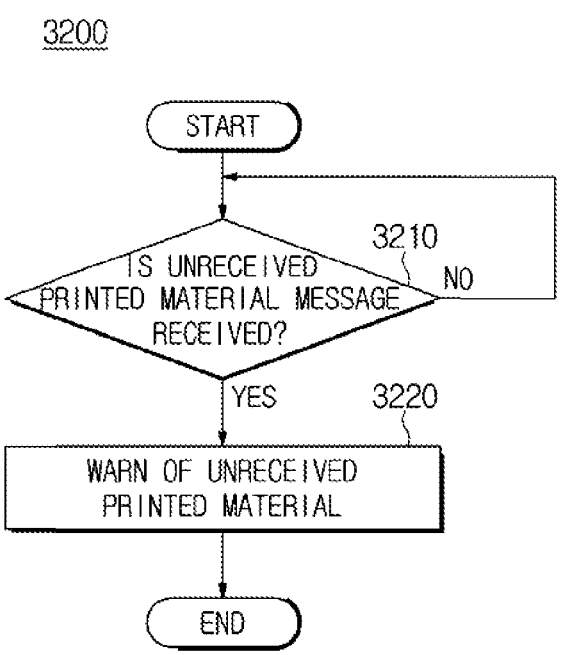
FIGS. 31 and 32 illustrate an example of an unreceived printed material warning operation of the portable electronic device according to an embodiment of the disclosure.
Figure 32:
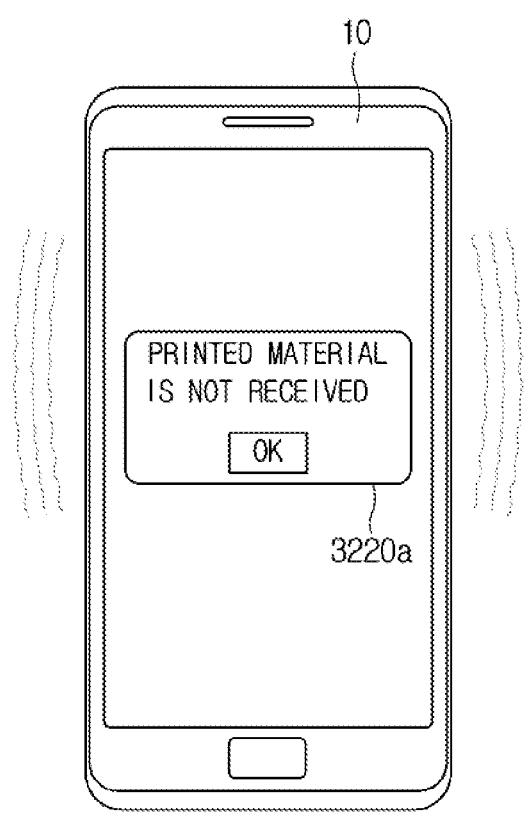

FIGS. 31 and 32 illustrate an example of an unreceived printed material warning operation 3200 of the portable electronic device 10 according to an embodiment of the disclosure. Referring to FIGS. 31 and 32, the unreceived printed material warning operation 3200 of the portable electronic device 10 according to the distance between the image forming apparatus 100 and the user will be described.

The portable electronic device 10 determines whether the unreceived printed material message is received from the image forming apparatus 100 (3210).

The portable electronic device 10 which transmits the messages related to the position of the user described above stands by for an additional message or request from the image forming apparatus 100 while maintaining the connecting with the image forming apparatus 100. While standing by for the additional message or request as described above, the portable electronic device 10 may determine whether the unreceived printed material message is received from the image forming apparatus 100.

When the unreceived printed material message is received (YES in 3210), the portable electronic device 10 alerts the user to unreceived printed material (3220).

For example, the portable electronic device 10, as shown in FIG. 32, may oscillate (vibrate) or may display an unreceived warning screen 3220a.

As described above, when the user moves away from the image forming apparatus 100, the image forming system 1 checks whether the user has received the printed material. When it is determined that the printed material has not been received, the image forming system 1 alerts the user to the unreceived printed material through the portable electronic device 10.

Also, when the user moves away from the image forming apparatus 100, the image forming apparatus 100 may contact the user about whether to assign the receipt of the printed material to a third party through the portable electronic device 10.

The user may assign the receipt of the printed material to the third party depending on a selection of the user.

For example, the user may designate the third party as a substitute for receiving when inputting an initial print command.

As described above, the portable electronic device 10 generates a printing job which may include an image forming command, image data, authentication information of the user who transmits the image forming command, identification information of the portable electronic device 10, and identification information of the image forming apparatus 100 which performs an image forming operation together with authentication information of the substitute for receiving.

Here, the authentication information of the substitute for receiving may include the identification information for identifying the substitute for receiving such as the name of the substitute for receiving and a unique number of the substitute for receiving or a password set by the user. In addition, identification information of a portable electronic device carried by the substitute for receiving may be used as the authentication information of the substitute for receiving.

As described above, when the third party is designated as the substitute for receiving, the image forming system 1 performs user authentication by comparing user authentication information received from the portable electronic device 10 with the user authentication information and the authentication information of the substitute for receiving included in the printing job.

Also, the image forming system 1 may contact the user about whether to assign the receipt of the printed material to the third party.

For example, when the user has not received the printed material for a certain time, the image forming system 1 may contact the user about the assignment of the receipt of the printed material.

In detail, when the user does not approach the image forming apparatus 100 for a certain time after transmitting the printing job to the image forming apparatus 100 or when the user stays in one of the first area R1 and the second area R2 for a long time, the image forming system 1 may inquire about the assignment of the receipt of the printed material through the portable electronic device 10.

As another example, when the user has not received the printed material and moves away from the image forming apparatus 100, the image forming apparatus 100 may contact the user about the assignment of the receipt of the printed material.

The assignment of the receipt of the printed material when the user has not received the printed material and moves away from the image forming apparatus 100 will be described below in detail.

Figure 33:
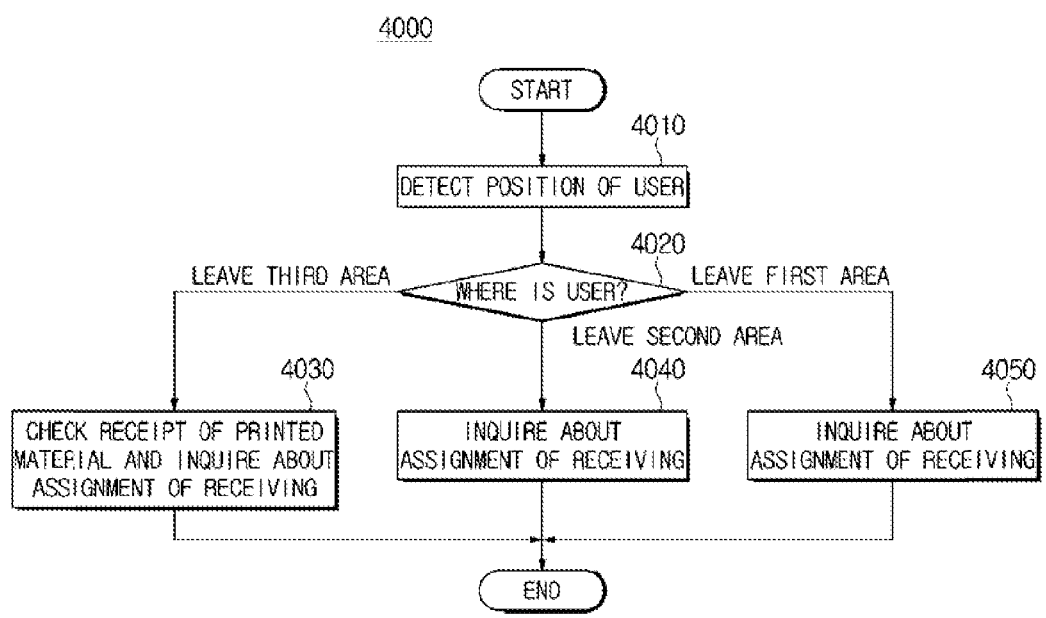
FIGS. 33 and 34 illustrate an example of a printed material receiving assignment operation of the image forming system according to an embodiment of the disclosure.
Figure 34:
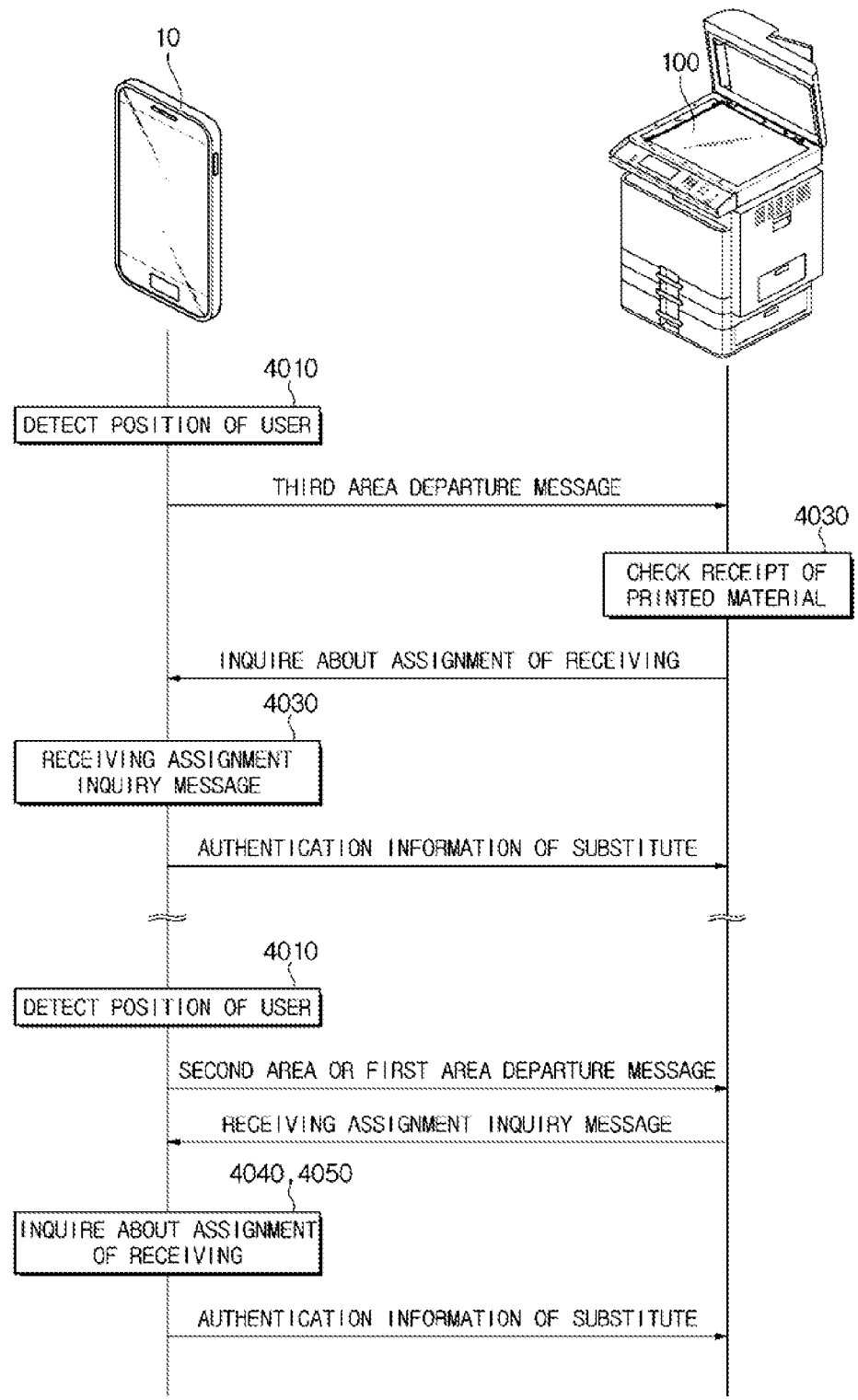

FIGS. 33 and 34 illustrate an example of a printed material receiving assignment operation 4000 of the image forming system 1 according to an embodiment of the disclosure. Referring to FIGS. 33 and 34, the printed material receiving assignment operation 4000 of the image forming system 1 will be described.

The image forming system 1 detects the position of the user (4010).

For example, the portable electronic device 10 included in the image forming system 1 may calculate a distance between the user and the image forming apparatus 100 based on the receiving intensity of the advertising signal ADV_SIG transmitted by the image forming apparatus 100 and may determine the position of the user based on the image forming apparatus 100.

As another example, the image forming apparatus 100 may calculate the distance between the user and the image forming apparatus 100 based on the receiving intensity of the advertising signal ADV_SIG output by the portable electronic device 10 and may determine a relative position of the user based on the image forming apparatus 100.

After the position of the user is detected, the image forming system 1 determines whether the user has left the third area R3, whether the user has left the second area R2, or whether the user has left the first area R1 (4020).

For example, when the image forming apparatus 100 outputs the advertising signal ADV_SIG, the image forming system 1 may determine the position of the user according to a message received by the image forming apparatus 100 from the portable electronic device 10.

When the image forming apparatus 100 receives a third area departure message, the image forming system 1 may determine that the user has left the third area R3. When the image forming apparatus 100 receives a second area departure message, the image forming system 1 may determine that the user has left the second area R2. Also, when the image forming apparatus 100 receives a first area departure message, the image forming system 1 may determine that the user has left the first area R1.

As another example, when the portable electronic device 10 outputs the advertising signal ADV_SIG, the image forming system 1 may determine the position of the user according to the distance between the portable electronic device 10 and the image forming apparatus 100 detected by the image forming apparatus 100.

When it is determined that the user has left the third area R3 (leave the third area in 4020), the image forming system 1 determines whether the user has received the printed material through the image forming apparatus 100. When it is determined that the user has not received the printed material, the image forming system 1 may transmit a receiving assignment inquiry message to the portable electronic device 10 (4030).

Since the printed material receiving check operation has been described above, a repetitive description thereof will be omitted. The receiving assignment operation will be described in detail.

When it is determined that the user has left the second area R2 or the first area R1 (leave the second area or the first area in 4020), the image forming system 1 may transmit a receiving assignment inquiry message to the portable electronic device 10 (4040 and 4050).

Hereinafter, operations of the image forming apparatus 100 and the portable electronic device 10 will be described in detail.

Figure 35:
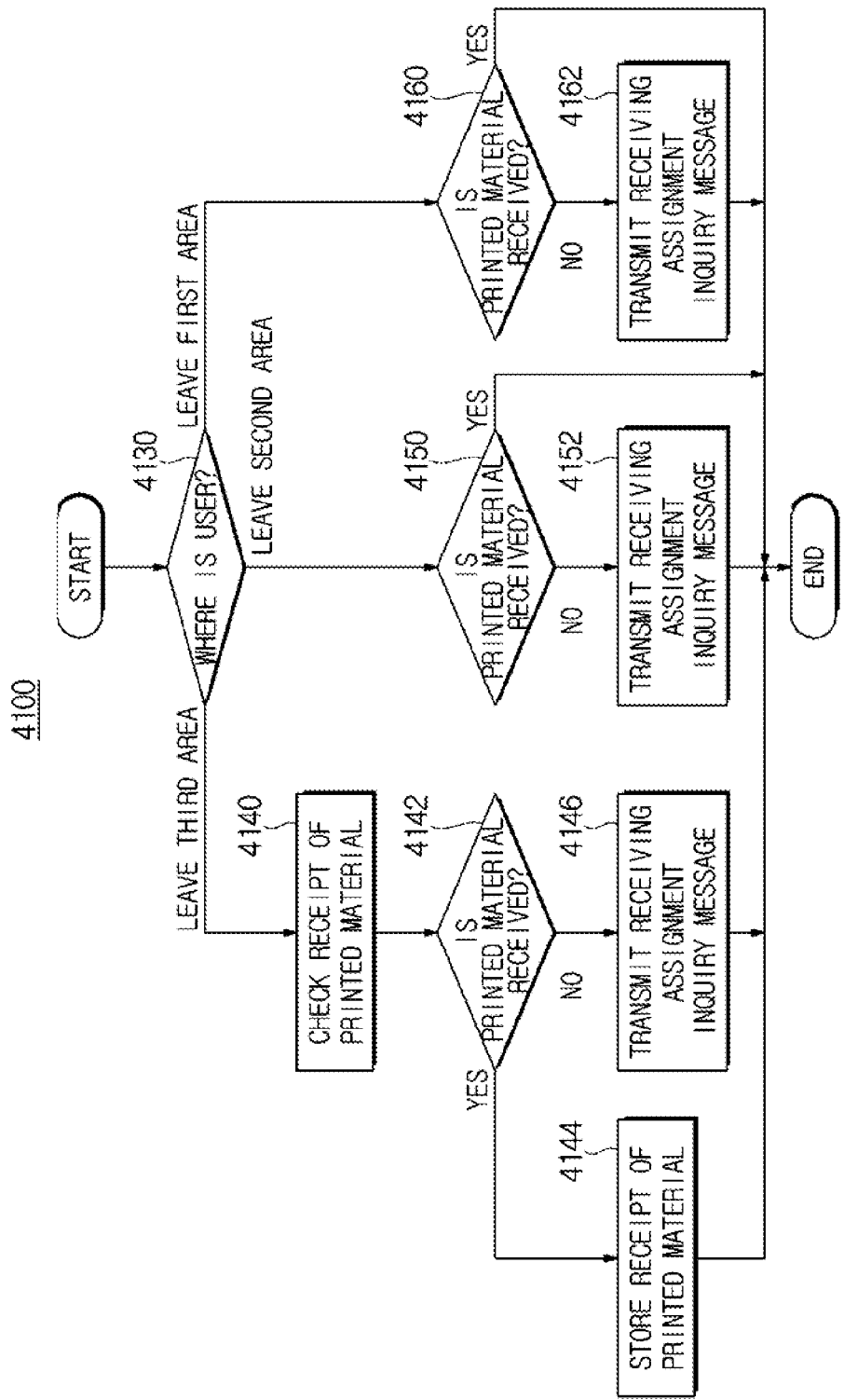
FIG. 35 illustrates an example of a printed material reception assignment operation of the image forming apparatus according to an embodiment of the disclosure.

FIG. 35 illustrates an example of a printed material receiving assignment operation 4100 of the image forming apparatus 100 according to an embodiment of the disclosure.

Referring to FIG. 35, the printed material receiving assignment operation 4100 of the image forming apparatus 100 according to the distance between the image forming apparatus 100 and the user will be described.

The image forming apparatus 100 determines the position of the user (4130).

The image forming apparatus 100 may determine the position of the user using the method described above.

For example, when the image forming apparatus 100 outputs the advertising signal ADV_SIG, the image forming apparatus 100 may determine a relative position of the user according to a message transmitted by the portable electronic device 10.

As another example, when the portable electronic device 10 outputs the advertising signal ADV_SIG, the image forming apparatus 100 may determine the relative position of the user based on the receiving intensity of the advertising signal ADV_SIG.

When it is determined that the user has left the third area R3 (leave the third area in 4130), the image forming apparatus 100 checks whether the user has received the printed material (4140).

As described above, the image forming apparatus 100 performs an image forming operation when the user has entered the third area R3. Accordingly, when the user leaves the third area R3, the image forming apparatus 100 is performing the image forming operation or has completed the image forming operation.

Accordingly, when the user has left the third area R3, the image forming apparatus 100 may check whether the user has received the printed material.

The image forming apparatus 100 may check whether the user has received the printed material through various methods. Since the printed material receiving check method has been described above, a repetitive description thereof will be omitted.

Afterward, the image forming apparatus 100 determines whether the user has received the printed material (4142).

When it is determined that the user has received the printed material (YES in 4142), the image forming apparatus 100 stores the received printed material message in one or more of the storage unit 500 and the memory 720 (4144).

For example, a printed material receiving storage area which stores the received printed material message is provided in one or more of the storage unit 500 and the memory 720. When it is determined that the user has received the printed material, the image forming apparatus 100 may store the received printed material message in the printed material receiving storage area.

When it is determined that the user has not received the printed material (NO in 4142), the image forming apparatus 100 transmits a receiving assignment inquiry message to the portable electronic device 10 (4146). The image forming apparatus 100 may transmit the receiving assignment inquiry message to the portable electronic device 10 through the wireless communication module 620 in the connecting mode CON.

As described below, when the image forming apparatus 100 transmits the receiving assignment inquiry message, the portable electronic device 10 contacts the user about the printed material receiving assignment.

When it is determined that the user has left the second area R2 (leave the second area in 4130), the image forming apparatus 100 checks whether the user has received the printed material (4150). Here, the image forming apparatus 100 may determine whether the printed material has been received depending on whether the received printed material message is stored in the printed material receiving storage area.

Although the user has left the second area R2, when the user does not enter the third area R3, the image forming apparatus 100 does not perform the image forming operation. As described above, when the image forming operation is not performed but the printed material receiving check operation is performed, it may be determined erroneously that the printed material has been received.

Also, when the user has entered the third area R3 and receives the printed material, since the received printed material message is stored in the printed material receiving storage area, the image forming apparatus 100 may determine whether the user has received the printed material by checking the printed material receiving storage area.

When it is determined that the user has not received the printed material (NO in 4150), the image forming apparatus 100 transmits the receiving assignment inquiry message to the portable electronic device 10 (4152). In detail, the image forming apparatus 100 may transmit the receiving assignment inquiry message to the portable electronic device 10 through the wireless communication module 620 in the connecting mode CON.

When it is determined that the user has left the first area R1 (leave the first area in 4130), the image forming apparatus 100 checks whether the user has received printed material (4160). Here, the image forming apparatus 100 may determine whether the printed material has been received depending on whether the received printed material message is stored in the printed material receiving storage area.

Although the user has left the first area R1, when the user does not enter the third area R3, the image forming apparatus 100 does not perform the image forming operation. As described above, when the image forming operation is not performed but the printed material receiving check operation is performed, it may be determined erroneously that the printed material has been received.

Also, when the user has entered the third area R3 and receives the printed material, since the received printed material message is stored in the printed material receiving storage area, the image forming apparatus 100 may determine whether the user has received the printed material by checking the printed material receiving storage area.

When it is determined that the user has not received the printed material (NO in 4160), the image forming apparatus 100 transmits the receiving assignment inquiry message to the portable electronic device 10 (4162).

As described above, when the user moves away from the image forming apparatus 100, the image forming apparatus 100 checks whether the user has received the printed material. When the printed material has not been received, the receiving assignment inquiry message is transmitted to the portable electronic device 10.

Figure 36:
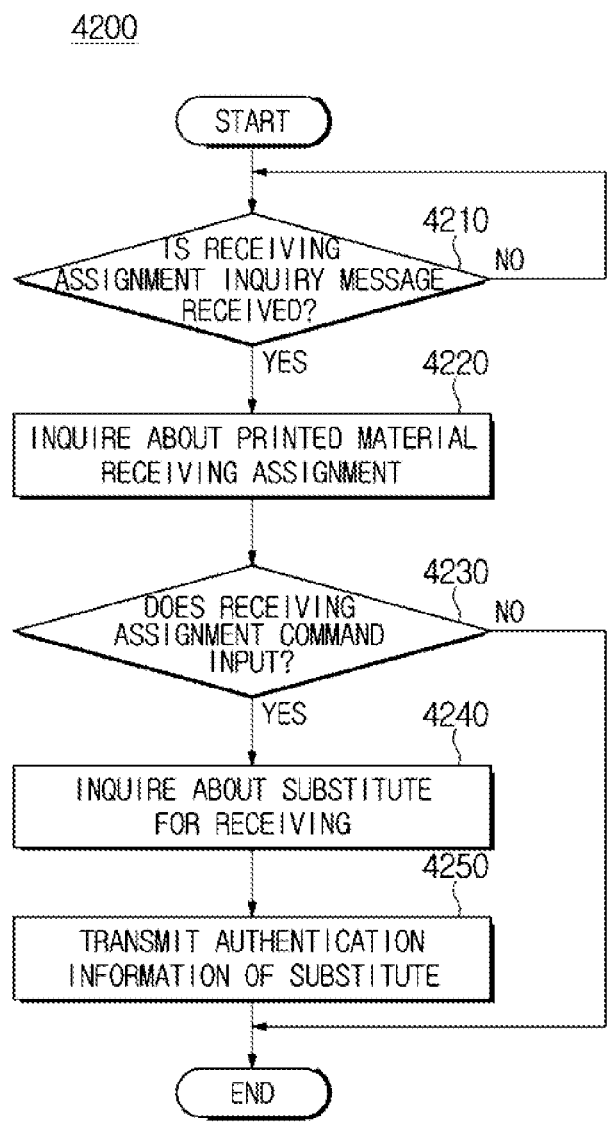
FIGS. 36 to 38 illustrate an example of a printed material receiving assignment operation of the portable electronic device according to an embodiment of the disclosure.
Figure 37:
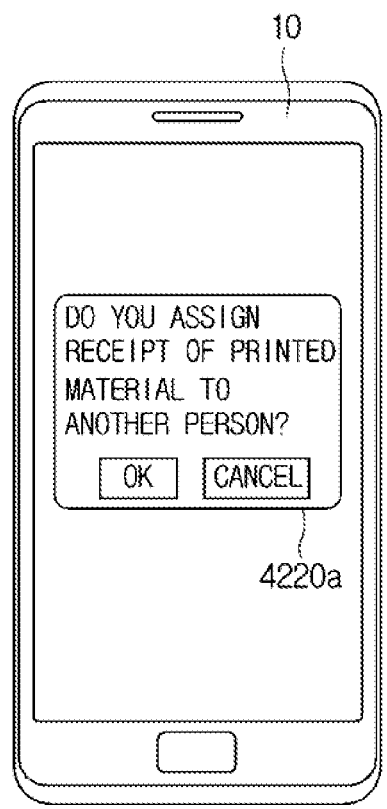
Figure 38:
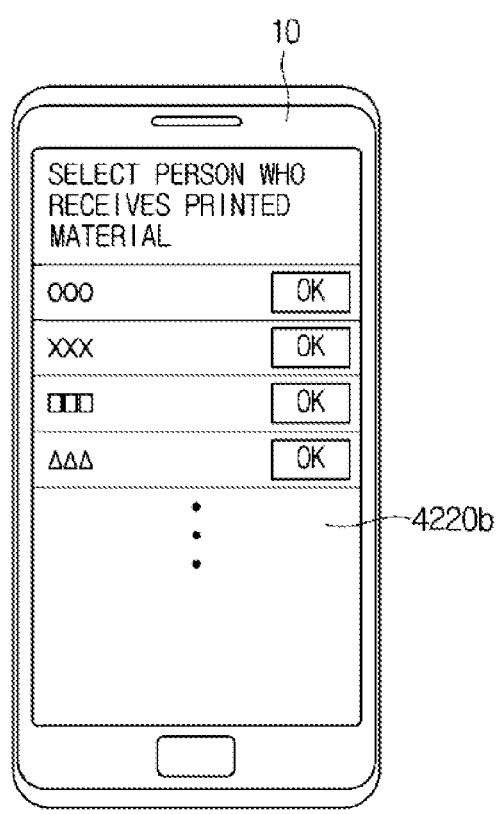

FIGS. 36 to 38 illustrate an example of a printed material receiving assignment operation 4200 of the portable electronic device 10 according to an embodiment of the disclosure. Referring to FIGS. 36 to 38, the printed material receiving assignment operation 4200 of the portable electronic device 10 according to the distance between the image forming apparatus 100 and the user will be described.

The portable electronic device 10 determines whether the receiving assignment inquiry message has been received from the image forming apparatus 100 (4210).

The portable electronic device 10 which transmits the messages related to the position of the user described above stands by for an additional message or request from the image forming apparatus 100 while maintaining the connecting with the image forming apparatus 100. While standing by for the additional message or request as described above, the portable electronic device 10 may determine whether the receiving assignment inquiry message has been received from the image forming apparatus 100.

When the receiving assignment inquiry message is received (YES in 4210), the portable electronic device 10 may contact the user about printed material receiving assignment (4220).

For example, the portable electronic device 10, as shown in FIG. 37, may display a receiving assignment inquiry screen 4220a.

Afterward, the portable electronic device 10 determines whether the user has input a receiving assignment command (4230).

For example, the user may input the receiving assignment command by pushing "OK" button on the receiving assignment inquiry screen 4220a. When the user pushes or touches a "cancel" button on the receiving assignment inquiry screen 4220a, the receiving assignment is canceled.

When the user inputs the receiving assignment command (YES in 4230), the portable electronic device 10 inquires about a substitute for receiving (4240).

For example, the portable electronic device 10 displays a receiving substitute selection screen 4220b as shown in FIG. 38 to allow the user to select the substitute for receiving.

On the receiving substitute selection screen 4220b, third parties selectable as the substitute for receiving are displayed. The user may determine one or more of the third parties displayed on the receiving substitute selection screen 4220b as the substitute for receiving.

When the substitute for receiving is determined, the portable electronic device 10 transmits authentication information of the substitute for receiving to the image forming apparatus 100 (4250).

The authentication information of the substitute for receiving may include identification information for identifying the substitute for receiving such as the name of the substitute for receiving and a unique number of the substitute for receiving or a password set by the user. In addition, identification information of a portable electronic device carried by the substitute for receiving may be used as the authentication information of the substitute for receiving.

Afterward, the image forming apparatus 100 which has received the authentication information of the substitute for receiving adds the authentication information of the substitute for receiving to a printing job.

Also, the image forming apparatus 100 may transmit a printed material receiving assignment message which indicates the receipt of printed material is assigned to the substitute for receiving based on the received authentication information of the substitute for receiving.

For example, the image forming apparatus 100 may transmit the printed material receiving assignment message to the portable electronic device of the substitute for receiving by using the identification information of the portable electronic device included in the authentication information of the substitute for receiving.

The substitute for receiving may determine whether to receive the printed material. Also, when the substitute for receiving accepts the receipt of printed material, the image forming apparatus 100 transmits a message which indicates that the substitute for receiving has accepted the receipt of printed material to the user. When the substitute for receiving refuses the receipt of printed material, the image forming apparatus 100 may transmit a message which indicates that the substitute for receiving has refused the receipt of printed material to the user.

Also, the image forming apparatus 100 may authenticate not only the user but also the substitute for receiving as a user who may receive the printed material while performing a user authentication operation.

As described above, when the receiving assignment inquiry message is received, the portable electronic device 10 contacts the user about the printed material receiving assignment and allows the user to select the substitute for receiving.

Also, when the user determines a third party as the substitute for receiving in advance, the portable electronic device 10 may select the predetermined third party as the substitute for receiving without additional receiving assignment inquiry operation.

Figure 39:
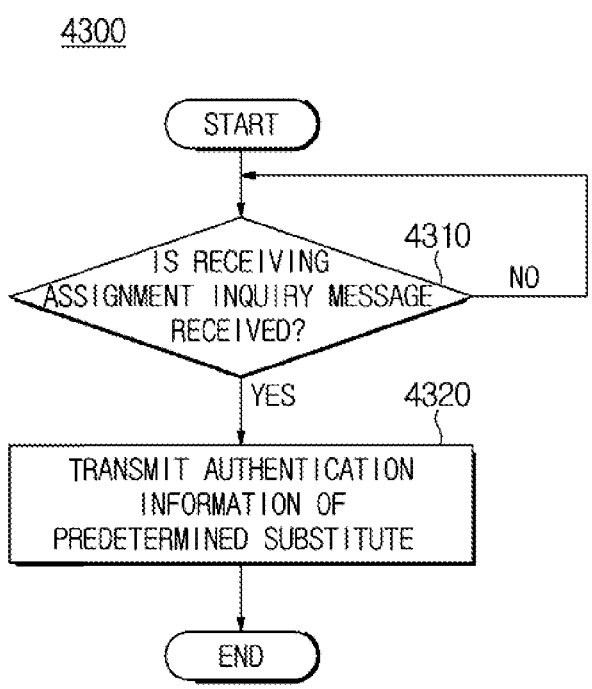
FIG. 39 illustrates another example of the printed material receiving assignment operation of the portable electronic device according to an embodiment of the disclosure.

FIG. 39 illustrates an example of the printed material receiving assignment operation 4300 of the portable electronic device 10 according to an embodiment of the disclosure.

The portable electronic device 10 determines whether the receiving assignment inquiry message has been received from the image forming apparatus 100 (4310).

The portable electronic device 10 which transmits the messages related to the position of the user described above stands by for an additional message or request from the image forming apparatus 100 while maintaining the connecting with the image forming apparatus 100. While standing by for the additional message or request as described above, the portable electronic device 10 may determine whether the receiving assignment inquiry message has been received from the image forming apparatus 100.

When the receiving assignment inquiry message is received (YES in 4310), the portable electronic device 10 transmits authentication information of a substitute for receiving predetermined by the user to the image forming apparatus 100 (4320).

As described, when the user predetermines a third party as the substitute for receiving, the image forming system 1 may select the third party predetermined by the user as the substitute for receiving without an additional operation and may transmit authentication information of the third party predetermined by the user to the image forming apparatus 100.

Also, when the user moves away from the image forming apparatus 100, the image forming apparatus 100 may shift into a standby mode.

The image forming apparatus 100 may enter the standby mode when the user moves away after printed material has been output due to the approach of the user or a standby time after the output of the printed material is more than a predetermined reference standby time.

In the standby mode, the image forming apparatus 100 may cut off power to some components of the image forming apparatus 100 to reduce standby power consumption. For example, the image forming apparatus 100 may cut off power to the heating roller 251 included in the fixing section 250 and the LSU included in the exposing section 220.

As described above, as the user enters the third area R3, the image forming apparatus 100 may perform an image forming operation. Afterward, a time in which the image forming apparatus 100 stands by for a new image forming operation command is more than the predetermined reference standby time, the image forming apparatus 100 may shift into the standby mode.

Also, when the user moves farther away from the image forming apparatus 100, the image forming apparatus 100 may shift into the standby mode.

Figure 40:
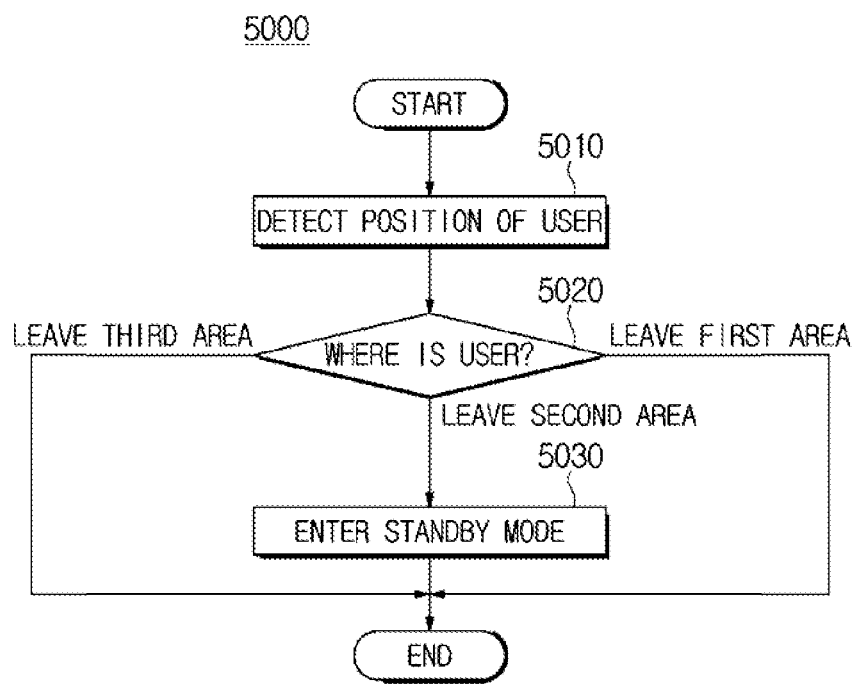
FIG. 40 illustrates an example of a standby mode entry operation of the image forming apparatus according to an embodiment of the disclosure.

FIG. 40 illustrates an example of a standby mode entry operation 5000 of the image forming apparatus 100 according to an embodiment of the disclosure.

Referring to FIG. 40, the image forming system 1 detects the position of the user (5010).

For example, the portable electronic device 10 included in the image forming system 1 may calculate a distance between the user and the image forming apparatus 100 based on the receiving intensity of the advertising signal ADV_SIG transmitted by the image forming apparatus 100 and may determine the position of the user based on the image forming apparatus 100.

As another example, the image forming apparatus 100 may calculate the distance between the user and the image forming apparatus 100 based on the receiving intensity of the advertising signal ADV_SIG output by the portable electronic device 10 and may determine a relative position of the user based on the image forming apparatus 100.

After the position of the user is detected, the image forming system 1 determines whether the user has left the third area R3, whether the user has left the second area R2, or whether the user has left the first area R1 (5020).

For example, when the image forming apparatus 100 outputs the advertising signal ADV_SIG, the image forming system 1 may determine the position of the user according to a message received by the image forming apparatus 100 from the portable electronic device 10.

When the image forming apparatus 100 receives a third area departure message, the image forming system 1 may determine that the user has left the third area R3. When the image forming apparatus 100 receives a second area departure message, the image forming system 1 may determine that the user has left the second area R2. Also, when the image forming apparatus 100 receives a first area departure message, the image forming system 1 may determine that the user has left the first area R1.

As another example, when the portable electronic device 10 outputs the advertising signal ADV_SIG, the image forming system 1 may determine the position of the user according to a distance between the portable electronic device 10 and the image forming apparatus 100 detected by the image forming apparatus 100.

When it is determined that the user has left the second area R2 (leave the second area in 5020), the image forming system 1 shifts the image forming apparatus 100 into a standby mode (5030).

For example, the image forming apparatus 100 may cut off power to the heating roller 251 included in the fixing section 250 and the LSU included in the exposing section 220.

When it is determined that the user has left one of the third area R3 and the first area R1 (leave the third area or the first area in 5020), the image forming system 1 may not perform an additional operation.

As described above, the image forming system 1 may shift the image forming apparatus 100 into the standby mode when the user has left or leaves the second area R2.

As described above, the image forming system 1 calculates the distance between the image forming apparatus 100 and the user based on the advertising signal ADV_SIG output by the image forming apparatus 100 and determines the position of the user based on the image forming apparatus 100 based on the calculated distance.

Also, the image forming system 1 may provide the user with convenience by performing various operations depending on the position of the user.

As described above, the image forming apparatus 100 may perform various operations according to a distance between an authenticated user who transmits a printing job and the image forming apparatus 100.

However, as described above, the function of the image forming apparatus 100 is not limited to a printing operation. For example, the image forming apparatus 100 may perform a copying operation in which an image of a document is obtained and an image corresponding to the obtained image is formed and may perform a scanning operation in which an image of a document is obtained and the obtained image is stored.

Hereinafter, an operation of the image forming apparatus 100 according to a distance between another user who is not authenticated, that is, who does not transmit a printing job and the image forming apparatus 100 will be described.

Figure 41:
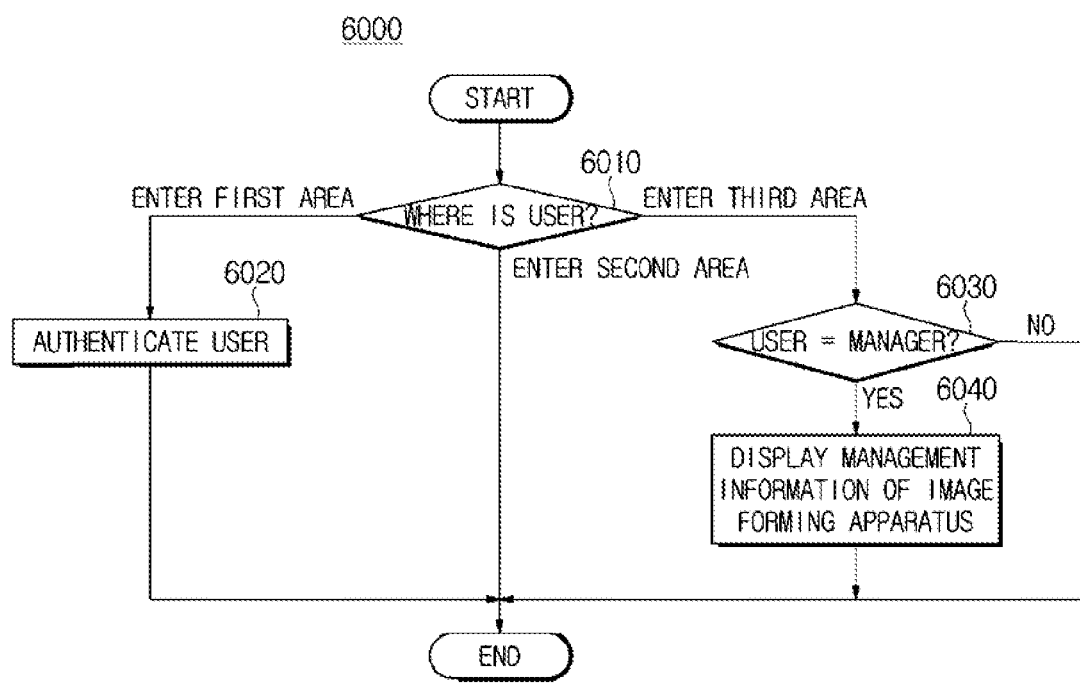
FIG. 41 illustrates an example in which the image forming apparatus displays management information according to an embodiment of the disclosure.

FIG. 41 illustrates an example operation 6000 in which the image forming apparatus 100 displays management information according to an embodiment of the disclosure.

Referring to FIG. 41, the image forming system 1 detects the position of the user (6010).

For example, the portable electronic device 10 included in the image forming system 1 may calculate a distance between the user and the image forming apparatus 100 based on the receiving intensity of the advertising signal ADV_SIG transmitted by the image forming apparatus 100 and may determine the position of the user based on the image forming apparatus 100.

As another example, the image forming apparatus 100 may calculate the distance between the user and the image forming apparatus 100 based on the receiving intensity of the advertising signal ADV_SIG output by the portable electronic device 10 and may determine a relative position of the user based on the image forming apparatus 100.

After the position of the user is detected, the image forming system 1 determines whether the user has entered the first area R1, whether the user has entered the second area R2, or whether the user has entered the third area R3.

For example, when the image forming apparatus 100 outputs the advertising signal ADV_SIG, the image forming system 1 may determine the position of the user according to a message received by the image forming apparatus 100 from the portable electronic device 10.

As another example, when the portable electronic device 10 outputs the advertising signal ADV_SIG, the image forming system 1 may determine the position of the user according to a change in distance between the portable electronic device 10 and the image forming apparatus 100 detected by the image forming apparatus 100.

When it is determined that the user has entered the first area R1 (enter the first area in 6010), the image forming system 1 performs user authentication (6020).

In detail, the image forming apparatus 100 may request identification information of the user from the portable electronic device 10 of the user to authenticate the user.

When the identification information of the user is received, the image forming apparatus 100 may compare identification information included in a printing job for user authentication with the identification information of the user received from the portable electronic device 10.

When the identification information included in the printing job is identical to the identification information of the user received from the portable electronic device 10, the image forming apparatus 100 may store the identification information of the user received from the portable electronic device 10 as identification information of an authenticated user in one or more of the memory 720 and the storage unit 500.

When it is determined that the user has entered the third area R3 (enter the third area in S6010), the image forming system 1 determines whether the user is a manager (administrator) (6030).

For example, when the user has entered the third area R3, the image forming apparatus 100 may request the identification information of the user from the portable electronic device 10 and may compare the identification information of the user received from the portable electronic device 10 with identification information of the manager.

When it is determined that the user is the manager (YES in 6030), the image forming apparatus 100 may display management information of the image forming apparatus 100 (6040).

For example, when the user is the manager of the image forming apparatus 100, the image forming apparatus 100 may detect whether the image forming apparatus 100 breaks down or malfunctions and may display whether the image forming apparatus 100 breaks down or malfunctions through the user interface 400. Also, the image forming apparatus 100 may detect a residual amount of consumables such as toner and may display information related to the residual amount of consumables through the user interface 400.

Hereinafter, a scanning operation 6100 of the image forming apparatus 100 according to a distance between the user and the image forming apparatus 100 will be described.

Figure 42:
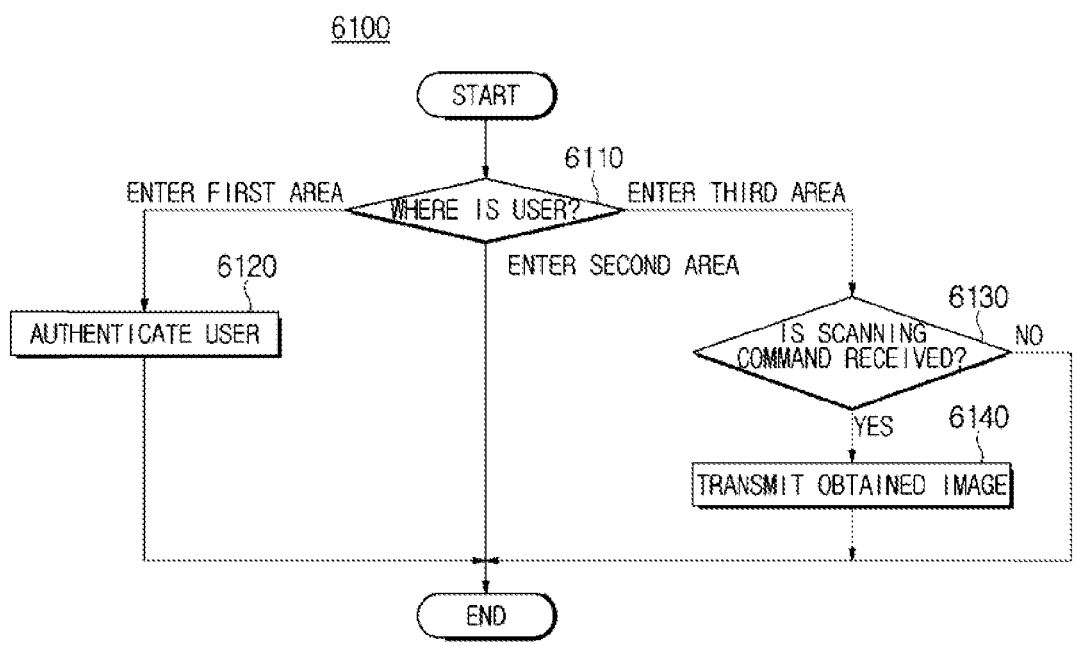
FIG. 42 illustrates an example of a scanning operation performable by the image forming apparatus according to an embodiment of the disclosure.

FIG. 42 illustrates an example of the scanning operation 6100 performable by the image forming apparatus 100 according to an embodiment of the disclosure.

Referring to FIG. 42, the image forming system 1 detects a position of the user (6110).

For example, the portable electronic device 10 included in the image forming system 1 may calculate the distance between the user and the image forming apparatus 100 based on the receiving intensity of the advertising signal ADV_SIG transmitted by the image forming apparatus 100 and may determine the position of the user based on the image forming apparatus 100.

As another example, the image forming apparatus 100 may calculate the distance between the user and the image forming apparatus 100 based on the receiving intensity of the advertising signal ADV_SIG output by the portable electronic device 10 and may determine a relative position of the user based on the image forming apparatus 100.

After the position of the user is detected, the image forming system 1 determines whether the user has entered the first area R1, whether the user has entered the second area R2, or whether the user has entered the third area R3.

For example, when the image forming apparatus 100 outputs the advertising signal ADV_SIG, the image forming system 1 may determine the position of the user according to a message received by the image forming apparatus 100 from the portable electronic device 10.

As another example, when the portable electronic device 10 outputs the advertising signal ADV_SIG, the image forming system 1 may determine the position of the user according to a change in distance between the portable electronic device 10 and the image forming apparatus 100 detected by the image forming apparatus 100.

When it is determined that the user has entered the first area R1 (enter the first area in 6010), the image forming system 1 performs user authentication (6120).

In detail, the image forming apparatus 100 may request identification information of the user from the portable electronic device 10 of the user to authenticate the user.

When the identification information of the user is received, the image forming apparatus 100 may compare identification information included in a printing job for user authentication with the identification information of the user received from the portable electronic device 10.

When the identification information included in the printing job is identical to the identification information of the user received from the portable electronic device 10, the image forming apparatus 100 may store the identification information of the user received from the portable electronic device 10 as identification information of an authenticated user in one or more of the memory 720 and the storage unit 500.

When it is determined that the user has entered the third area R3 (enter the third area in 6110), the image forming system 1 determines whether a scanning command has been received (6130).

The user may dispose the document D on one of the document tray 131 (refer to FIG. 12) and the flatbed 121 (refer to FIG. 12) of the image forming apparatus 100 and then may input a scanning command (e.g., through the user interface 400) of the image forming apparatus 100.

When the scanning command is received (YES in 6130), the image forming apparatus 100 may obtain an image of the document D and may transmit the obtained image to the portable electronic device 10 of the user (6140).

For example, the image forming apparatus 100 may obtain image data on the document D using the photo sensor module 311 (refer to FIG. 12) included in the scanner 310 (refer to FIG. 12).

When the image of the document D is obtained, the image forming apparatus 100 may transmit the obtained image data to the portable electronic device 10.

For example, when the image forming apparatus 100 corresponds to an advertiser which outputs the advertising signal ADV_SIG, the image forming apparatus 100 may transmit the image data to the portable electronic device 10 through the communication network NT.

As another example, when the image forming apparatus 100 corresponds to a scanner which detects the advertising signal ADV_SIG, the image forming apparatus 100 may transmit a communication request to the portable electronic device 10 and may transmit the image data to the portable electronic device 10 when communication with the portable electronic device 10 is established.

Figure 43:
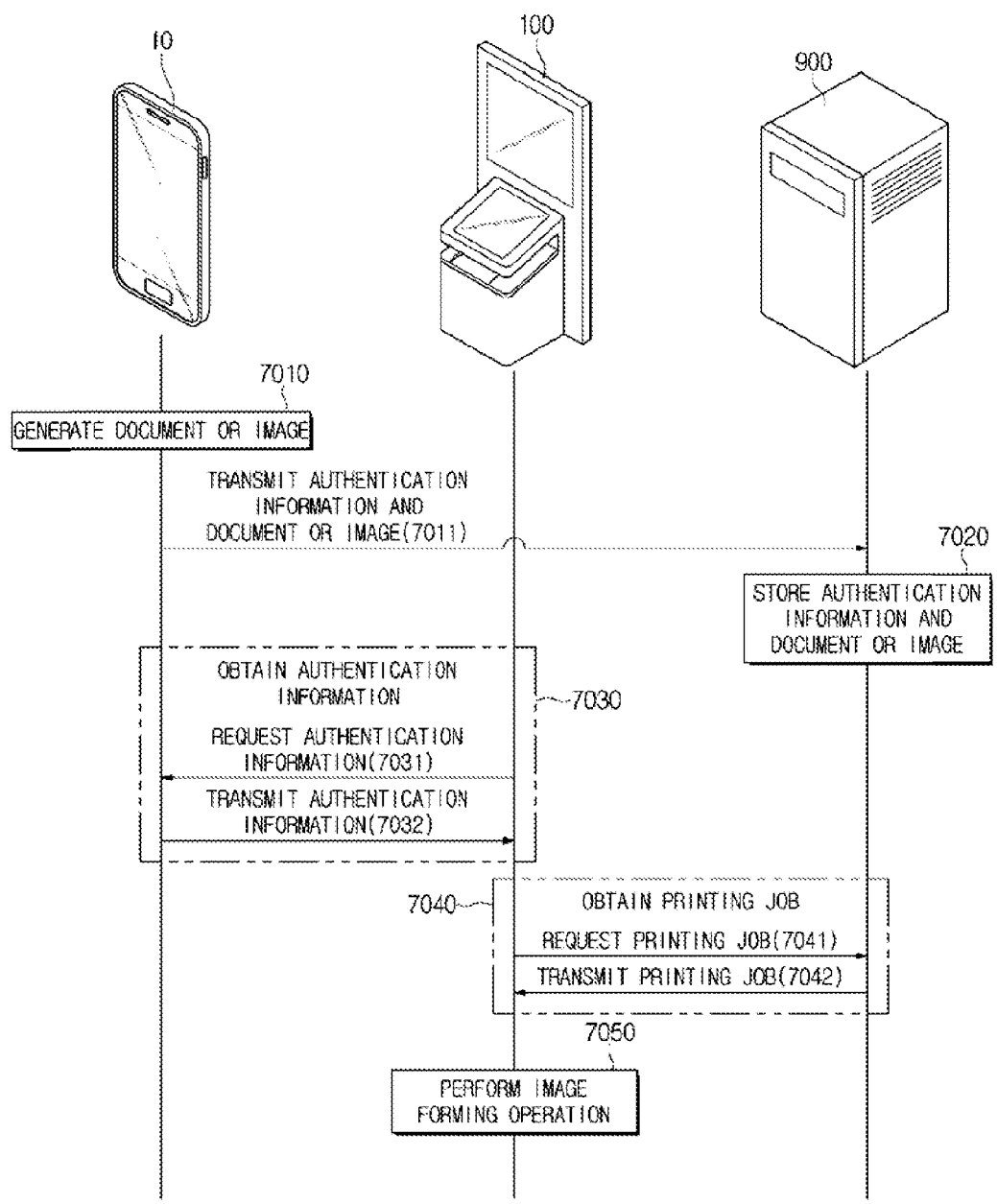
FIG. 43 illustrates another example of the image forming operation of the image forming system according to an embodiment of the disclosure.
Figure 44:
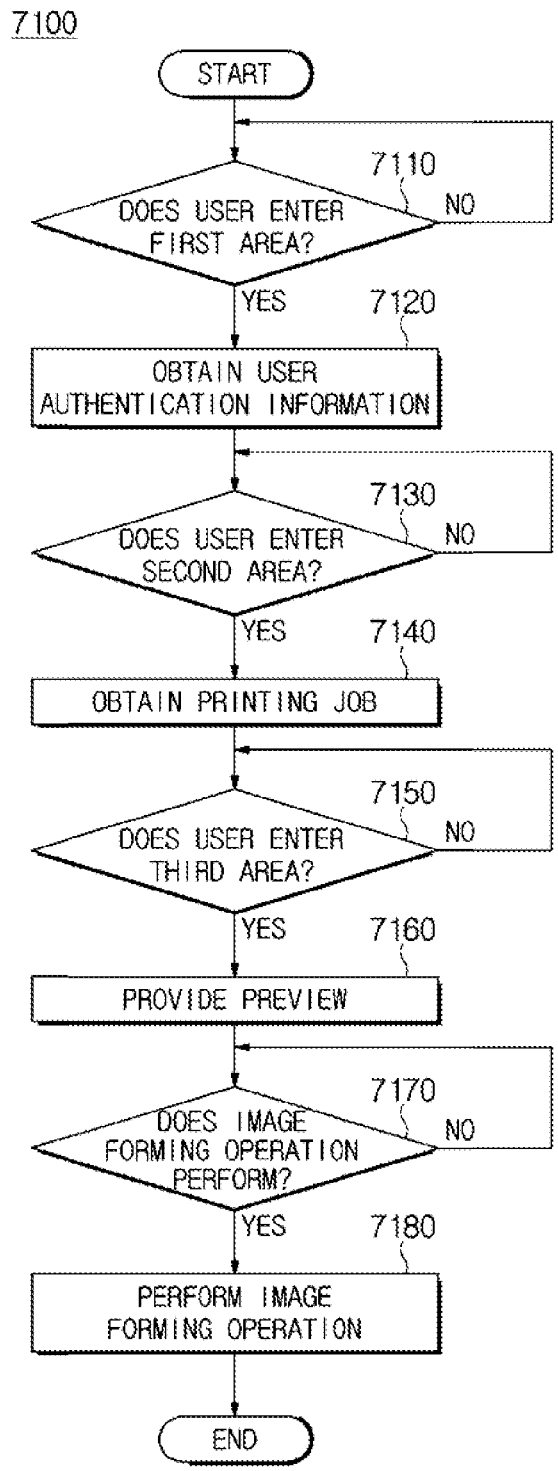
FIGS. 44 to 47 illustrate the operation of the image forming apparatus in response to the operation of the image forming system shown in FIG. 43.

FIG. 43 illustrates another example of the image forming operation of the image forming system 1 according to an embodiment of the disclosure.

Referring to FIG. 43, an image forming operation of the image forming system 1 will be described.

The portable electronic device 10 generates a document or an image for printing (7010).

For example, the user may obtain a document or an image using an Internet browser, a graphic application, and a word processor application installed in the portable electronic device 10 or may edit the document or image using the Internet browser, the graphic application, and the word processor application.

According to an embodiment of the disclosure, the user generates the document or image using the portable electronic device 10. However, the embodiment is not limited thereto. For example, the user may generate a document or image using a fixed electronic apparatus (not shown) such as a desktop computer.

After that, the portable electronic device 10 transmits the document or image together with authentication information of the user to an image forming server 900 (7011).

Also, the authentication information of the user is information which allows the user to be identified and may include the name of the user and a unique number of the user or a password set by the user. In addition, the authentication information of the user may include identification information of the portable electronic device 10 carried by the user.

The image forming server 900 may be a computing device connected to the portable electronic device 10 and the image forming apparatus 100 through a network.

Also, the image forming server 900 may store data of the document or image received from the portable electronic device 10 and may provide the image forming apparatus 100 with a printing job related to the stored data. In other words, to allow the user to use the document or image of the portable electronic device 10 at any time, the image forming server 900 may store the data related to the document or image and may transmit the printing job related to the stored document or image to the image forming apparatus 100 when the user inputs a printing command.

The portable electronic device 10 may transmit a document or image to the image forming server 900 according to a storage command of the user or may transmit the document or image stored in the portable electronic device 10 to the image forming server 900 at a predetermined time.

After that, the image forming server 900 stores the document or image together with the authentication information of the user (7020).

The image forming server 900 may store the received document or image in relation to the authentication information of the user. In detail, the image forming server 900 may generate an additional storage space according to the authentication information of the user and may store the document or image in a corresponding storage space. For example, a storage space is generated in response to identification information of the user and a received document or image may be stored in the storage space matched with the received identification information of the user.

After that, the image forming apparatus 100 obtains the authentication information of the user from the portable electronic device 10 of the user (7030).

In detail, the image forming apparatus 100 may request the authentication information of the user from the portable electronic device 10 depending on a distance between the portable electronic device 10 and the image forming apparatus 100 (7031). For example, when the distance between the portable electronic device 10 and the image forming apparatus 100 is less than a third predetermined or reference distance, the image forming apparatus 100 may request the authentication information of the user from the portable electronic device 10.

Also, the portable electronic device 10 may transmit the authentication information of the user to the image forming apparatus 100 in response to the request of the image forming apparatus 100 (7032). In detail, the portable electronic device 10 may transmit identification information which allows the user to be identified, such as the name and unique number of the user, a password set by the user, or identification information of the portable electronic device 10 to the image forming apparatus 100.

After that, the image forming apparatus 100 obtains the printing job from the image forming server 900 (7040).

In detail, the image forming apparatus 100 may transmit the authentication information of the user to the image forming server 900 and may request the printing job from the image forming server 900 depending on the distance between the portable electronic device 10 and the image forming apparatus 100 (7041). For example, the image forming apparatus 100 may transmit the authentication information of the user to the image forming server 900 and may request the printing job from the image forming server 900 when the distance between the portable electronic device 10 and the image forming apparatus 100 is less than a second predetermined or reference distance.

Also, the image forming server 900 may transmit the printing job to the image forming apparatus 100 in response to the request of the image forming apparatus 100 (7042). In detail, the image forming server 900 may search for a document or image based on the received authentication information of the user and may generate the printing job based on the searched document or image. After that, the image forming server 900 may transmit the generated printing job to the image forming apparatus 100.

After that, the image forming apparatus 100 performs an image forming operation (7050).

In detail, the image forming apparatus 100 may perform the image forming operation depending on the distance between the portable electronic device 10 and the image forming apparatus 100. For example, when the distance between the portable electronic device 10 and the image forming apparatus 100 is less than the second predetermined or reference distance, the image forming apparatus 100 may display a preview image with respect to the printing job and may perform the image forming operation with respect to the printing job in response to a printing command of the user.

As described above, the user may store a document or image in the image forming server 900 using the portable electronic device 10 and may print the document or image stored in the image forming server 900 using the image forming apparatus 100.

Hereinafter, an operation 7100 of the image forming apparatus 100 in response to the operation of the image forming system 1 shown in FIG. 43 will be described.

FIGS. 44 to 47 illustrate the operation 7100 of the image forming apparatus 100 in response to the operation of the image forming system 1 shown in FIG. 43.

Referring to FIGS. 44 to 47, the operation 7100 of the image forming apparatus 100 will be described.

The image forming apparatus 100 determines whether the user enters the first area R1 (7110).

It may be determined based on a distance between the portable electronic device 10 and the image forming apparatus 100 whether the user enters the first area R1. For example, when the distance between the portable electronic device 10 and the image forming apparatus 100 is less than a first predetermined or reference distance, it is determined that the user enters the first area R1.

In detail, the portable electronic device 10 may calculate a distance between the user and the image forming apparatus 100 based on a receiving intensity of the advertising signal ADV_SIG of the image forming apparatus 100 and may determine whether the user enters the first area R1 based on the distance between the user and the image forming apparatus 100. Also, when it is determined that the user enters the first area R1, the portable electronic device 10 may transmit a message which indicates that the user enters the first area R1 to the image forming apparatus 100.

Also, the image forming apparatus 100 may calculate the distance between the user and the image forming apparatus 100 based on a receiving intensity of the advertising signal ADV_SIG of the portable electronic device 10 and may determine whether the user enters the first area R1 based on the distance between the user and the image forming apparatus 100.

When the user enters the first area R1 (YES in 7110), the image forming apparatus 100 obtains authentication information of the user (7120).

Figure 45:
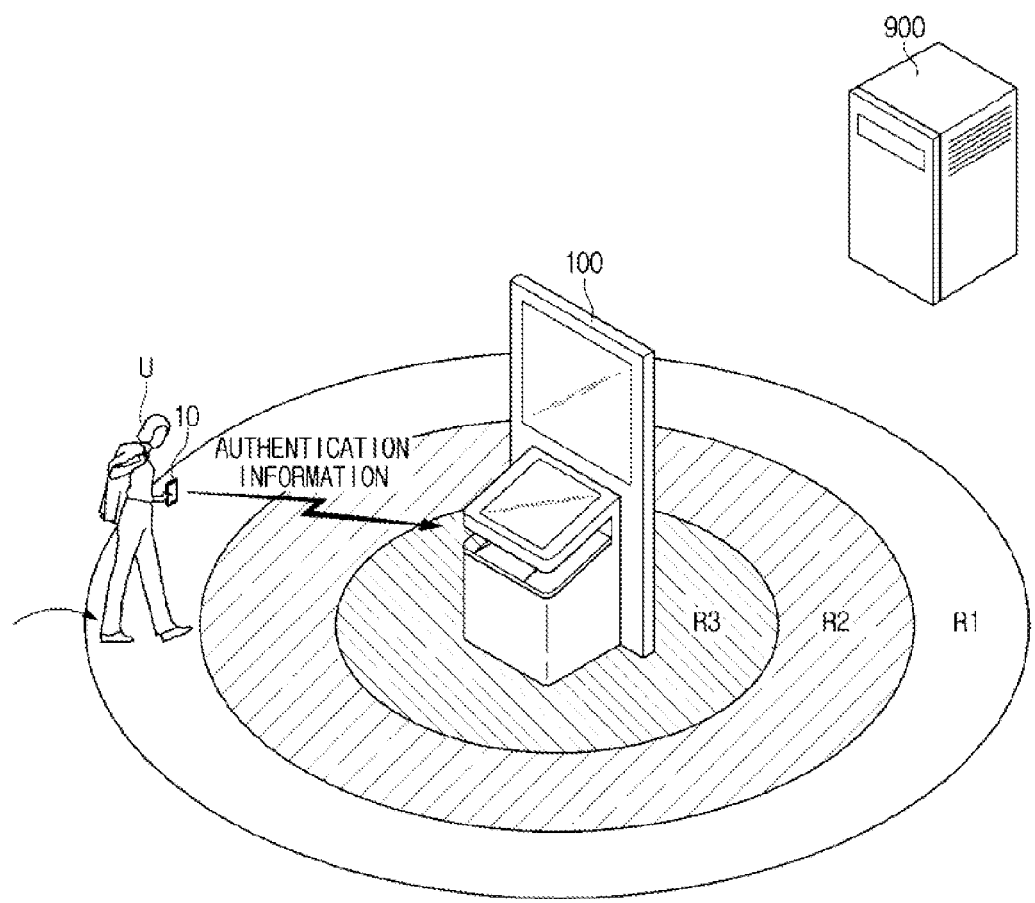

As shown in FIG. 45, the image forming apparatus 100 may request the authentication information of the user U from the portable electronic device 10 and may receive the authentication information of the user U from the portable electronic device 10.

The image forming apparatus 100 may receive identification information which allows the user to be identified, such as the name and unique number of the user, a password set by the user, or identification information of the portable electronic device 10 from the portable electronic device 10.

After that, the image forming apparatus 100 determines whether the user enters the second area R2 (7130).

It may be determined based on the distance between the portable electronic device 10 of the user and the image forming apparatus 100 whether the user enters the second area R2. For example, when the distance between the portable electronic device 10 of the user and the image forming apparatus 100 is less than the second predetermined or reference distance, it is determined that the user enters the second area R2.

In detail, the portable electronic device 10 may calculate the distance between the user and the image forming apparatus 100 based on the receiving intensity of the advertising signal ADV_SIG of the image forming apparatus 100 and may determine whether the user enters the second area R2 based on the distance between the user and the image forming apparatus 100.

Also, the image forming apparatus 100 may calculate the distance between the user and the image forming apparatus 100 based on the receiving intensity of the advertising signal ADV_SIG of the portable electronic device 10 and may determine whether the user enters the second area R2.

When the user enters the second area R2 (YES in 7130), the image forming apparatus 100 obtains a printing job (7140).

Figure 46:
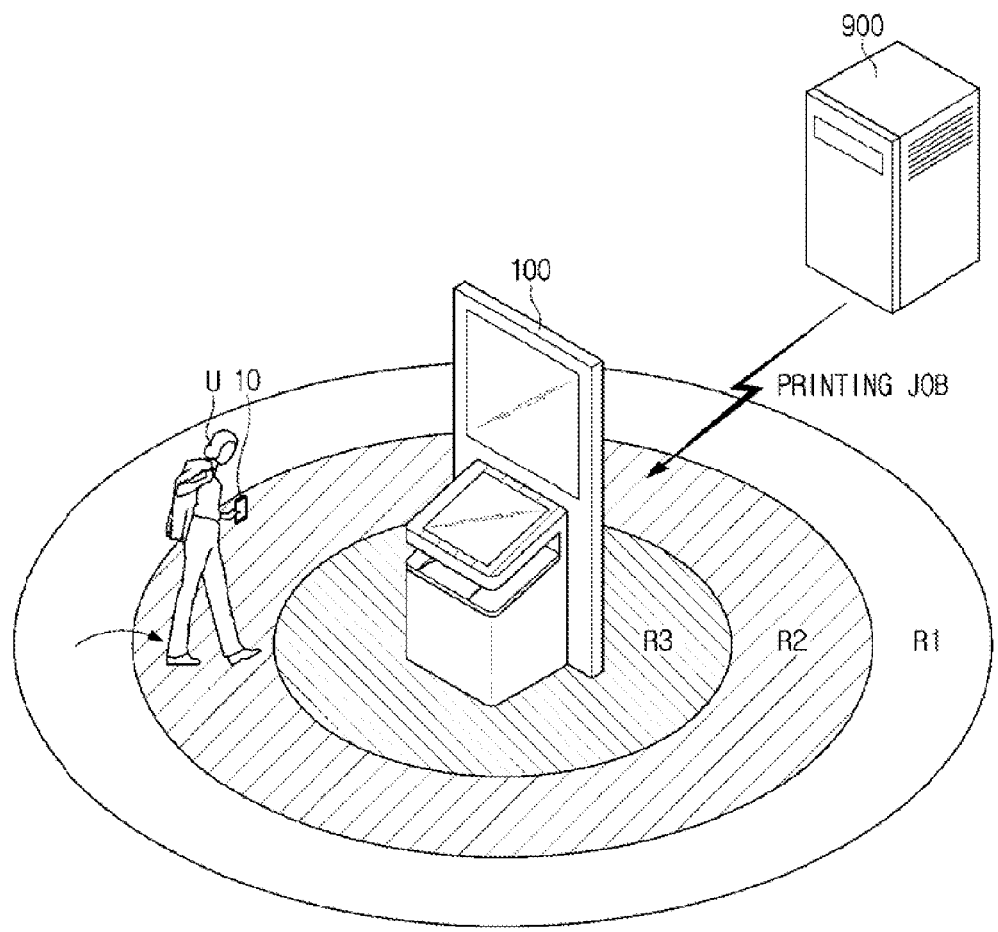

As shown in FIG. 46, the image forming apparatus 100 may transmit the authentication information of the user to the image forming server 900 and may request the printing job from the image forming server 900.

When the image forming apparatus 100 requests the printing job, the image forming server 900 may search for a document or image based on the received authentication information of the user and may generate the printing job based on the searched document or image. After that, the image forming server 900 may transmit the generated printing job to the image forming apparatus 100.

After that, the image forming apparatus 100 determines whether the user enters the third area R3 (7150).

It may be determined based on the distance between the portable electronic device 10 of the user and the image forming apparatus 100 whether the user enters the third area R3. For example, when the distance between the portable electronic device 10 of the user and the image forming apparatus 100 is less than the third predetermined or reference distance, it is determined that the user enters the third area R3.

In detail, the portable electronic device 10 may calculate the distance between the user and the image forming apparatus 100 based on the receiving intensity of the advertising signal ADV_SIG of the image forming apparatus 100 and may determine whether the user enters the third area R3 based on the distance between the user and the image forming apparatus 100.

Also, the image forming apparatus 100 may calculate the distance between the user and the image forming apparatus 100 based on the receiving intensity of the advertising signal ADV_SIG of the portable electronic device 10 and may determine whether the user enters the third area R3.

When the user enters the third area R3 (YES in 7150), the image forming apparatus 100 displays a preview image PU of the printing job (7160).

Figure 47:
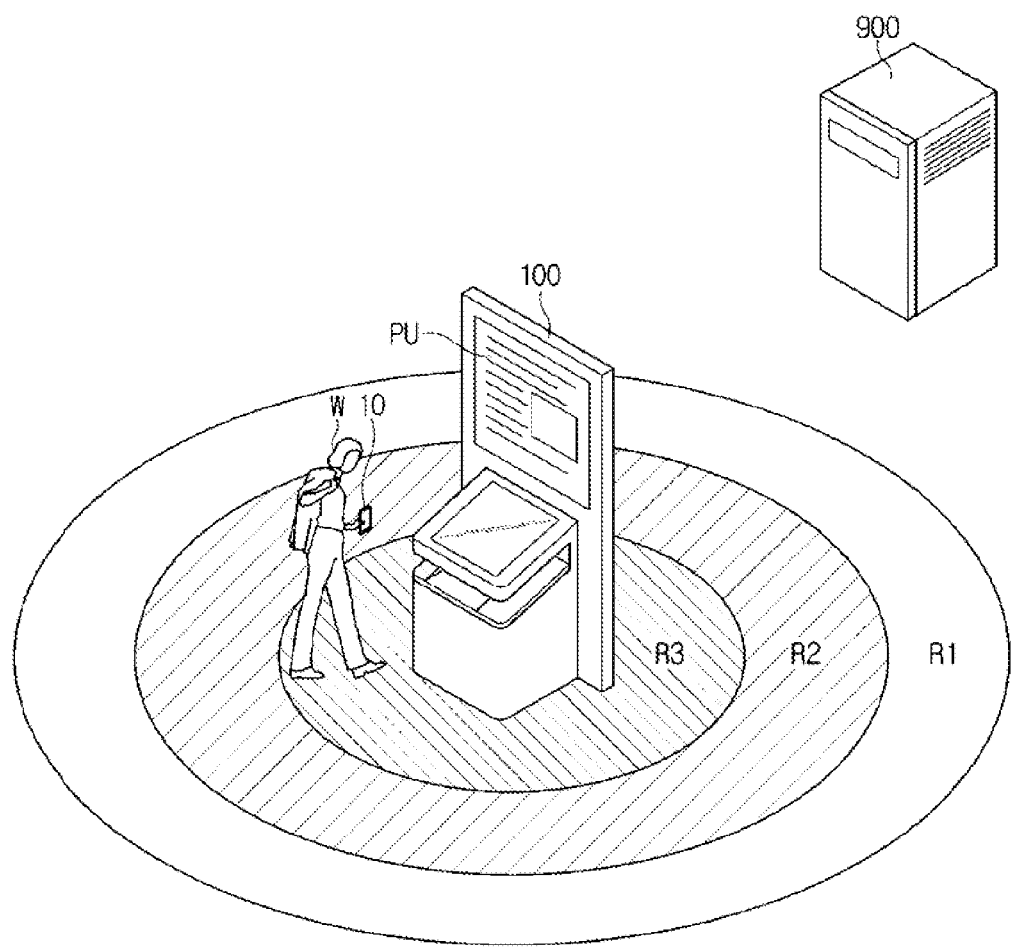

As shown in FIG. 47, the image forming apparatus 100 may generate the preview image PU based on the printing job received from the image forming server 900 and may display the preview image PU of the printing job through the user interface 400.

To display the preview image PU of the printing job, the image forming apparatus 100 may include the user interface 400 which may include a large display as shown in FIG. 47. The user W may check an image to be printed on a printing medium through the user interface 400 of the image forming apparatus 100.

After that, the image forming apparatus 100 performs an image forming operation with respect to the printing job (7170).

In detail, the image forming apparatus 100 may determine whether an image forming command is input from the user.

The user may check the image to be printed on the printing medium through the preview image PU displayed on the user interface 400 of the image forming apparatus 100. After that, the user may input the image forming command through the user interface 400 of the image forming apparatus 100.

When the printing job is performed (YES in 7170), the image forming apparatus 100 performs the image forming operation with respect to the printing job (7180).

In detail, the image forming apparatus 100 may preheat the fixing section 250 and may operate the exposing section 220 to prepare the image forming operation. Also, the image forming apparatus 100 forms an image corresponding to image data included in the printing job on a printing medium through a series of operations of supplying the printing medium, exposing using the photosensitive drum, developing an electrostatic latent image formed on the photosensitive drum, transferring the developed toner image to the printing medium, fixing the toner image to the printing medium, and discharging the printing medium formed with the image.

As described above, the image forming apparatus 100 may obtain the user authentication information when the user enters the first area R1, may prepare the image forming operation when the user enters the second area R2, and may perform the image forming operation when the user enters the third area R3.

As is apparent from the above description, an image forming apparatus and an image forming method in accordance with the disclosure may calculate a distance between a portable electronic device and the image forming apparatus based on an advertising signal transmitted by the image forming apparatus, thereby performing an image forming preparation operation and an image forming operation according to a distance between a user and the image forming apparatus.

When the portable electronic device moves away from the image forming apparatus, the user is alerted to unreceived printed material, thereby printed material may be prevented from being stacked on the image forming apparatus.

When the portable electronic device moves away from the image forming apparatus, the user is contacted about a printed material receiving assignment, thereby printed material may be prevented from being stacked on the image forming apparatus.

Although a few embodiments of the disclosure have been shown and described, it would be appreciated by those skilled in the art that changes may be made in these embodiments without departing from the principles and spirit of the disclosure, the scope of which is defined in the claims and their equivalents.

What is claimed is:

1. An image forming apparatus, comprising:
   an image forming unit configured to perform an image forming preparation operation and an image forming operation; and
   a controller configured to control performance of a user authentication operation according to distance information between a portable electronic device and the image forming apparatus, and to control performance of at least one of the image forming preparation operation and the image forming operation, according to the distance information between the portable electronic device and the image forming apparatus,
   wherein
   if the distance information indicates the portable electronic device is less than a first predefined distance from the image forming apparatus, the controller controls performance of the user authentication operation,
   if the user authentication operation is successful and the distance information indicates the portable electronic device is less than a second predefined distance from the image forming apparatus, the controller controls performance of at least one of the image forming preparation operation and the image forming operation, and
   the second distance is less than the first distance.

2. The image forming apparatus of claim 1, wherein when the portable electronic device approaches the image forming apparatus, the controller controls performance of the user authentication operation, the image forming preparation operation, and the image forming operation, in a sequential manner.

3. The image forming apparatus of claim 1, wherein the distance information includes information on an area in which the portable electronic device is located, the area among a plurality of areas divided according to a distance between the portable electronic device and the image forming apparatus.

4. The image forming apparatus of claim 3, wherein the plurality of areas include a first area, a second area, and a third area divided according to the distance between the portable electronic device and the image forming apparatus.

5. The image forming apparatus of claim 4, wherein when the portable electronic device enters the first area, the controller requests authentication information of a user from the portable electronic device.

6. The image forming apparatus of claim 5, wherein when the authentication information of the user is received from the portable electronic device, the controller controls performance of the user authentication operation based on the received authentication information.

7. The image forming apparatus of claim 4, wherein when the portable electronic device enters the second area, the controller controls the image forming unit to perform the image forming preparation operation.

8. The image forming apparatus of claim 4, wherein when the portable electronic device enters the third area, the controller controls the image forming unit to perform the image forming operation.

9. The image forming apparatus of claim 1, further comprising a communication interface configured to transmit an advertising signal at a predetermined period.

10. The image forming apparatus of claim 9, wherein the advertising signal includes information on an output intensity of the communication interface for outputting the advertising signal and identification information of the image forming apparatus.

11. The image forming apparatus of claim 1, further comprising a communication interface configured to receive an advertising signal output by the portable electronic device.

12. The image forming apparatus of claim 11, wherein the advertising signal includes information on an output intensity of the portable electronic device for outputting the advertising signal and identification information of the portable electronic device.

13. The image forming apparatus of claim 1, wherein when the image forming unit forms an image on a printing medium and the distance information indicates the portable electronic device is moved away from the image forming apparatus, the controller controls performance of a warning operation to notify the portable electronic device of unreceived material, based on whether the printing medium has been retrieved from the image forming apparatus.

14. The image forming apparatus of claim 13, wherein the controller transmits a warning message to the portable electronic device when the printing medium has not been retrieved from the image forming apparatus.

15. An image forming apparatus, comprising:
  an image forming unit configured to perform an image forming preparation operation and an image forming operation; and
  a controller configured to control performance of at least one of a user authentication operation, the image forming preparation operation, and the image forming operation, according to distance information between a portable electronic device and the image forming apparatus,
  wherein when the image forming unit forms an image on a printing medium and the distance information indicates the portable electronic device is moved away from the image forming apparatus, the controller controls performance of an assignment operation to assign receipt of the printing medium to another user, based on whether the printing medium has been retrieved from the image forming apparatus.

16. The image forming apparatus of claim 15, wherein the controller transmits an inquiry message to the portable electronic device to assign receipt of the printing medium to the another user.

17. An image forming method, comprising:
  calculating distance information between an image forming apparatus and a portable electronic device;
  performing a user authentication operation, if the distance information indicates the portable electronic device is less than a first distance from the image forming apparatus; and
  performing at least one of an image forming preparation operation and an image forming operation, if the distance information indicates the portable electronic device is less than a second distance from the image forming apparatus and the user authentication operation is successful,
  wherein the second distance is less than the first distance.

18. The image forming method of claim 17, wherein when the portable electronic device approaches the image forming apparatus, the performing comprises sequentially performing the user authentication operation, the image forming preparation operation, and the image forming operation.

19. The image forming method of claim 18, further comprising:
  when the image forming unit forms an image on a printing medium and the distance information indicates the portable electronic device is moved away from the image forming apparatus, performing a warning operation notifying the portable electronic device of unreceived material, based on whether the printing medium has been retrieved from the image forming apparatus.

20. The image forming method of claim 17, wherein the distance information includes information on an area in which the portable electronic device is located, the area among a plurality of areas divided according to a distance between the portable electronic device and the image forming apparatus.

21. The image forming method of claim 20, wherein the plurality of areas include a first area, a second area, and a third area divided according to the distance between the portable electronic device and the image forming apparatus.

22. The image forming method of claim 21, further comprising:
  when the portable electronic device is located in the first area, performing the user authentication operation with respect to the portable electronic device.

23. The image forming method of claim 21, further comprising:
  when the portable electronic device is located in the second area, performing the image forming preparation operation.

24. The image forming method of claim 21, further comprising:
  when the portable electronic device is located in the third area, performing the image forming operation.

25. An image forming method, comprising:
  calculating distance information between an image forming apparatus and a portable electronic device;
  performing at least one of a user authentication operation, an image forming preparation operation, and an image forming operation, according to the distance information; and
  when an image is formed on a printing medium and the distance information indicates the portable electronic device is moved away from the image forming apparatus, performing an assignment operation to assign receipt of the printing medium to another user, based on whether the printing medium has been retrieved from the image forming apparatus.

26. An image forming method, comprising:

calculating at least one distance between an image forming apparatus and a mobile device based on information included in an advertising signal transmitted to the image forming apparatus or to the mobile device;

performing, by the image forming apparatus, a user authentication operation, if the calculated at least one distance between the image forming apparatus and the mobile device is less than a first reference distance; and performing, by the image forming apparatus, at least one of an image forming preparation operation and an image forming operation, if the calculated at least one distance between the image forming apparatus and the mobile device is less than a second reference distance and the user authentication operation is successful, wherein the second reference distance is less than the first reference distance.

27. The image forming method of claim 26, wherein the information included in the advertising signal includes intensity information of the advertising signal.

28. A method performed by an image forming server, the method comprising:

storing a print job and first authentication information received from a mobile device;

in response to the mobile device being within a first distance from an image forming apparatus, receiving second authentication information from the image forming apparatus;

determining whether the first authentication information corresponds to the second authentication information; and when the first authentication information corresponds to the second authentication information and in response to the mobile device being within a second distance from the image forming apparatus, transmitting the print job to the image forming apparatus.

29. A method performed by a mobile device, the method comprising:

determining distance information between the mobile device and an image forming apparatus;

transmitting an entry message to the image forming apparatus to indicate the mobile device is within a first distance from the image forming apparatus, based on the distance information; and performing an authentication operation with respect to the image forming apparatus when the mobile device is within the first distance from the image forming apparatus.

30. A method performed by an image forming system including an image forming apparatus and an mobile device, the method comprising:

calculating, by at least one of the mobile device and the image forming apparatus, at least one distance between the image forming apparatus and the mobile device based on information included in an advertising signal transmitted to one of the image forming apparatus and the mobile device from the other one of the mobile device and the image forming apparatus;

performing, by the image forming apparatus, an authentication operation with respect to the mobile device if the calculated at least one distance between the mobile device and the image forming apparatus is less than a first reference distance; and performing, by the image forming apparatus, at least one of an image forming preparation operation and an image forming operation, if the calculated at least one distance between the image forming apparatus and the mobile device is less than a second reference distance and the user authentication operation is successful, wherein the second reference distance is less than the first reference distance.

* * * * *